US011230626B2

(12) United States Patent
Holdcroft et al.

(10) Patent No.: US 11,230,626 B2
(45) Date of Patent: Jan. 25, 2022

(54) CROSSLINKING OF HYDROXIDE STABLE, POLYBENZIMIDAZOLIUMS AND POLYIMIDAZOLIUMS MEMBRANES AND IONOMERS

(71) Applicant: Simon Fraser University, Burnaby (CA)

(72) Inventors: Steven Holdcroft, Pitt Meadows (CA); Thomas Weissbach, Burnaby (CA); Timothy James Peckham, Vancouver (CA); Andrew Wright, Mountain View, CA (US); Benjamin Britton, Vancouver (CA)

(73) Assignee: Simon Fraser University, Burnaby (CA)

( * ) Notice: Subject to any disclaimer, the term of this patent is extended or adjusted under 35 U.S.C. 154(b) by 222 days.

(21) Appl. No.: 16/322,920

(22) PCT Filed: Aug. 1, 2017

(86) PCT No.: PCT/US2017/044772
§ 371 (c)(1),
(2) Date: Feb. 1, 2019

(87) PCT Pub. No.: WO2018/026743
PCT Pub. Date: Feb. 8, 2018

(65) Prior Publication Data
US 2019/0169372 A1    Jun. 6, 2019

Related U.S. Application Data

(60) Provisional application No. 62/371,100, filed on Aug. 4, 2016.

(51) Int. Cl.
| | | |
|---|---|---|
| *C08G 73/18* | (2006.01) | |
| *C08J 3/24* | (2006.01) | |
| *C08J 5/22* | (2006.01) | |
| *C08L 79/04* | (2006.01) | |
| *C25B 1/04* | (2021.01) | |
| *C25B 13/08* | (2006.01) | |
| *C25B 9/73* | (2021.01) | |
| *H01M 8/1018* | (2016.01) | |
| *H01M 8/103* | (2016.01) | |

(52) U.S. Cl.
CPC .............. *C08G 73/18* (2013.01); *C08J 3/24* (2013.01); *C08J 5/2256* (2013.01); *C08J 5/2287* (2013.01); *C08L 79/04* (2013.01); *C25B 1/04* (2013.01); *C25B 9/73* (2021.01); *C25B 13/08* (2013.01); *H01M 8/103* (2013.01); *C08J 2379/04* (2013.01); *H01M 2008/1095* (2013.01); *H01M 2300/0082* (2013.01)

(58) Field of Classification Search
CPC .................................................. C08J 2379/04
See application file for complete search history.

(56) References Cited

U.S. PATENT DOCUMENTS

| | | |
|---|---|---|
| 3,255,078 A | 6/1966 | Heinroth et al. |
| 7,301,002 B1 | 11/2007 | Cornelius et al. |
| 8,110,636 B1 | 2/2012 | Fujimoto et al. |
| 9,509,008 B2 | 11/2016 | Kim et al. |
| 2003/0099838 A1 | 5/2003 | Cho et al. |
| 2006/0110632 A1 | 5/2006 | Hong et al. |
| 2009/0026544 A1 | 1/2009 | Uno et al. |
| 2012/0186446 A1 | 7/2012 | Bara et al. |
| 2012/0256296 A1 | 10/2012 | Wei et al. |
| 2015/0073063 A1* | 3/2015 | Thomas ................ C08F 112/12 521/27 |
| 2019/0382353 A1* | 12/2019 | Holdcroft .............. C08G 12/06 |

FOREIGN PATENT DOCUMENTS

| | | |
|---|---|---|
| CA | 2866742 A | 10/2013 |
| CA | 2933312 A1 | 9/2016 |
| JP | 2009-087687 A | 4/2009 |
| JP | 2012-128142 A | 7/2012 |
| KR | 20120115848 A | 10/2012 |
| WO | 2009/134227 A1 | 11/2009 |
| WO | 2013/149328 A1 | 10/2013 |
| WO | 2014/012188 A1 | 1/2014 |
| WO | 2015/153959 A2 | 10/2015 |
| WO | 2015/157848 A1 | 10/2015 |

OTHER PUBLICATIONS

International Search Report and Written Opinion dated Dec. 21, 2017, issued in corresponding International Application No. PCT/US2017/44772, filed Aug. 1, 2017, 12 pages.

Wright et al., "Hexamethyl-p-terphenyl poly(benzimidazolium): a universal hydroxide-conducting polymer for energy conversion devices", Energy & Environmental Science, May 25, 2016, vol. 9, p. 2130-2142; p. 2130, para 1, p. 2131, Fig. 1.

Henkensmeier et al., "Polybenzimidazolium-Based Solid Electrolytes", Macromolecular Materials and Engineering, Jul. 22, 2011, vol. 296, p. 899-908; p. 900, left col., para 3, p. 905, Scheme 3, p. 908, left col., para 1.

Weissbach et al., "Simultaneous, Synergistic Control of Ion Exchange Capacity and Cross-Linking of Sterically-Protected Poly(benzimidazolium)s" Chemistry of Materials, Oct. 19, 2016, vol. 28, p. 8060-8070; entire document.

(Continued)

*Primary Examiner* — Melissa A Rioja
(74) *Attorney, Agent, or Firm* — Christensen O'Connor Johnson Kindness PLLC

(57) ABSTRACT

Described herein are crosslinked alkylated poly(benzimidazole) and poly(imidazole) polymer materials and devices (e.g., fuel cells, water electrolyzers) including these polymer materials. The polymer materials can be prepared in a convenient manner, allowing for applications such as anion exchange membranes (AEMs). The membranes provide high anion conductivities over a wider range of operating conditions when compared to the analogous membranes that are not cross-linked. The crosslinked polymer materials have improved alkaline stability, when compared to the analogous non-crosslinked polymer materials.

10 Claims, 11 Drawing Sheets

(56) References Cited

OTHER PUBLICATIONS

Partial International Search Report dated Feb. 26, 2020, issued in corresponding European Application No. 17837493.0, filed Aug. 1, 2017, 14 pages.
Valtcheva, I.B., et al., "Crosslinked Polybenzimidazole Membranes for Organic Solvent NanoFiltration (OSN) Analysis of Crosslinking Reaction Mechanism and Effects of Reaction Parameters," Journal of Membrane Science 493, Mar. 2015, 568-579.
International Search Report and Written Opinion dated Jul. 16, 2013. issued in corresponding International Application No. PCT/CA2013/000323, filed Apr. 4, 2013, 7 pages.
Pu, H., et al., "Synthesis and Characterization of Fluorine-Containing Polybenzimidazole for Proton Conducting Membranes in Fuel Cells," Journal of Polymer Science: Part A: Polymer Chemistry 48(10):2115-2122, May 2010.
Takagi, K., et al., "Synthesis of Imidazole-Containing Conjugated Polymers Bearing Phenol Unit as Side Group and Excited State Intramolecular Proton Transfer-Mediated Fluorescence," Journal of Polymer Science: Part A: Polymer Chemistry 47(18):4822-4829, Sep. 2009.
Wright, A., et al., "Hydroxide-Stable Ionenes," ACS Macro Letters, vol. 3, No. 5 444-447, May 20, 2014.
Zimmerman, T., et al., "Ring Transformations of Heterocyclic Compounds. XIV [1], Ring Transformations of Pyrylium and Thiopyrylium Salts with Anhydro-bases Derived from 1H-Benzimidazolium and Benzothiazolium Salts: An easy Access to 2-(2,4,6-triarylphenyl) 1H-Benzimidazolium and Benzothiazolium Derivatives," J. Heterocycl. Chem, vol. 33, 1717-1721, 1996.
Williams, T., et al. "Mechanistic Elucidation of the Arylation of Non-Spectator N-Heterocyclic Carbenes at Copper Using a Combined Experimental and Computational Approach," Organometallics, vol. 34, No. 14, 3497-3507, 2015.
Zhu, Xiao-Qing, et al. "Hydride, Hydrogen Atom, Proton, and Electron Transfer Driving Forces of Various Five-Membered Heterocyclic Organic Hydrides and Their Reaction Intermediates in Acetonitrile," J. Am. Chem. Soc., vol. 130, 2501-2516, 2008.
Sun, Qi, et al. "Synthesis and Biological Evaluation of Analogues of AKT (Protein Kinase B) Inhibitor—IV," J. Med. Chem., vol. 54, 1126-1139, 2011.
Xing, B., et al., "Hydrogen/Oxygen Polymer Electrolyte Membrane Fuel Cells (PEMFCs) Based on Alkaline-Doped Polybenzimidazole (PBI)," Electrochem. Comm., 2(10), 697-702, 2000.
Hou, H., et al., "Alkali Doped Polybenzimidazole Membrane for Alkaline Direct Methanol Fuel Cell," In. J. Hydrogen Energy, 33(23), 7172-7176, 2008.
Novitski, D., et al., "Electrochemical Reduction of Dissolved Oxygen in Alkaline, Solid Polymer Electrolyte Films," J. Am. Chem. Soc., 138, 15465-15472, Nov. 2, 2016.

Wright, A. G., et al., "Poly(phenylene) and m-Terphenyl as Powerful Protecting Groups for the Preparation of Stable Organic Hydroxides," Angew. Chem. Int. Ed., 55(15), 4818-4821, 2016.
Thomas, O. D., et al., "A Stable Hydroxide-Conducting Polymer," J. Am. Chem. Soc., 134 (26), 10753-10756, 2012.
Thomas, O. D., et al., "Anion Conducting Poly(Dialkyl Benzimidazolium) Salts," Poly. Chem., 2, 1641-1643, 2011.
Long, H., et al., "Hydroxide Degradation Pathways for Imidazolium Cations: A DFT Study," Journal of Physical Chemistry C., vol. 118, 9880-9888, Apr. 18, 2014.
Fan, J., et al., "Cationic Polyelectrolytes, Stable in 10 M KOHaq at 100 °C," ACS MacroLetters, vol. 6, 1089-1093, Sep. 19, 2017.
International Search Report and Written Opinion dated Jun. 13, 2018, issued in corresponding International Application No. PCT/CA2018/050436, filed Apr. 10, 2018, 10 pages.
Skalski, J., et al., Structurally-Defined, Sulfo-Phenylated, Oligophenylenes and Polyphenylenes, J. Am. Chem. Soc., 137, 12223-12226, 2015.
Adamski, M., et al., "Highly Stable, Low Gas Grossover, Proton-Conducting Phenylated Polyphenylenes," Angew. Chem. Int. Ed., 56, 9058-9061, 2017.
Lim, Y., et al., "Synthesis and Properties of Sulfonated Poly(Phyenylene Sulfone)s Without Ether Linkage by Diels-Alder Reaction for PEMFC Application," Electrochimica Acta 119, 16-23, 2014.
International Search Report and Written Opinion dated Oct. 18, 2017, issued in corresponding International Application No. PCT/US2017/44554, filed Jul. 29, 2017, 7 pages.
International Search Report, dated Mar. 8, 2017 in related International Application No. PCT/CA2017/050013, filed Jan. 6, 2017, 5 pages.
Extended European Search Report dated Sep. 6, 2017, issued in European Application No. 15780051.7, filed Apr. 15, 2015, 5 pages.
International Search Report dated Jul. 8, 2015, issued in corresponding International Application No. PCT/CA2015/000248, filed Apr. 15, 2015, 8 pages.
Extended European Search Report dated Sep. 4, 2019, issued in corresponding European Application No. EP17735788.6, filed Jan. 6, 2017, 6 pages.
Richter, D., et al., "Kinetics of Hydride Abstractions from 2-Arylbenzimidazolines," Chemistry—An Asian Journal vol. 4: 1824-1829, 2009.
Written Opinion dated Mar. 8, 2017, issued in corresponding International Application No. PCT/CA2017/050013, filed Jan. 6, 2017, 6 pages.
European Search Report dated Oct. 31, 2019, issued in corresponding European Application No. 17792325.7, filed May 1, 2017, 10 pages.

* cited by examiner

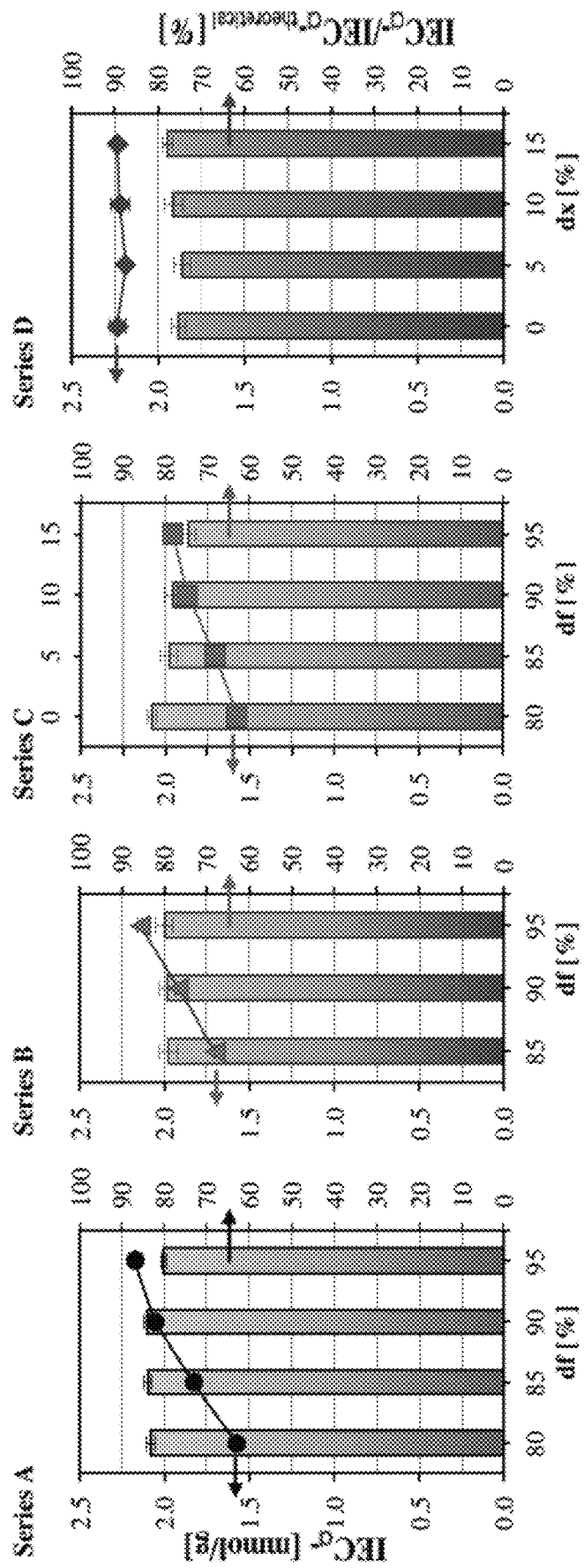

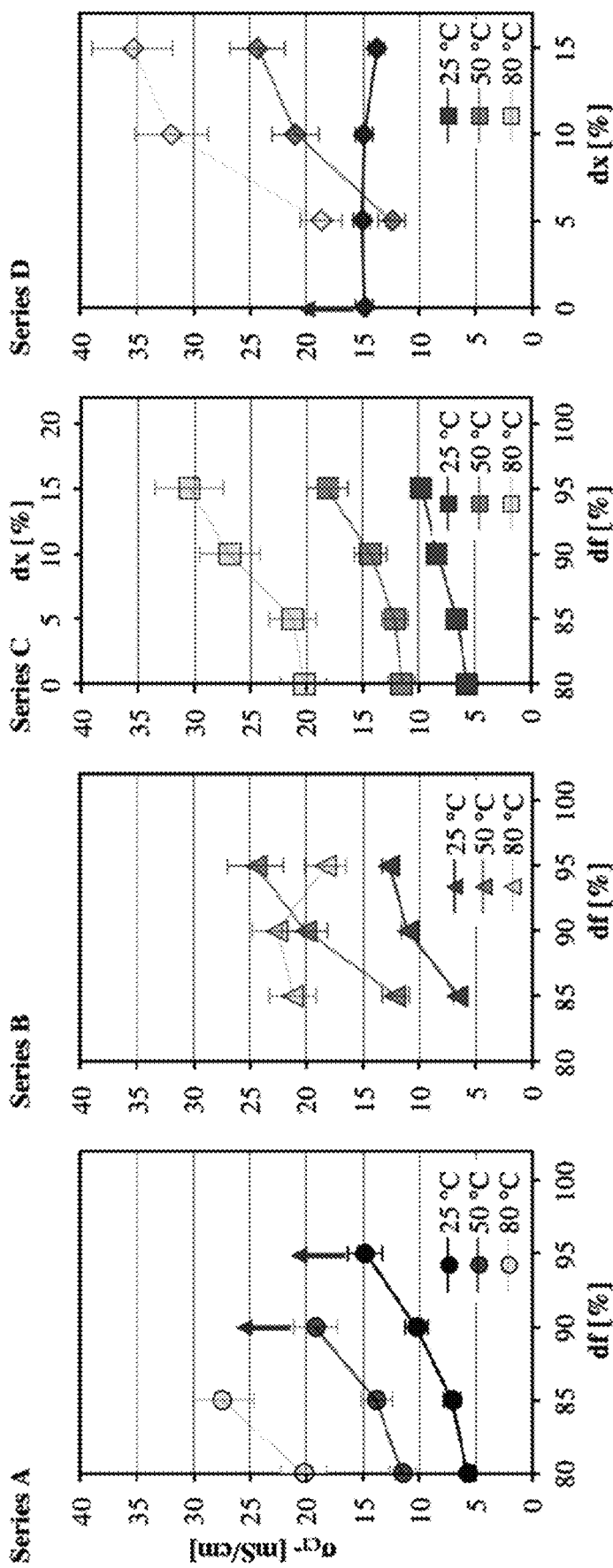

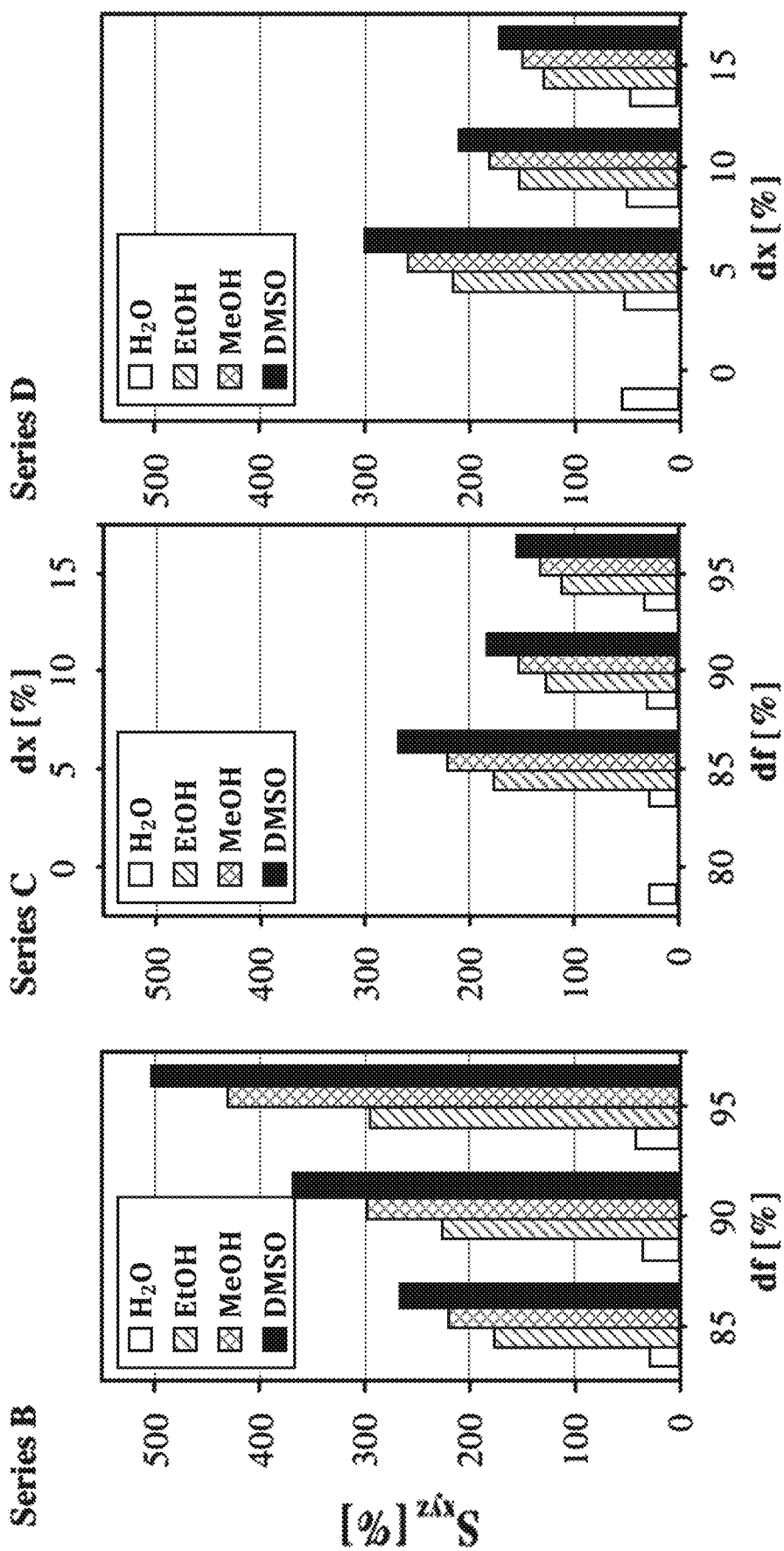

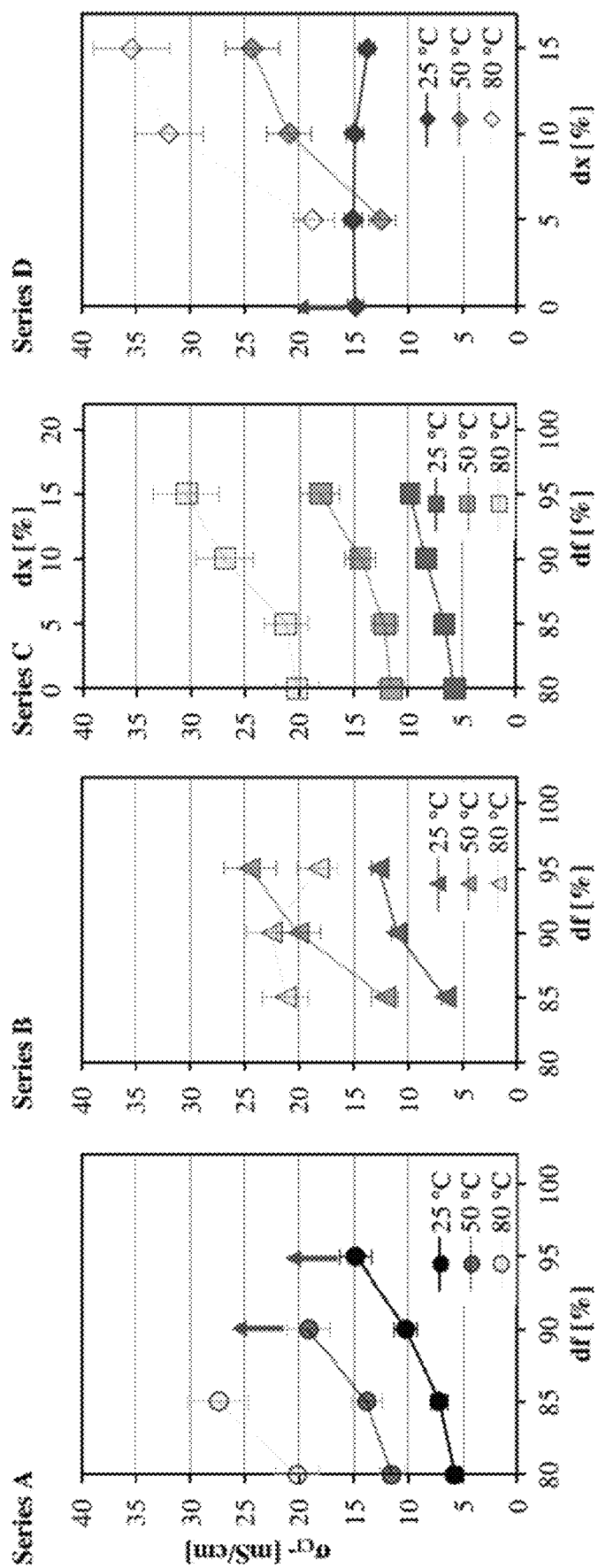

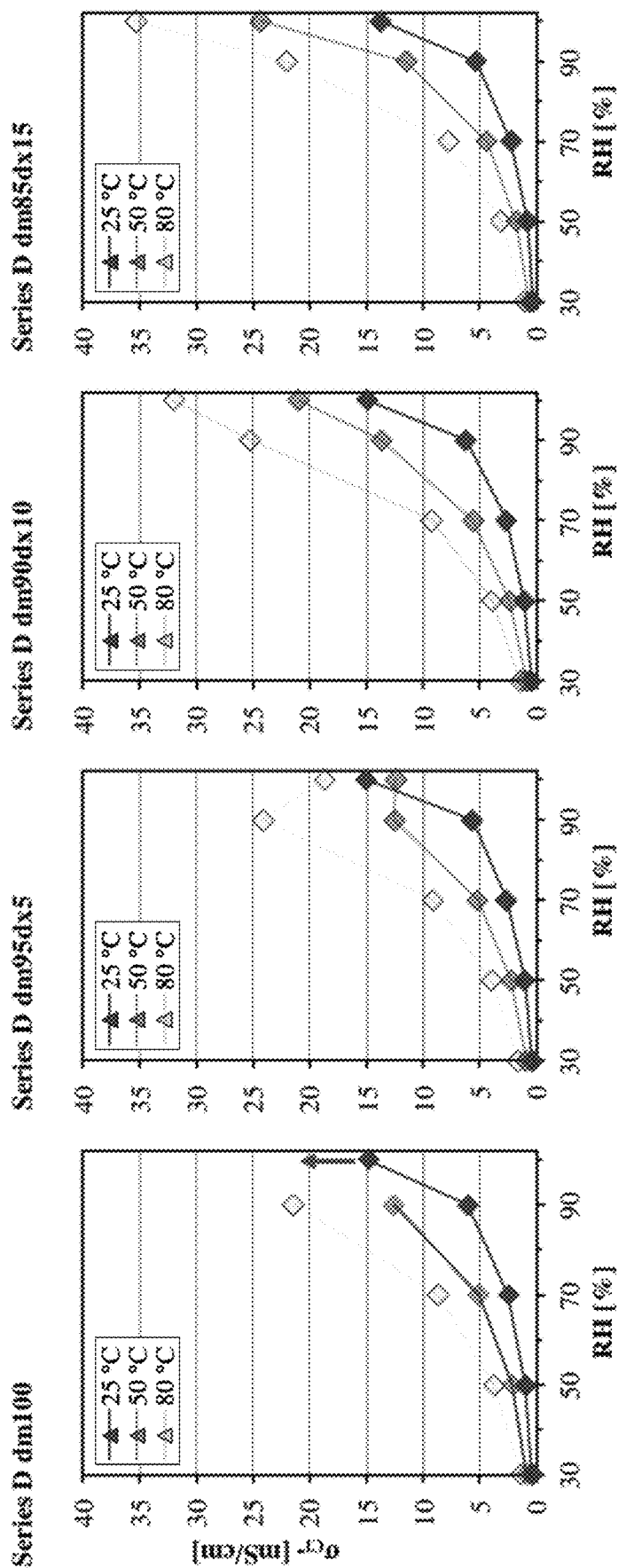

CROSSLINKING OF HYDROXIDE STABLE, POLYBENZIMIDAZOLIUMS AND POLYIMIDAZOLIUMS MEMBRANES AND IONOMERS

CROSS-REFERENCES TO RELATED APPLICATION(S)

This application is a National Stage of PCT/US2017/044772, filed on Aug. 1, 2017, which claims the benefit of U.S. Provisional Application No. 62/371,100, filed Aug. 4, 2016, the disclosure of each of which is incorporated herein by reference in its entirety.

BACKGROUND

The desire for anion-conducting, chemically and mechanically stable anion exchange membranes—which can be used in water purification by reverse osmosis, water electrolyzers, redox-flow batteries, and alkaline anion exchange membrane fuel cells (AAEM-FCs)—has led to the development of a broad range of polymer materials. Examples of these polymer materials include tetraalkylammonium, benzyltrimethylammonium, imidazolium, benzimidazolium, phosphonium-functionalized poly(arylene ether sulfone)s, poly(olefin)s, poly(styrene)s, poly(phenylene oxide)s, and poly(phenylene)s.

Substituted tetraalkyl ammonium, imidazolium and benzimidazolium cations show low stability against OH⁻ attack. Without wishing to be bound by theory, it is believed that the degradation of alkylated trimethylammonium derivatives follows, when available, the Hofmann elimination pathway. It was hypothesized that the stability of these derivatives could benefit from the absence of α and β-atoms.

Quaternized poly(benzimidazolium) (PBI) and poly(imidazolium) polymer have attracted a lot of attention in recent years, although (benz)imidazolium was found to degrade upon immersion in basic aqueous solution by a ring-opening reaction at the C2 position of the imidazolium and benzimidazolium ring, respectively, leading to loss of cationic functionality and irreversible ring opening. For example, in Mes-PDMBI-OH⁻ polymer, shown below, the benzimidazolium functional groups are sterically C2 protected by methyl groups of mesitylene.

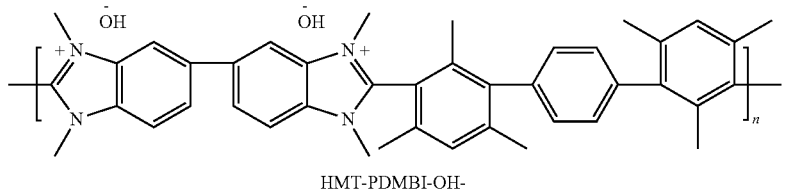

HMT-PDMBI-OH-

Mes-PDMBI-OH⁻ showed no detectable sign of degradation in 6 M KOH at room temperature or in 2 M KOH at 60° C.

As another example, by separating the benzimidazole groups with hexamethyl-p-terphenyl groups, a fully usable AAEM-FC polymer (HMT-PMBI-I⁻) was obtained after partial methylation, having the same outstanding stability.

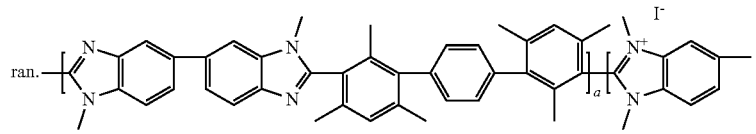

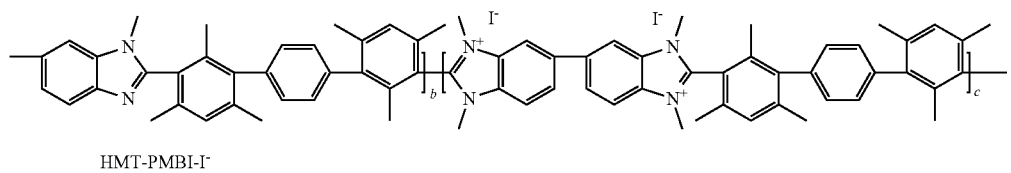

HMT-PMBI-I⁻

However, highly functionalized HMT-PMBI-OH was found to remain water soluble. Mes-PDMBI-OH⁻ and HMT-PMBI-I⁻ are described, for example, in International application PCT/CA2017/050529, filed May 1, 2017, herein incorporated by reference in its entirety.

In alkaline anion exchange membrane research, crosslinking is a promising approach to limit water sorption and/or increase mechanical stability. Crosslinking was also found to decrease reactant/solvent permeability and improve chemical stability. For example, covalent crosslinks can be established by direct crosslinking through epoxides, metathesis, or thiol-ene click chemistry. Additional ion exchange sites can be formed through the reaction of a halide-bearing polymer with crosslinkers such as N,N,N',N'-tetra-methyl-1,6-hexanediamine, 1,4-diazobicyclo [2,2,2] octane (DABCO) or imidazole derivatives. Vice versa, dihalide crosslinkers, such as α,α'-dichloro-p-xylene have been used to crosslink trialkylamine substituted polymers.

PBI-based polymers have been ionically crosslinked or covalently crosslinked by thermal treatment, epoxide, or halide crosslinkers, respectively, to obtain mono-substituted non-quarternized PBI. When doped with phosphoric acid and KOH to obtain proton and anion exchange membranes, respectively, crosslinked membranes possessed a lower solubility, increased elastic modulus, and chemical stability against oxidative radicals and hydroxide. In forward-osmosis applications, crosslinked PBI fiber membranes show improved ion selectivity and increased water permeation flux.

Covalently crosslinked anion exchange resins without additional doping agents can be obtained after a second substitution on the nitrogen atoms on the benzimidazole group to obtain poly(benzimidazolium) using halide crosslinkers or halide bearing polymers. For example, a crosslinked polymer system containing methylated poly(benzimidazolium) can show a power density 120 mW at 80° C. in a platinum-free direct methanol fuel cell (DMFC), with no observed correlation between the degree of crosslinking and chemical stability.

Thus, the application of highly-charged anion exchange membranes is often limited by strong water adsorption leading to dissolution in water or organic solvents, especially at elevated temperatures. Crosslinking of polymers has been shown to be a good approach for overcoming this problem, however, crosslinking also renders solvent processing, an often-desired property, impossible. Thus, polymers having good solvent processability and stability in solvents are needed. The present disclosure seeks to fulfill these needs and provides further advantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure features a crosslinked polymer including repeating units of Formula (A):

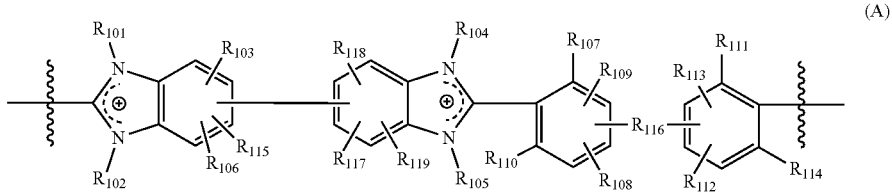

(A)

wherein $R_{101}$, $R_{102}$, $R_{104}$, and $R_{105}$ are each independently selected from absent, a bond, alkyl, perfluoroalkyl, heteroalkyl, aryl, aralkyl, and a crosslinking moiety;

wherein the crosslinking moiety crosslinks a first repeating unit and a second repeating unit of Formula (A), wherein in the first repeating unit of Formula (A), at least one of $R_{101}$, $R_{102}$, $R_{104}$, and $R_{105}$ is the crosslinking moiety; and in the second repeating unit of Formula (A), at least one of $R_{101}$, $R_{102}$, $R_{104}$, and $R_{105}$ is a bond connected to the crosslinking moiety on the first crosslinked repeating unit of Formula (A);

provided that at least one of $R_{101}$, $R_{102}$, $R_{104}$, and $R_{105}$ is selected from a crosslinking moiety and a bond, wherein the bond is configured to connect to a crosslinking moiety;

at least one of $R_{101}$ and $R_{102}$ is selected from alkyl, perfluoroalkyl, heteroalkyl, aryl, and aralkyl;

when one of $R_{101}$ and $R_{102}$ is absent, the benzimidazolyl group including the absent $R_{101}$ or $R_{102}$ is neutral;

at least one of $R_{104}$ and $R_{105}$ is selected from alkyl, perfluoroalkyl, heteroalkyl, aryl, and aralkyl; and when one of $R_{104}$ and $R_{105}$ is absent, the benzimidazolyl group including the absent $R_{104}$ or $R_{105}$ is neutral;

$R_{103}$, $R_{106}$, $R_{115}$, $R_{117}$, $R_{118}$, and $R_{119}$ are each independently selected from hydrogen (H), alkyl, perfluoroalkyl, heteroalkyl, aryl, aralkyl, and heteroaryl;

$R_{116}$ is selected from a bond, alkylene, perfluoroalkylene, heteroalkylene, arylene, aralkylene, and heteroarylene, wherein said alkylene, perfluoroalkylene, heteroalkylene, arylene, aralkylene, and heteroarylene is each optionally substituted with 1, 2, 3, or 4 substituents independently selected from alkyl, perfluoroalkyl, heteroalkyl, and halo;

$R_{107}$, $R_{110}$, $R_{111}$, and $R_{114}$ are each independently selected from alkyl, perfluoroalkyl, heteroalkyl, alkoxy, perfluoroalkoxy, halo, aryl, and heteroaryl; and $R_{108}$, $R_{109}$, $R_{112}$, and $R_{113}$ are each independently selected from hydrogen (H), alkyl, perfluoroalkyl, and heteroalkyl.

In another aspect, the present disclosure features a crosslinked polymer including repeating units of Formula (B):

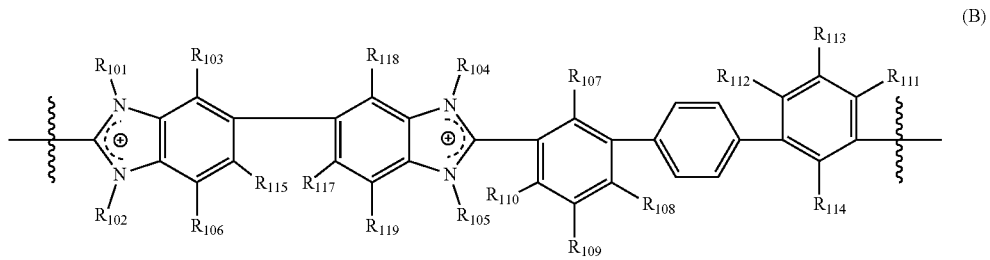

(B)

wherein $R_{101}$, $R_{102}$, $R_{104}$, and $R_{105}$ are each independently selected from absent, a bond, alkyl, perfluoroalkyl, heteroalkyl, aryl, aralkyl, and a crosslinking moiety;

wherein the crosslinking moiety crosslinks a first repeating unit and a second repeating unit of Formula (B), wherein in the first repeating unit of Formula (B), at least one of $R_{101}$, $R_{102}$, $R_{104}$, and $R_{105}$ is the crosslinking moiety; and in the second repeating unit of Formula (B), at least one of $R_{101}$, $R_{102}$, $R_{104}$, and $R_{105}$ is a bond connected to the crosslinking moiety on the first crosslinked repeating unit of Formula (B);

provided that at least one of $R_{101}$ and $R_{102}$ is selected from alkyl, perfluoroalkyl, heteroalkyl, aryl, and aralkyl;

when one of $R_{101}$ and $R_{102}$ is absent, the benzimidazolyl group including the absent $R_{101}$ or $R_{102}$ is neutral;

at least one of $R_{104}$ and $R_{105}$ is selected from alkyl, perfluoroalkyl, heteroalkyl, aryl, and aralkyl; and when one of $R_{104}$ and $R_{105}$ is absent, the benzimidazolyl group including the absent $R_{104}$ or $R_{105}$ is neutral;

$R_{103}$, $R_{106}$, $R_{115}$, $R_{117}$, $R_{118}$, and $R_{105}$ are each independently selected from hydrogen, alkyl, perfluoroalkyl, heteroalkyl, aryl, aralkyl, and heteroaryl;

$R_{107}$, $R_{110}$, $R_{111}$, and $R_{114}$ are each independently selected from alkyl, perfluoroalkyl, heteroalkyl, alkoxy, perfluoroalkoxy, halo, aryl, and heteroaryl; and $R_{108}$, $R_{109}$, $R_{112}$, and $R_{113}$ are each independently selected from hydrogen, alkyl, perfluoroalkyl, and heteroalkyl.

In yet another aspect, the present disclosure features a crosslinked polymer including a repeating unit of Formula (C-A):

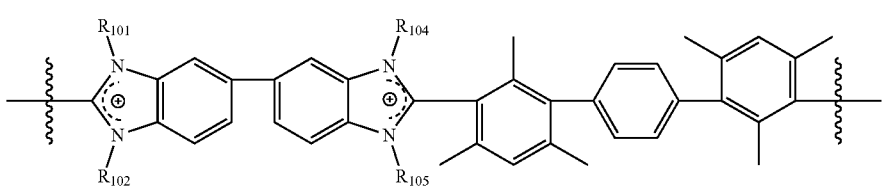

(C-A)

wherein $R_{101}$, $R_{102}$, $R_{104}$, and $R_{105}$ are each independently selected from a bond, methyl, and a crosslinking moiety, provided that two of $R_{101}$, $R_{102}$, $R_{104}$, and $R_{105}$ are each independently selected from a crosslinking moiety and a bond, wherein the bond is configured to connect to a crosslinking moiety; and the remaining two of $R_{101}$, $R_{102}$, $R_{104}$, and $R_{105}$ are each methyl.

The crosslinked polymer including a repeating unit of Formula (C-A) can further include repeating units of Formula (C-B):

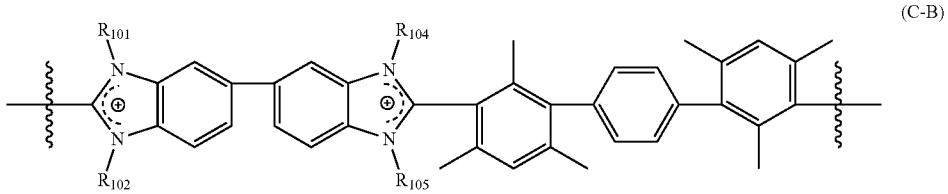

(C-B)

wherein $R_{101}$, $R_{102}$, $R_{104}$, and $R_{105}$ are each independently selected from a bond, methyl, and a crosslinking moiety, provided that one of $R_{101}$, $R_{102}$, $R_{104}$, and $R_{105}$ is selected from a crosslinking moiety and a bond, wherein the bond is configured to connect to a crosslinking moiety;

one of $R_{101}$, $R_{102}$, $R_{104}$, and $R_{105}$ is absent and the benzimidazolyl group to which the absent $R_{101}$, $R_{102}$, $R_{104}$, or $R_{105}$ is attached is neutral, and the remaining three of $R_{101}$, $R_{102}$, $R_{104}$, and $R_{105}$ are each methyl.

The crosslinked polymer including a repeating unit of Formula (C-A) and/or (C-B) can further include repeating units of Formula (C-C):

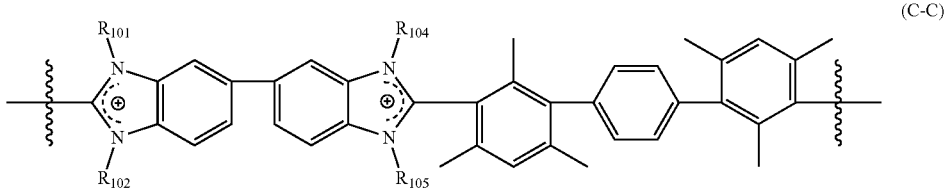

(C-C)

wherein $R_{101}$, $R_{102}$, $R_{104}$, and $R_{105}$ are each independently selected from a bond, methyl, and a crosslinking moiety, provided that one of $R_{101}$, $R_{102}$, $R_{104}$, and $R_{105}$ is selected from a crosslinking moiety and a bond, wherein the bond is configured to connect to a crosslinking moiety; and the remaining three of $R_{101}$, $R_{102}$, $R_{104}$, and $R_{105}$ are each methyl.

The crosslinked polymer including a repeating unit of Formula (C-A), (C-B), and/or (C-C) can further include repeating units of Formula (C-D):

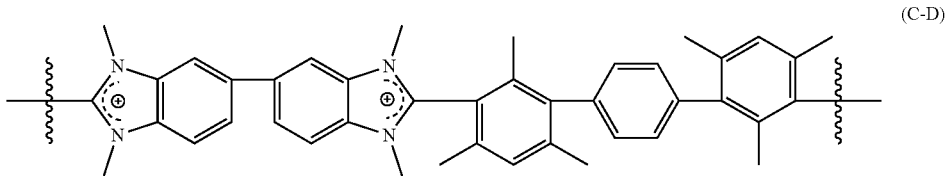

(C-D)

In yet another aspect, the present disclosure features a crosslinked polymer including repeating units of Formula (D-A), (D-B), (D-C), and (D-D)

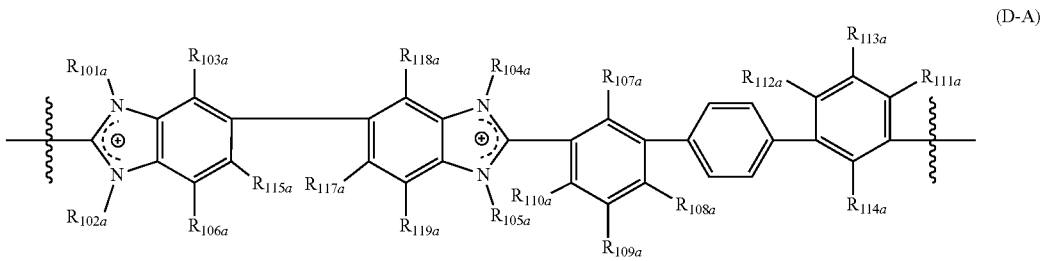

(D-A)

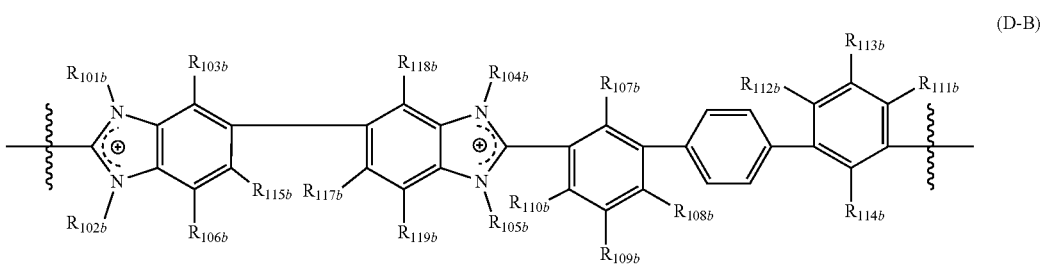

(D-B)

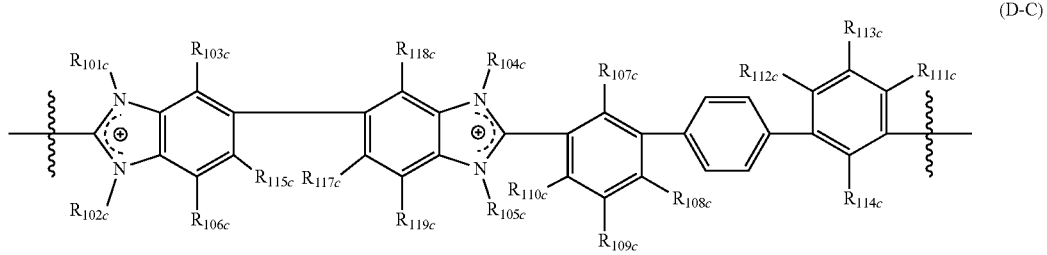

(D-C)

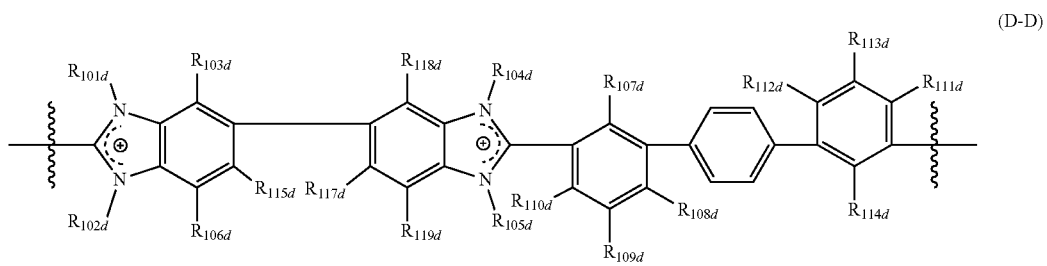

(D-D)

wherein $R_{101a}$, $R_{102a}$, $R_{104a}$, and $R_{105a}$ are each independently selected from a bond, alkyl, perfluoroalkyl, heteroalkyl, aryl, aralkyl, and a crosslinking moiety, provided that two of $R_{101a}$, $R_{102a}$, $R_{104a}$, and $R_{105a}$ are selected from a crosslinking moiety and a bond, wherein the bond is configured to connect to a crosslinking moiety; and the remaining two of $R_{101a}$, $R_{102a}$, $R_{104a}$, and $R_{105a}$ are each independently selected from alkyl, perfluoroalkyl, heteroalkyl, aryl, and aralkyl;

$R_{101b}$, $R_{102b}$, $R_{104b}$, and $R_{105b}$ are each independently selected from absent, a bond, alkyl, perfluoroalkyl, heteroalkyl, aryl, aralkyl, and a crosslinking moiety, provided that one of $R_{101b}$, $R_{102b}$, $R_{104b}$, and $R_{105b}$ is selected from a crosslinking moiety and a bond, wherein the bond is configured to connect to a crosslinking moiety; one of $R_{101b}$, $R_{102b}$, $R_{104b}$, and $R_{105b}$ is absent and the benzimidazolyl group including the absent $R_{101b}$, $R_{102b}$, $R_{104b}$, or $R_{105b}$ is neutral; and the remaining two of $R_{101b}$, $R_{102b}$, $R_{104b}$, and $R_{105b}$ are each independently selected from alkyl, perfluoroalkyl, heteroalkyl, aryl, and aralkyl;

$R_{101c}$, $R_{102c}$, $R_{104c}$, and $R_{105c}$ are each independently selected from a bond, alkyl, perfluoroalkyl, heteroalkyl, aryl, aralkyl, and a crosslinking moiety, provided that one of $R_{101c}$, $R_{102c}$, $R_{104c}$, and $R_{105c}$ is selected from a crosslinking moiety and a bond, wherein the bond is configured to connect to a crosslinking moiety; and the remaining three of $R_{101c}$, $R_{102c}$, $R_{104c}$, and $R_{105c}$ are each independently selected from alkyl, perfluoroalkyl, heteroalkyl, aryl, and aralkyl, $R_{101d}$, $R_{102d}$, $R_{104d}$, and $R_{105d}$ are each independently selected from alkyl, perfluoroalkyl, heteroalkyl, aryl, and aralkyl;

$R_{103a}$, $R_{106a}$, $R_{115a}$, $R_{117a}$, $R_{118a}$, $R_{119a}$, $R_{103b}$, $R_{106b}$, $R_{115b}$, $R_{117b}$, $R_{118b}$, $R_{119b}$, $R_{103c}$, $R_{106c}$, $R_{115c}$, $R_{117c}$, $R_{118c}$, $R_{119c}$, $R_{103d}$, $R_{106d}$, $R_{115d}$, $R_{117d}$, $R_{118d}$, and $R_{119d}$ are each independently selected from hydrogen, alkyl, perfluoroalkyl, heteroalkyl, aryl, aralkyl, and heteroaryl;

$R_{107a}$, $R_{110a}$, $R_{111a}$, $R_{114a}$, $R_{107b}$, $R_{110b}$, $R_{111b}$, $R_{114b}$, $R_{107c}$, $R_{110c}$, $R_{111c}$, $R_{114c}$, $R_{107d}$, $R_{110d}$, $R_{111d}$, and $R_{114d}$ are each independently selected from alkyl, perfluoroalkyl, heteroalkyl, alkoxy, perfluoroalkoxy, halo, aryl, and heteroaryl; and $R_{108a}$, $R_{109a}$, $R_{112a}$, $R_{113a}$, $R_{108b}$, $R_{109b}$, $R_{112b}$, $R_{113b}$, $R_{108c}$, $R_{109c}$, $R_{112c}$, $R_{113c}$, $R_{108d}$, $R_{109d}$, $R_{112d}$, and $R_{113d}$ are each independently selected from hydrogen, alkyl, perfluoroalkyl, and heteroalkyl, wherein the polymer includes including m mole percentage repeating units of Formula (D-A), n mole percentage repeating units of Formula (D-B), p mole percentage of repeating units (D-C), and q mole percentage of repeating units (D-D), and m is from 1 mole percent to 95 mole percent,
n is from 1 mole percent to 50 mole percent,
p is from 1 mole percent to 95 mole percent,
q is from 5 mole percent to 95 mole percent, and $m+n+p+q=100\%$.

In yet another aspect, the present disclosure features a crosslinked polymer including repeating units of Formula (I):

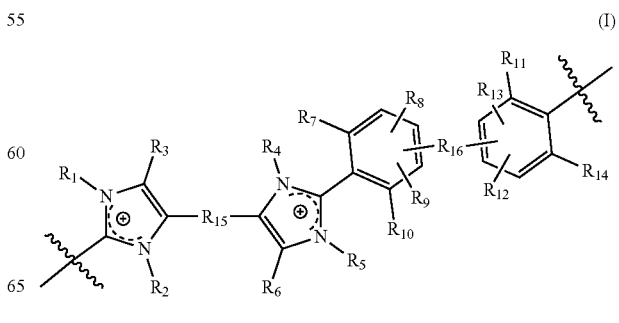

(I)

wherein in Formula (I):

$R_1$, $R_2$, $R_4$, and $R_5$ are each independently selected from absent, a bond, alkyl, perfluoroalkyl, heteroalkyl, aryl, aralkyl, and a crosslinking moiety, wherein the crosslinking moiety crosslinks a first repeating unit and a second repeating unit of Formula (I);

wherein in the first repeating unit of Formula (I), at least one of $R_1$, $R_2$, $R_4$, and $R_5$ is the crosslinking moiety; and in the second repeating unit of Formula (I), at least one of $R_1$, $R_2$, $R_4$, and $R_5$ is a bond connected to the crosslinking moiety on the first crosslinked repeating unit of Formula (I);

provided that at least one of $R_1$, $R_2$, $R_4$, and $R_5$ is selected from a crosslinking moiety and a bond, wherein the bond is configured to connect to a crosslinking moiety;

at least one of $R_1$ and $R_2$ is selected from alkyl, perfluoroalkyl, heteroalkyl, aryl, and aralkyl;

when one of $R_1$ and $R_2$ is absent, the imidazolyl group including the absent $R_1$ or $R_2$ is neutral;

at least one of $R_4$ and $R_5$ is selected from alkyl, perfluoroalkyl, heteroalkyl, aryl, and aralkyl; and when one of $R_4$ and $R_5$ is absent, the imidazolyl group including the absent $R_4$ or $R_5$ is neutral;

$R_3$ and $R_6$ are each independently selected from alkyl, perfluoroalkyl, heteroalkyl, aryl, aralkyl, and heteroaryl;

$R_{15}$ is selected from alkylene, perfluoroalkylene, heteroalkylene, arylene, aralkylene, and heteroarylene, each optionally substituted with 1, 2, 3, or 4 substituents independently selected from alkyl, perfluoroalkyl, heteroalkyl, and halo;

$R_{16}$ is selected from a bond, arylene, and heteroarylene, wherein said arylene and heteroarylene is each optionally substituted with 1, 2, 3, or 4 substituents independently selected from alkyl, perfluoroalkyl, heteroalkyl, and halo;

$R_7$, $R_{10}$, $R_{11}$, and $R_{14}$ are each independently selected from alkyl, perfluoroalkyl, and heteroalkyl; and $R_8$, $R_9$, $R_{12}$, and $R_{13}$ are each independently selected from hydrogen, alkyl, perfluoroalkyl, and heteroalkyl.

In yet another aspect, the present disclosure features a crosslinked polymer including repeating units of Formula (II):

wherein:

$R_1$, $R_2$, $R_4$, and $R_5$ are each independently selected from absent, a bond, alkyl, perfluoroalkyl, heteroalkyl, aryl, aralkyl, and a crosslinking moiety;

wherein the crosslinking moiety crosslinks a first repeating unit and a second repeating unit of Formula (II);

wherein in the first repeating unit of Formula (II), at least one of $R_1$, $R_2$, $R_4$, and $R_5$ is the crosslinking moiety; and in the second repeating unit of Formula (II), at least one of $R_1$, $R_2$, $R_4$, and $R_5$ is a bond connected to the crosslinking moiety on the first crosslinked repeating unit of Formula (II);

provided that at least one of $R_1$, $R_2$, $R_4$, and $R_5$ is selected from a crosslinking moiety and a bond, wherein the bond is configured to connect to a crosslinking moiety;

at least one of $R_1$ and $R_2$ is selected from alkyl, perfluoroalkyl, heteroalkyl, aryl, and aralkyl;

when one of $R_1$ and $R_2$ is absent, the imidazolyl group including the absent $R_1$ or $R_2$ is neutral, at least one of $R_4$ and $R_5$ is selected from alkyl, perfluoroalkyl, heteroalkyl, aryl, and aralkyl; and when one of $R_4$ and $R_5$ is absent, the imidazolyl group including the absent $R_4$ or $R_5$ is neutral;

$R_3$ and $R_6$ are each independently selected from alkyl, perfluoroalkyl, heteroalkyl, aryl, aralkyl, and heteroaryl;

$R_7$, $R_{10}$, $R_{11}$, and $R_{14}$ are each independently selected from alkyl, perfluoroalkyl, and heteroalkyl; and $R_8$ and $R_{12}$ are each independently selected from hydrogen, alkyl, perfluoroalkyl, and heteroalkyl.

In yet another aspect, the present disclosure features a crosslinked polymer including a repeating unit of Formula (III-A):

(II)

[Chemical structure of Formula (II) showing two imidazolium rings with substituents $R_1$–$R_6$ connected through phenylene groups to a biphenyl system with substituents $R_7$–$R_{14}$]

(III-A)

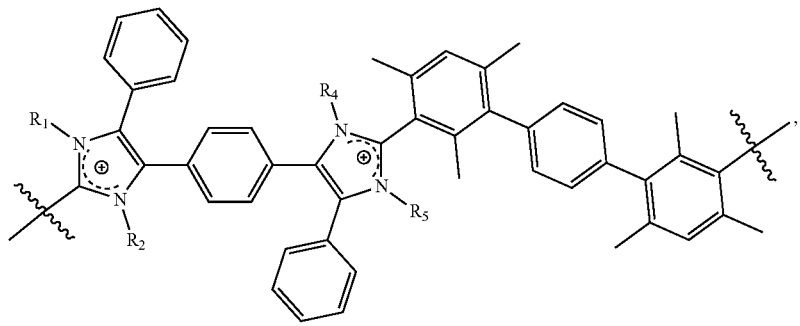

wherein $R_1$, $R_2$, $R_4$, and $R_5$ are each independently selected from a bond, methyl, and a crosslinking moiety, provided that two of $R_1$, $R_2$, $R_4$, and $R_5$ is each independently selected from a crosslinking moiety and a bond, wherein the bond is configured to connect to a crosslinking moiety; and the remaining two of $R_1$, $R_2$, $R_4$, and $R_5$ are each methyl.

In some embodiments, the crosslinked polymer including a repeating unit of Formula (III-A) further includes repeating units of Formula (III-B):

(III-B)

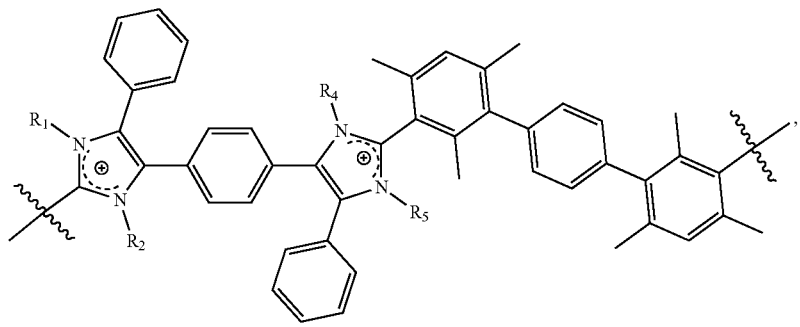

wherein $R_1$, $R_2$, $R_4$, and $R_5$ are each independently selected from absent, a bond, methyl, and a crosslinking moiety, provided that one of $R_1$, $R_2$, $R_4$, and $R_5$ is selected from a crosslinking moiety and a bond, wherein the bond is configured to connect to a crosslinking moiety;

one of $R_1$, $R_2$, $R_4$, and $R_5$ is absent and the imidazolyl group including the absent $R_1$, $R_2$, $R_4$, or $R_5$ is neutral; and the remaining two of $R_1$, $R_2$, $R_4$, and $R_5$ are each methyl.

In some embodiments, the crosslinked polymer including a repeating unit of Formula (III-A) and/or (III-B) further includes a repeating unit of Formula (III-C):

(III-C)

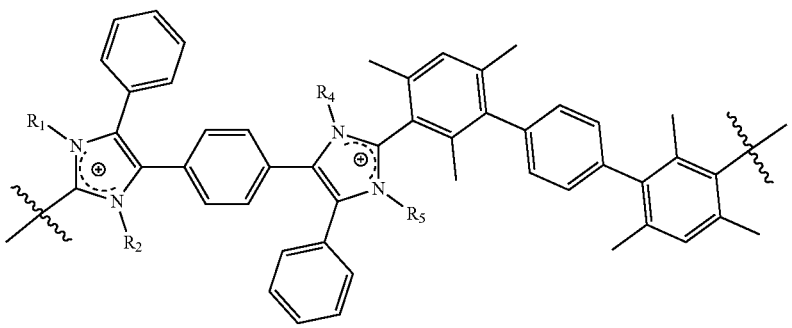

wherein $R_1$, $R_2$, $R_4$, and $R_5$ are each independently selected from a bond, methyl, and a crosslinking moiety, provided that one of $R_1$, $R_2$, $R_4$, and $R_5$ is selected from a crosslinking moiety and a bond, wherein the bond is configured to connect to a crosslinking moiety; and the remaining three of $R_1$, $R_2$, $R_4$, and $R_5$ are each methyl.

In some embodiments, the crosslinked polymer including a repeating unit of Formula (III-A), (III-B), and/or (III-C) further includes a repeating unit of Formula (III-D):

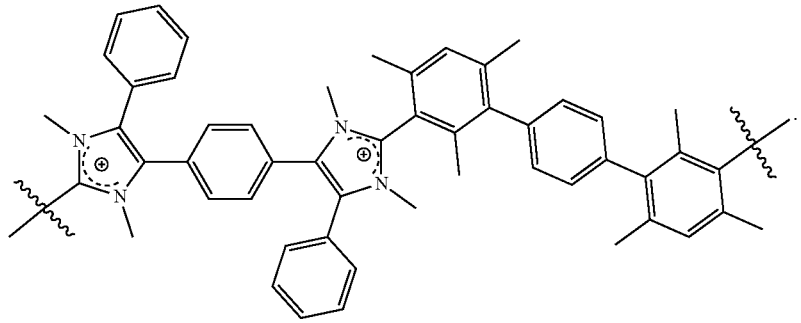

(III-D)

In yet a further aspect, the present disclosure features a crosslinked polymer including repeating units of Formula (IV-A), (IV-B), (IV-C), and (IV-D)

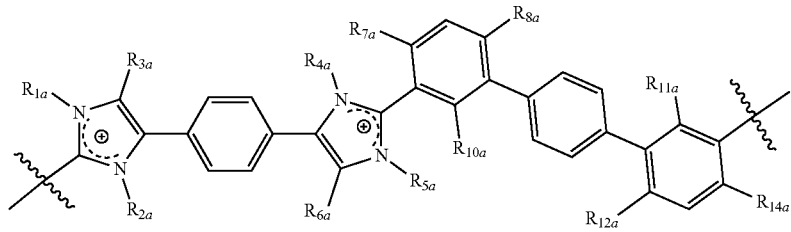

(IV-A)

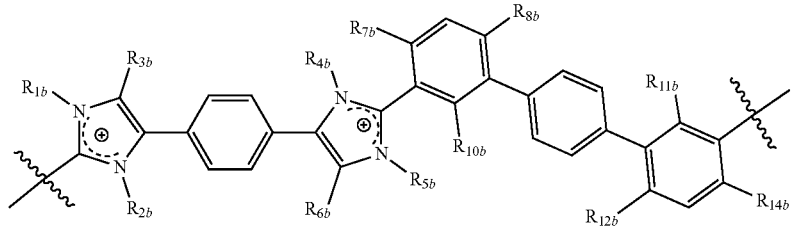

(IV-B)

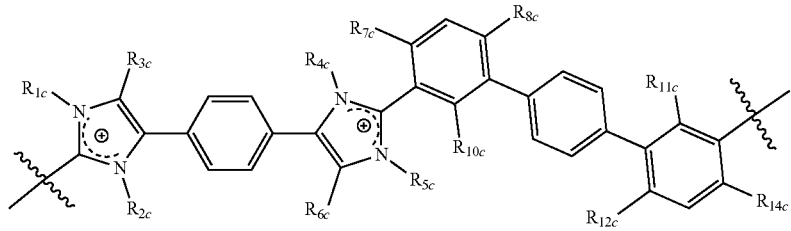

(IV-C)

-continued

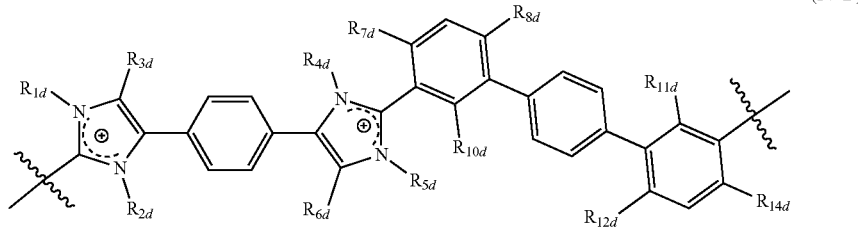

(IV-D)

wherein $R_{1a}$, $R_{2a}$, $R_{4a}$, and $R_{5a}$ are each independently selected from a bond, alkyl, perfluoroalkyl, heteroalkyl, aryl, aralkyl, and a crosslinking moiety, provided that two of $R_{1a}$, $R_{2a}$, $R_{4a}$, and $R_{5a}$ is each independently selected from a crosslinking moiety and a bond, wherein the bond is configured to connect to a crosslinking moiety; and the remaining two of $R_{1a}$, $R_{2a}$, $R_{4a}$, and $R_{5a}$ are each independently selected from alkyl, perfluoroalkyl, heteroalkyl, aryl, and aralkyl;

$R_{1b}$, $R_{2b}$, $R_{4b}$, and $R_{5b}$ are each independently selected from absent, a bond, alkyl, perfluoroalkyl, heteroalkyl, aryl, aralkyl, and a crosslinking moiety, provided that one of $R_{1b}$, $R_{2b}$, $R_{4b}$, and $R_{5b}$ is selected from a crosslinking moiety and a bond, wherein the bond is configured to connect to a crosslinking moiety; one of $R_{1b}$, $R_{2b}$, $R_{4b}$, and $R_{5b}$ is absent and the imidazolyl group including the absent $R_{1b}$, $R_{2b}$, $R_{4b}$, or $R_{5b}$ is neutral; and the remaining two of $R_{1b}$, $R_{2b}$, $R_{4b}$, and $R_{5b}$ are each independently selected from alkyl, perfluoroalkyl, heteroalkyl, aryl, and aralkyl;

$R_{1c}$, $R_{2c}$, $R_{4c}$, and $R_{5c}$ are each independently selected from a bond, alkyl, perfluoroalkyl, heteroalkyl, aryl, aralkyl, and a crosslinking moiety, provided that one of $R_{1c}$, $R_{2c}$, $R_{4c}$, and $R_{5e}$ is selected from a crosslinking moiety and a bond, wherein the bond is configured to connect to a crosslinking moiety; the remaining three of $R_{1c}$, $R_{2c}$, $R_{4c}$, and $R_{5c}$ are each independently selected from alkyl, perfluoroalkyl, heteroalkyl, aryl, and aralkyl, $R_{1d}$, $R_{2d}$, $R_{4d}$, and $R_{5d}$ are each independently selected from alkyl, perfluoroalkyl, heteroalkyl, aryl, and aralkyl;

$R_{3a}$, $R_{6a}$, $R_{3b}$, $R_{6b}$, $R_{3c}$, $R_{6c}$, $R_{3d}$, and $R_{6d}$ are each independently selected from alkyl, perfluoroalkyl, heteroalkyl, aryl, aralkyl, and heteroaryl;

$R_{7a}$, $R_{10a}$, $R_{11a}$, $R_{14a}$, $R_{7b}$, $R_{10b}$, $R_{11b}$, $R_{14b}$, $R_{7c}$, $R_{10c}$, $R_{11c}$, $R_{14c}$, $R_{7d}$, $R_{10d}$, $R_{11d}$, and $R_{14d}$ are each independently selected from alkyl, perfluoroalkyl, and heteroalkyl; and $R_{8a}$, $R_{12a}$, $R_{8b}$, $R_{12b}$, $R_{8c}$, $R_{12c}$, $R_{8d}$, and $R_{12d}$ are each independently selected from hydrogen, alkyl, perfluoroalkyl, and heteroalkyl, wherein the polymer includes including r mole percentage repeating units of Formula (IV-A), s mole percentage repeating units of Formula (IV-B), t mole percentage of repeating units (IV-C), and u mole percentage of repeating units (IV-D), and r is from 1 mole percent to 95 mole percent,
s is from 1 mole percent to 50 mole percent,
t is from 1 mole percent to 95 mole percent,
u is from 5 mole percent to 95 mole percent, and $r+s+t+u=100\%$.

In some embodiments, any of the above-described crosslinked polymers is substantially stable when subjected to an aqueous solution including from 1 M to 6 M hydroxide.

In a further aspect, the present disclosure features an ionic membrane including any one of the above-described crosslinked polymers. In some embodiments, the present disclosure features an ionomer including any one of the above-described crosslinked polymer. The ionomer can be incorporated into a catalyst layer of a fuel cell, of an electrolyzer, or of other electrochemical devices.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 1A is a graph of measured ion exchange capacity ($IEC_{Cl^-}$, points) and accessible fraction ($IEC_{Cl^-}/IEC_{Cl^-theoretical}$, bars) in chloride form as function of degree of functionalization (df) and degree of crosslinking (dx) for embodiments of the polymers of the present disclosure.

FIG. 1B is a graph of measured ion exchange capacity ($IEC_{Cl^-}$, points) and accessible fraction ($IEC_{Cl^-}/IEC_{Cl^-theoretical}$, bars) in chloride form as function of degree of functionalization (df) and degree of crosslinking (dx) for embodiments of the polymers of the present disclosure.

FIG. 1C is a graph of measured ion exchange capacity ($IEC_{Cl^-}$, points) and accessible fraction ($IEC_{Cl^-}/IEC_{Cl^-theoretical}$, bars) in chloride form as function of degree of functionalization (df) and degree of crosslinking (dx) for embodiments of the polymers of the present disclosure.

FIG. 1D is a graph of measured ion exchange capacity ($IEC_{Cl^-}$, points) and accessible fraction ($IEC_{Cl^-}/IEC_{Cl^-}$theoretical, bars) in chloride form as function of degree of functionalization (dl) and degree of crosslinking (dx) for embodiments of the polymers of the present disclosure.

FIG. 2A is a graph of volume swelling (Sxyz) at 25° C., 50° C., and 80° C. as a function of degree of functionalization (dq) and degree of crosslinking (dx), respectively, for embodiments of the polymers of the present disclosure. Arrows indicate dissolution at higher temperature.

FIG. 2B is a graph of volume swelling (Sxyz) at 25° C., 50° C., and 80° C. as a function of degree of functionalization (df) and degree of crosslinking (dx), respectively, for embodiments of the polymers of the present disclosure. Arrows indicate dissolution at higher temperature.

FIG. 2C is a graph of volume swelling (Sxyz) at 25° C., 50° C., and 80° C. as a function of degree of functionalization (df) and degree of crosslinking (dx), respectively, for embodiments of the polymers of the present disclosure. Arrows indicate dissolution at higher temperature.

FIG. 2D is a graph of volume swelling (Sxyz) at 25° C., 50° C., and 80° C. as a function of degree of functionalization (df) and degree of crosslinking (dx), respectively, for embodiments of the polymers of the present disclosure. Arrows indicate dissolution at higher temperature.

FIG. 3A is a graph of volume swelling $S_{xyz}$ in $H_2O$, ethanol (EtOH), methanol (MeOH) and dimethyl sulfoxide (DMSO) at room temperature of embodiments of the polymers of the present disclosure as a function degree of functionalization (df) and degree of crosslinking (dx). Non-crosslinked membranes dissolve quickly in organic solvents.

FIG. 3B is a graph of volume swelling $S_{xyz}$ in $H_2O$, EtOH, MeOH and DMSO at room temperature of embodiments of the polymers of the present disclosure as a function degree of functionalization (df) and degree of crosslinking (dx). Non-crosslinked membranes dissolve quickly in organic solvents.

FIG. 3C is a graph of volume swelling $S_{xyz}$ in $H_2O$, EtOH, MeOH and DMSO at room temperature of embodiments of the polymers of the present disclosure as a function degree of functionalization (df) and degree of crosslinking (dx). Non-crosslinked membranes dissolve quickly in organic solvents.

FIG. 4A is a graph of chloride conductivity ($\sigma_{Cl^-}$) at 25° C., 50° C. and 80° C. as function of degree of functionalization (df) and degree of crosslinking (dx), respectively, for embodiments of the polymers of the present disclosure. Arrows indicate dissolution at higher temperature.

FIG. 4B is a graph of chloride conductivity ($\sigma_{Cl^-}$) at 25° C., 50° C. and 80° C. as function of degree of functionalization (df) and degree of crosslinking (dx), respectively, for embodiments of the polymers of the present disclosure. Arrows indicate dissolution at higher temperature.

FIG. 4C is a graph of chloride conductivity ($\sigma_{Cl^-}$) at 25° C., 50° C. and 80° C. as function of degree of functionalization (df) and degree of crosslinking (dx), respectively, for embodiments of the polymers of the present disclosure. Arrows indicate dissolution at higher temperature.

FIG. 4D is a graph of chloride conductivity ($\sigma_{Cl^-}$) at 25° C., 50° C. and 80° C. as function of degree of functionalization (df) and degree of crosslinking (dx), respectively, for embodiments of the polymers of the present disclosure. Arrows indicate dissolution at higher temperature.

FIG. 6A is a graph of chloride conductivity ($\sigma_{Cl^-}$) of post-methylated membranes including the polymers of the present disclosure (Series D) at 25° C., 50° C. and 80° C. as function of relative humidity (RH). Red arrows indicate dissolution at higher temperature.

FIG. 6B is a graph of chloride conductivity ($\sigma_{Cl^-}$) of post-methylated membranes including the polymers of the present disclosure (Series D) at 25° C., 50° C. and 80° C. as function of relative humidity (RH). Red arrows indicate dissolution at higher temperature.

FIG. 6C is a graph of chloride conductivity ($\sigma_{Cl^-}$) of post-methylated membranes including the polymers of the present disclosure (Series D) at 25° C., 50° C. and 80° C. as function of relative humidity (RH). Red arrows indicate dissolution at higher temperature.

FIG. 6D is a chloride conductivity ($\sigma_{Cl^-}$) of post-methylated membranes including the polymers of the present disclosure (Series D) at 25° C., 50° C. and 80° C. as function of relative humidity (RH). Red arrows indicate dissolution at higher temperature.

DETAILED DESCRIPTION

Figure 5A:
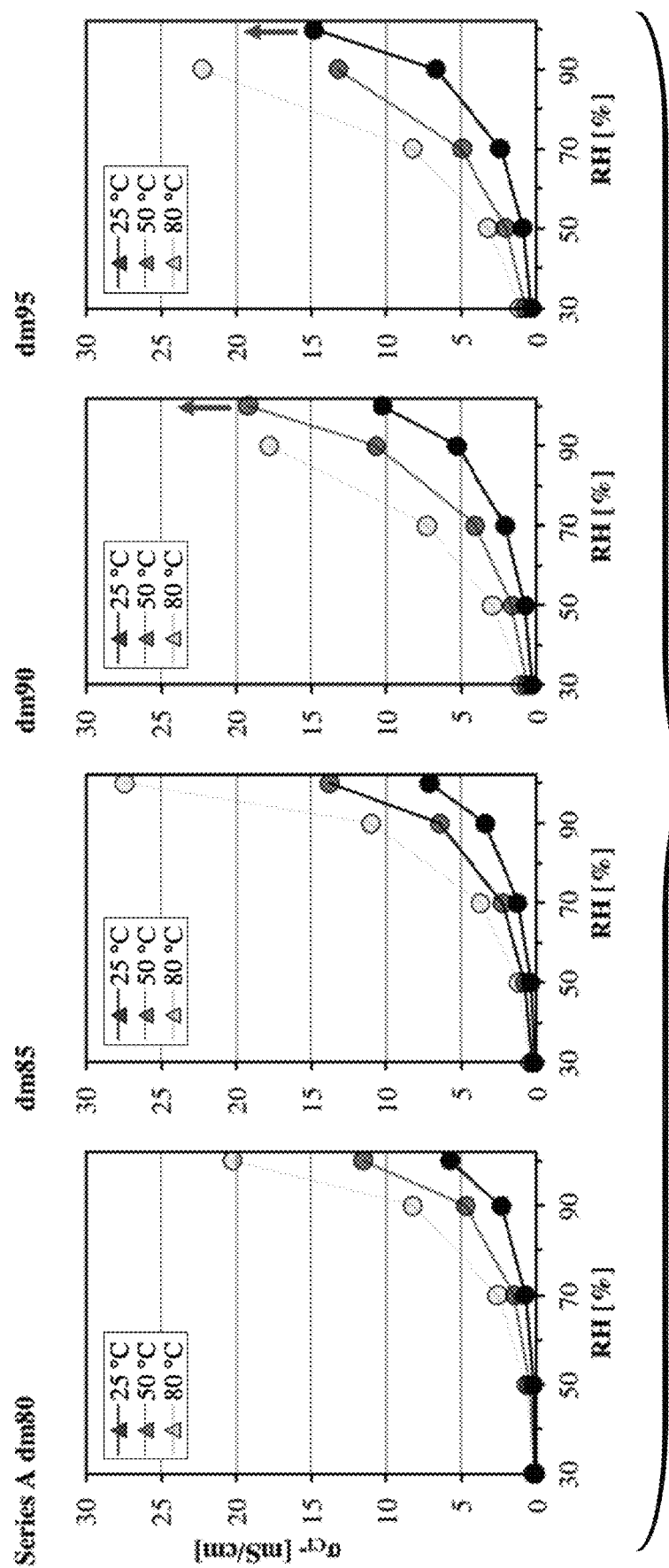
FIG. 5A is a graph of chloride conductivity ($\sigma_{Cl^-}$) of embodiments of the polymers of the present disclosure (Series A) at 25° C., 50° C. and 80° C. as function of relative humidity (RH). Arrows indicate dissolution at higher temperature.

Described herein are crosslinked alkylated poly(benzimidazole) and poly(imidazole) polymer materials and devices (e.g., fuel cells, water electrolyzers) including these polymer materials. The polymer materials can be prepared in a convenient manner, allowing for applications such as anion exchange membranes (AEMs). The membranes provide high anion conductivities over a wider range of operating conditions when compared to the analogous membranes that are not crosslinked. The crosslinked polymer materials have improved alkaline stability, when compared to the analogous non-crosslinked polymer materials.

Definitions

At various places in the present specification, substituents of compounds of the disclosure are disclosed in groups or in ranges. It is specifically intended that the disclosure include each and every individual subcombination of the members of such groups and ranges. For example, the term "$C_{1-6}$ alkyl" is specifically intended to individually disclose methyl, ethyl, $C_3$ alkyl, $C_4$ alkyl, $C_5$ alkyl, and $C_6$ alkyl.

It is further intended that the compounds of the disclosure are stable. As used herein "stable" refers to a compound that is sufficiently robust to survive isolation to a useful degree of purity from a reaction mixture.

It is further appreciated that certain features of the disclosure, which are, for clarity, described in the context of separate embodiments, can also be provided in combination in a single embodiment. Conversely, various features of the disclosure which are, for brevity, described in the context of a single embodiment, can also be provided separately or in any suitable subcombination.

"Optionally substituted" groups can refer to, for example, functional groups that may be substituted or unsubstituted by additional functional groups. For example, when a group is unsubstituted, it can be referred to as the group name, for example alkyl or aryl. When a group is substituted with additional functional groups, it may more generically be referred to as substituted alkyl or substituted aryl.

As used herein, the term "substituted" or "substitution" refers to the replacing of a hydrogen atom with a substituent other than H. For example, an "N-substituted piperidin-4-yl"

refers to replacement of the H atom from the NH of the piperidinyl with a non-hydrogen substituent such as, for example, alkyl.

As used herein, the term "alkyl" refers to a straight or branched hydrocarbon groups. In some embodiments, alkyl has 1 to 10 carbon atoms (e.g., 1 to 8 carbon atoms, 1 to 6 carbon atoms, 1 to 3 carbon atoms, 1 or 2 carbon atoms, or 1 carbon atom). Representative alkyl groups include methyl, ethyl, propyl (e.g., n-propyl, isopropyl), butyl (e.g., n-butyl, sec-butyl, and tert-butyl), pentyl (e.g., n-pentyl, tert-pentyl, neopentyl, isopentyl, pentan-2-yl, pentan-3-yl), and hexyl (e.g., n-hexyl and isomers) groups.

As used herein, the term "alkylene" refers to a linking alkyl group.

As used herein, the term "cycloalkyl" refers to non-aromatic carbocycles including cyclized alkyl, alkenyl, and alkynyl groups. Cycloalkyl groups can include mono- or polycyclic (e.g., having 2, 3 or 4 fused rings) ring systems, including spirocycles. In some embodiments, cycloalkyl groups can have from 3 to about 20 carbon atoms, 3 to about 14 carbon atoms, 3 to about 10 carbon atoms, or 3 to 7 carbon atoms. Cycloalkyl groups can further have 0, 1, 2, or 3 double bonds and/or 0, 1, or 2 triple bonds. Also included in the definition of cycloalkyl are moieties that have one or more aromatic rings fused (i.e., having a bond in common with) to the cycloalkyl ring, for example, benzo derivatives of pentane, pentene, hexane, and the like. A cycloalkyl group having one or more fused aromatic rings can be attached though either the aromatic or non-aromatic portion. One or more ring-forming carbon atoms of a cycloalkyl group can be oxidized, for example, having an oxo or sulfido substituent. Example cycloalkyl groups include cyclopropyl, cyclobutyl, cyclopentyl, cyclohexyl, cycloheptyl, cyclopentenyl, cyclohexenyl, cyclohexadienyl, cycloheptatrienyl, norbornyl, norpinyl, norcamyl, adamantyl, and the like.

As used herein, the term "cycloalkylene" refers to a linking cycloalkyl group.

As used herein, the term "perfluoroalkyl" refers to straight or branched fluorocarbon chains. In some embodiments, perfluoroalkyl has 1 to 10 carbon atoms (e.g., 1 to 8 carbon atoms, 1 to 6 carbon atoms, 1 to 3 carbon atoms, 1 or 2 carbon atoms, or 1 carbon atom). Representative alkyl groups include trifluoromethyl, pentafluoroethyl, etc.

As used herein, the term "perfluoroalkylene" refers to a linking perfluoroalkyl group.

As used herein, the term "heteroalkyl" refers to a straight or branched chain alkyl groups and where one or more of the carbon atoms is replaced with a heteroatom selected from O, N, and S. In some embodiments, heteroalkyl alkyl has 1 to 10 carbon atoms (e.g., 1 to 8 carbon atoms, 1 to 6 carbon atoms, 1 to 3 carbon atoms, 1 or 2 carbon atoms, or 1 carbon atom).

As used herein, the term "heteroalkylene" refers to a linking heteroalkyl group.

As used herein, the term "alkoxy" refers to an alkyl or cycloalkyl group as described herein bonded to an oxygen atom. In some embodiments, alkoxy has 1 to 10 carbon atoms (e.g., 1 to 8 carbon atoms, 1 to 6 carbon atoms, 1 to 3 carbon atoms, 1 or 2 carbon atoms, or 1 carbon atom). Representative alkoxy groups include methoxy, ethoxy, propoxy, and isopropoxy groups.

As used herein, the term "perfluoroalkoxy" refers to a perfluoroalkyl or cyclic perfluoroalkyl group as described herein bonded to an oxygen atom. In some embodiments, perfluoroalkoxy has 1 to 10 carbon atoms (e.g., 1 to 8 carbon atoms, 1 to 6 carbon atoms, 1 to 3 carbon atoms, 1 or 2 carbon atoms, or 1 carbon atom). Representative perfluoroalkoxy groups include trifluoromethoxy, pentafluoroethoxy, etc.

As used herein, the term "aryl" refers to an aromatic hydrocarbon group having 6 to 10 carbon atoms. Representative aryl groups include phenyl groups. In some embodiments, the term "aryl" includes monocyclic or polycyclic (e.g., having 2, 3, or 4 fused rings) aromatic hydrocarbons such as, for example, phenyl, naphthyl, anthracenyl, phenanthrenyl, indanyl, and indenyl.

As used herein, the term "arylene" refers to a linking aryl group.

As used herein, the term "aralkyl" refers to an alkyl or cycloalkyl group as defined herein with an aryl group as defined herein substituted for one of the alkyl hydrogen atoms. A representative aralkyl group is a benzyl group.

As used herein, the term "aralkylene" refers to a linking aralkyl group.

As used herein, the term "heteroaryl" refers to a 5- to 10-membered aromatic monocyclic or bicyclic ring containing 1-4 heteroatoms selected from O, S, and N. Representative 5- or 6-membered aromatic monocyclic ring groups include pyridine, pyrimidine, pyridazine, furan, thiophene, thiazole, oxazole, and isooxazole. Representative 9- or 10-membered aromatic bicyclic ring groups include benzofuran, benzothiophene, indole, pyranopyrrole, benzopyran, quinoline, benzocyclohexyl, and naphthyridine.

As used herein, the term "heteroarylene" refers to a linking heteroaryl group.

As used herein, the term "halogen" or "halo" refers to fluoro, chloro, bromo, and iodo groups.

As used herein, the term "bulky group" refers to a group providing steric bulk by having a size at least as large as a methyl group.

As used herein, the term "copolymer" refers to a polymer that is the result of polymerization of two or more different monomers. The number and the nature of each constitutional unit can be separately controlled in a copolymer. The constitutional units can be disposed in a purely random, an alternating random, a regular alternating, a regular block, or a random block configuration unless expressly stated to be otherwise. A purely random configuration can, for example, be: x-x-y-z-x-y-y-z-y-z-z-z . . . or y-z-x-y-z-y-z-x-x . . . . An alternating random configuration can be: x-y-x-z-y-x-y-z-y-x-z . . . , and a regular alternating configuration can be: x-y-z-x-y-z-x-y-z . . . . A regular block configuration (i.e., a block copolymer) has the following general configuration: . . . x-x-x-y-y-y-z-z-z-x-x-x . . . , while a random block configuration has the general configuration: . . . x-x-x-z-z-x-x-y-y-y-z-z-z-x-x-z-z-z- . . . .

As used herein, the term "random copolymer" is a copolymer having an uncontrolled mixture of two or more constitutional units. The distribution of the constitutional units throughout a polymer backbone (or main chain) can be a statistical distribution, or approach a statistical distribution, of the constitutional units. In some embodiments, the distribution of one or more of the constitutional units is favored.

As used herein, the term "constitutional unit" of a polymer refers to an atom or group of atoms in a polymer, comprising a part of the chain together with its pendant atoms or groups of atoms, if any. The constitutional unit can refer to a repeating unit. The constitutional unit can also refer to an end group on a polymer chain. For example, the constitutional unit of polyethylene glycol can be —CH$_2$CH$_2$O— corresponding to a repeating unit within a polymer chain, or —CH$_2$CH$_2$OH corresponding to an end group.

As used herein, the term "repeating unit" corresponds to the smallest constitutional unit, the repetition of which constitutes a regular macromolecule (or oligomer molecule or block).

As used herein, the term "end group" refers to a constitutional unit with only one attachment to a polymer chain, located at the end of a polymer. For example, the end group can be derived from a monomer unit at the end of the polymer, once the monomer unit has been polymerized. As another example, the end group can be a part of a chain transfer agent or initiating agent that was used to synthesize the polymer.

As used herein, the term "terminus" of a polymer refers to a constitutional unit of the polymer that is positioned at the end of a polymer backbone.

As used herein, the term "cationic" refers to a moiety that is positively charged, or ionizable to a positively charged moiety under physiological conditions. Examples of cationic moieties include, for example, amino, ammonium, pyridinium, imino, sulfonium, quaternary phosphonium groups, etc.

As used herein, the term "anionic" refers to a functional group that is negatively charged, or ionizable to a negatively charged moiety under physiological conditions. Examples of anionic groups include carboxylate, sulfate, sulfonate, phosphate, etc.

As used herein, the term "crosslinking moiety" refers to moieties that contain at least two reactive groups that are covalently bound to two repeating units on a given polymer or on two different polymers.

As used herein, when a benzimidazolium or an imidazolium is positively charged, for example, as illustrated below for an imidazolium,

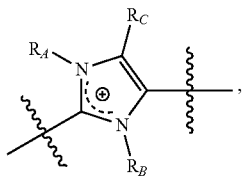

it is understood that the illustrated structure encompasses a double bond that may be located in one of two positions and the positive charge is consequently localized on one of the two ring-forming nitrogen atoms:

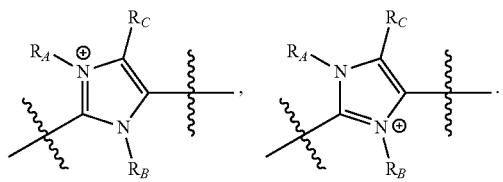

And when a benzimidazolium has a ring-forming nitrogen atom that is positively charged, it is understood that that the double bond may be located in one of two positions and the positive charge is consequently localized on one of the ring-forming nitrogen atoms:

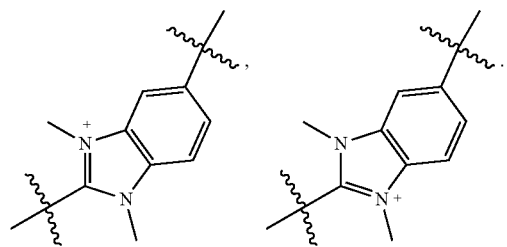

The positive charge can also be illustrated as delocalized between the two ring-forming nitrogen atoms in the benzimidazolium:

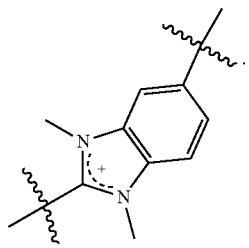 [SMILES: *c1ccc2c(c1)N(C)C(*)N2C]

As used herein, "degree of methylation" (dm) refers to the percentage of N-methylation of, for example, an embodiment of a polymer of the present disclosure. Thus, if all the ring-forming nitrogen atoms in the benzimidazole moieties or the imidazole moieties of a polymer are methylated, then the degree of methylation is 100%. If half of the ring-forming nitrogen atoms in the benzimidazole moieties or the imidazole moieties of a polymer are methylated, then the degree of methylation is 50%.

As used herein, the term "consisting essentially of" or "consists essentially of" refers to a composition including the components of which it consists essentially as well as other components, provided that the other components do not materially affect the essential characteristics of the composition. Typically, a composition consisting essentially of certain components will comprise greater than or equal to 95 wt % of those components or greater than or equal to 99 wt % of those components.

Unless otherwise defined, all technical and scientific terms used herein have the same meaning as commonly understood by one of ordinary skill in the art. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Polymers

The present disclosure features a crosslinked polymer including (or consisting essentially of or consisting of) repeating units of Formula (A):

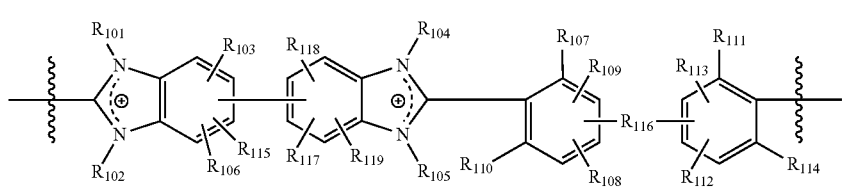

(A)

wherein $R_{101}$, $R_{102}$, $R_{104}$, and $R_{105}$ are each independently selected from absent, a bond, alkyl, perfluoroalkyl, heteroalkyl, aryl, aralkyl, and a crosslinking moiety;

wherein the crosslinking moiety crosslinks a first repeating unit and a second repeating unit of Formula (A), the first and second repeating units can be on the same polymer chain or on different polymer chains, wherein $R_{107}$, $R_{110}$, $R_{111}$, and $R_{114}$ are each independently selected from alkyl, perfluoroalkyl, heteroalkyl, alkoxy, perfluoroalkoxy, halo, aryl, and heteroaryl; and $R_{108}$, $R_{109}$, $R_{112}$, and $R_{113}$ are each independently selected from hydrogen (H), alkyl, perfluoroalkyl, and heteroalkyl.

In some embodiments, the crosslinked polymer including (or consisting essentially of, or consisting of) repeating units of Formula (A) includes repeating units of Formula (A-A):

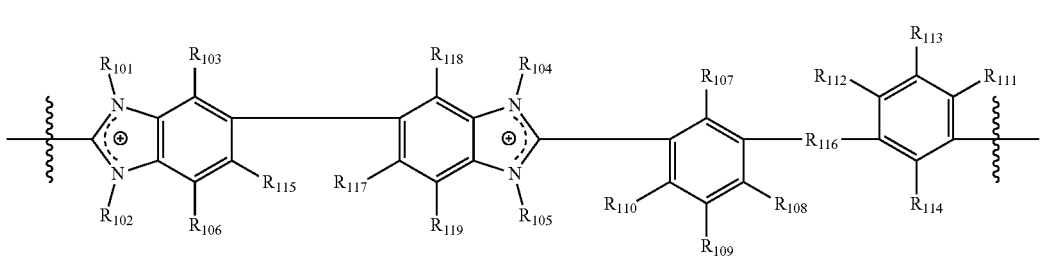

(A-A)

in the first repeating unit of Formula (A), at least one of $R_{101}$, $R_{102}$, $R_{104}$, and $R_{105}$ is the crosslinking moiety; and in the second repeating unit of Formula (A), at least one of $R_{101}$, $R_{102}$, $R_{104}$, and $R_{105}$ is a bond connected to the crosslinking moiety on the first crosslinked repeating unit of Formula (A);

provided that at least one of $R_{101}$, $R_{102}$, $R_{104}$, and $R_{105}$ is selected from a crosslinking moiety and a bond, wherein the bond is configured to connect to a crosslinking moiety (the crosslinking moiety can be on the same polymer chain or on a different polymer chain);

at least one of $R_{101}$ and $R_{102}$ is selected from alkyl, perfluoroalkyl, heteroalkyl, aryl, and aralkyl;

when one of $R_{101}$ and $R_{102}$ is absent, the benzimidazolyl group including the absent $R_{101}$ or $R_{102}$ (i.e., the benzimidazolyl group where one of its $R_{101}$ or $R_{102}$ is absent) is neutral;

at least one of $R_{104}$ and $R_{105}$ is selected from alkyl, perfluoroalkyl, heteroalkyl, aryl, and aralkyl; and when one of $R_{104}$ and $R_{105}$ is absent, the benzimidazolyl group including the absent $R_{104}$ or $R_{105}$ (i.e., the benzimidazolyl group where one of its $R_{104}$ or $R_{105}$ is absent) is neutral;

$R_{103}$, $R_{106}$, $R_{115}$, $R_{117}$, $R_{118}$, and $R_{119}$ are each independently selected from hydrogen (H), alkyl, perfluoroalkyl, heteroalkyl, aryl, aralkyl, and heteroaryl;

$R_{116}$ is selected from a bond, alkylene, perfluoroalkylene, heteroalkylene, arylene, aralkylene, and heteroarylene, wherein said alkylene, perfluoroalkylene, heteroalkylene, arylene, aralkylene, and heteroarylene is each optionally substituted with 1, 2, 3, or 4 substituents independently selected from alkyl, perfluoroalkyl, heteroalkyl, and halo;

wherein $R_{101}$, $R_{102}$, $R_{104}$, and $R_{105}$ are each independently selected from absent, a bond, alkyl, perfluoroalkyl, heteroalkyl, aryl, aralkyl, and a crosslinking moiety;

wherein the crosslinking moiety crosslinks a first repeating unit and a second repeating unit of Formula (A-A), the first and second repeating units can be on the same polymer chain or on different polymer chains, wherein in the first repeating unit of Formula (A-A), at least one of $R_{101}$, $R_{102}$, $R_{104}$, and $R_{105}$ is the crosslinking moiety; and in the second repeating unit of Formula (A-A), at least one of $R_{101}$, $R_{102}$, $R_{104}$, and $R_{105}$ is a bond connected to the crosslinking moiety on the first crosslinked repeating unit of Formula (A-A);

provided that at least one of $R_{101}$, $R_{102}$, $R_{104}$, and $R_{105}$ is selected from a crosslinking moiety and a bond, wherein the bond is configured to connect to a crosslinking moiety (the crosslinking moiety can be on the same polymer chain or on a different polymer chain);

at least one of $R_{101}$ and $R_{102}$ is selected from alkyl, perfluoroalkyl, heteroalkyl, aryl, and aralkyl;

when one of $R_{101}$ and $R_{102}$ is absent, the benzimidazolyl group including the absent $R_{101}$ or $R_{102}$ is neutral (i.e., the benzimidazolyl group where one of its $R_{101}$ or $R_{102}$ is absent);

at least one of $R_{104}$ and $R_{105}$ is selected from alkyl, perfluoroalkyl, heteroalkyl, aryl, and aralkyl; and when one of $R_{104}$ and $R_{105}$ is absent, the benzimidazolyl group including the absent $R_{104}$ or $R_{105}$ is neutral (i.e., the benzimidazolyl group where one of its one of $R_{104}$ or $R_{105}$ is absent);

$R_{103}$, $R_{106}$, $R_{115}$, $R_{117}$, $R_{118}$, and $R_{119}$ are each independently selected from hydrogen (H), alkyl, perfluoroalkyl, heteroalkyl, aryl, aralkyl, and heteroaryl;

$R_{116}$ is selected from a bond, alkylene, perfluoroalkylene, heteroalkylene, arylene, aralkylene, and heteroarylene, wherein said alkylene, perfluoroalkylene, heteroalkylene, arylene, aralkylene, and heteroarylene is each optionally substituted with 1, 2, 3, or 4 substituents independently selected from alkyl, perfluoroalkyl, heteroalkyl, and halo;

$R_{107}$, $R_{110}$, $R_{111}$, and $R_{114}$ are each independently selected from alkyl, perfluoroalkyl, heteroalkyl, alkoxy, perfluoroalkoxy, halo, aryl, and heteroaryl; and $R_{108}$, $R_{109}$, $R_{112}$, and $R_{113}$ are each independently selected from hydrogen (H), alkyl, perfluoroalkyl, and heteroalkyl.

In some embodiments, the crosslinked polymer including (or consisting essentially of, or consisting of) repeating units of Formula (A) includes repeating units of Formula (A-B):

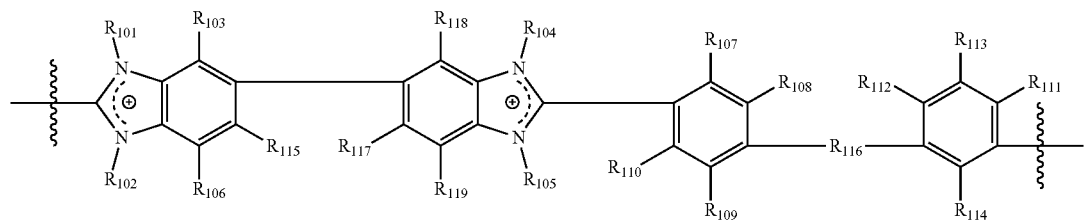

(A-B)

wherein $R_{101}$, $R_{102}$, $R_{104}$, and $R_{105}$ are each independently selected from absent, a bond, alkyl, perfluoroalkyl, heteroalkyl, aryl, aralkyl, and a crosslinking moiety;

wherein the crosslinking moiety crosslinks a first repeating unit and a second repeating unit of Formula (A-B), the first and second repeating units can be on the same polymer chain or on different polymer chains, wherein in the first repeating unit of Formula (A-B), at least one of $R_{101}$, $R_{102}$, $R_{104}$, and $R_{105}$ is the crosslinking moiety; and in the second repeating unit of Formula (A-B), at least one of $R_{101}$, $R_{102}$, $R_{104}$, and $R_{105}$ is a bond connected to the crosslinking moiety on the first crosslinked repeating unit of Formula (A-B);

provided that at least one of $R_{101}$, $R_{102}$, $R_{104}$, and $R_{105}$ is selected from a crosslinking moiety and a bond, wherein the bond is configured to connect to a crosslinking moiety (the crosslinking moiety can be on the same polymer chain or on a different polymer chain);

at least one of $R_{101}$ and $R_{102}$ is selected from alkyl, perfluoroalkyl, heteroalkyl, aryl, and aralkyl;

when one of $R_{101}$ and $R_{102}$ is absent, the benzimidazolyl group including the absent $R_{101}$ or $R_{102}$ is neutral (i.e., the benzimidazolyl group where one of its $R_{101}$ or $R_{102}$ is absent is neutral);

at least one of $R_{104}$ and $R_{105}$ is selected from alkyl, perfluoroalkyl, heteroalkyl, aryl, and aralkyl; and when one of $R_{104}$ and $R_{105}$ is absent, the benzimidazolyl group including the absent $R_{104}$ or $R_{105}$ is neutral (i.e., the benzimidazolyl group where one of its $R_{104}$ or $R_{105}$ is absent is neutral);

$R_{103}$, $R_{106}$, $R_{115}$, $R_{117}$, $R_{118}$, and $R_{119}$ are each independently selected from hydrogen (H), alkyl, perfluoroalkyl, heteroalkyl, aryl, aralkyl, and heteroaryl;

$R_{116}$ is selected from a bond, alkylene, perfluoroalkylene, heteroalkylene, arylene, aralkylene, and heteroarylene, wherein said alkylene, perfluoroalkylene, heteroalkylene, arylene, aralkylene, and heteroarylene is each optionally substituted with 1, 2, 3, or 4 substituents independently selected from alkyl, perfluoroalkyl, heteroalkyl, and halo;

$R_{107}$, $R_{110}$, $R_{111}$, and $R_{114}$ are each independently selected from alkyl, perfluoroalkyl, heteroalkyl, alkoxy, perfluoroalkoxy, halo, aryl, and heteroaryl; and $R_{108}$, $R_{109}$, $R_{112}$, and $R_{113}$ are each independently selected from hydrogen (H), alkyl, perfluoroalkyl, and heteroalkyl.

In some embodiments, the crosslinked polymer including (or consisting essentially of, or consisting of) repeating units of Formula (A) includes repeating units of Formula (A-C):

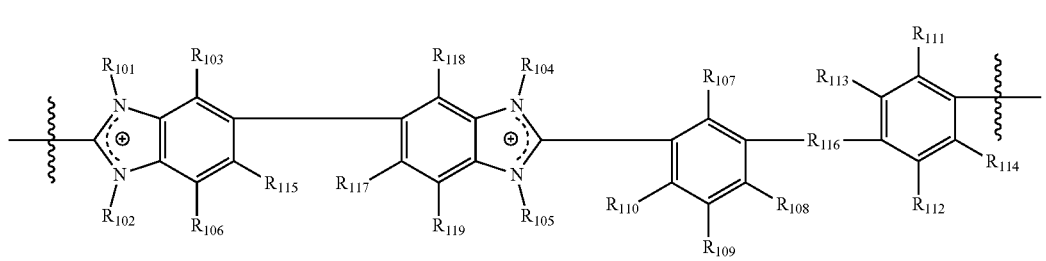

(A-C)

wherein $R_{101}$, $R_{102}$, $R_{104}$, and $R_{105}$ are each independently selected from absent, a bond, alkyl, perfluoroalkyl, heteroalkyl, aryl, aralkyl, and a crosslinking moiety;

wherein the crosslinking moiety crosslinks a first repeating unit and a second repeating unit of Formula (A-C), the first and second repeating units can be on the same polymer chain or on different polymer chains, wherein in the first repeating unit of Formula (A-C), at least one of $R_{101}$, $R_{102}$, $R_{104}$, and $R_{105}$ is the crosslinking moiety; and in the second repeating unit of Formula (A-C), at least one of $R_{101}$, $R_{102}$, $R_{104}$, and $R_{105}$ is a bond connected to the crosslinking moiety on the first crosslinked repeating unit of Formula (A-C);

provided that at least one of $R_{101}$, $R_{102}$, $R_{104}$, and $R_{105}$ is selected from a crosslinking moiety and a bond, wherein the bond is configured to connect to a crosslinking moiety (the crosslinking moiety can be on the same polymer chain or on a different polymer chain);

at least one of $R_{101}$ and $R_{102}$ is selected from alkyl, perfluoroalkyl, heteroalkyl, aryl, and aralkyl;

when one of $R_{101}$ and $R_{102}$ is absent, the benzimidazolyl group including the absent $R_{101}$ or $R_{102}$ is neutral (i.e., the benzimidazolyl group where one of its $R_{101}$ or $R_{102}$ is absent is neutral);

at least one of $R_{104}$ and $R_{105}$ is selected from alkyl, perfluoroalkyl, heteroalkyl, aryl, and aralkyl; and when one of $R_{104}$ and $R_{105}$ is absent, the benzimidazolyl group including the absent $R_{104}$ or $R_{105}$ is neutral (i.e., the benzimidazolyl group where one of its $R_{104}$ or $R_{105}$ is absent is neutral);

$R_{103}$, $R_{106}$, $R_{115}$, $R_{117}$, $R_{118}$, and $R_{119}$ are each independently selected from hydrogen (H), alkyl, perfluoroalkyl, heteroalkyl, aryl, aralkyl, and heteroaryl;

$R_{116}$ is selected from a bond, alkylene, perfluoroalkylene, heteroalkylene, arylene, aralkylene, and heteroarylene, wherein said alkylene, perfluoroalkylene, heteroalkylene, arylene, aralkylene, and heteroarylene is each optionally substituted with 1, 2, 3, or 4 substituents independently selected from alkyl, perfluoroalkyl, heteroalkyl, and halo;

$R_{107}$, $R_{110}$, $R_{111}$, and $R_{114}$ are each independently selected from alkyl, perfluoroalkyl, heteroalkyl, alkoxy, perfluoroalkoxy, halo, aryl, and heteroaryl; and $R_{108}$, $R_{109}$, $R_{112}$, and $R_{113}$ are each independently selected from hydrogen (H), alkyl, perfluoroalkyl, and heteroalkyl.

In some embodiments, the crosslinked polymer including (or consisting essentially of, or consisting of) repeating units of Formula (A) includes repeating units of Formula (A-D):

in the second repeating unit of Formula (A-D), at least one of $R_{101}$, $R_{102}$, $R_{104}$, and $R_{105}$ is a bond connected to the crosslinking moiety on the first crosslinked repeating unit of Formula (A-D);

provided that at least one of $R_{101}$, $R_{102}$, $R_{104}$, and $R_{105}$ is selected from a crosslinking moiety and a bond, wherein the bond is configured to connect to a crosslinking moiety (the crosslinking moiety can be on the same polymer chain or on a different polymer chain);

at least one of $R_{101}$ and $R_{102}$ is selected from alkyl, perfluoroalkyl, heteroalkyl, aryl, and aralkyl;

when one of $R_{101}$ and $R_{102}$ is absent, the benzimidazolyl group including the absent $R_{101}$ or $R_{102}$ is neutral (i.e., the benzimidazolyl group where one of its $R_{101}$ or $R_{102}$ is absent is neutral);

at least one of $R_{104}$ and $R_{105}$ is selected from alkyl, perfluoroalkyl, heteroalkyl, aryl, and aralkyl; and when one of $R_{104}$ and $R_{105}$ is absent, the benzimidazolyl group including the absent $R_{104}$ or $R_{105}$ is neutral (i.e., the benzimidazolyl group where one of its $R_{104}$ or $R_{105}$ is absent is neutral);

$R_{103}$, $R_{106}$, $R_{115}$, $R_{117}$, $R_{118}$, and $R_{119}$ are each independently selected from hydrogen (H), alkyl, perfluoroalkyl, heteroalkyl, aryl, aralkyl, and heteroaryl;

$R_{116}$ is selected from a bond, alkylene, perfluoroalkylene, heteroalkylene, arylene, aralkylene, and heteroarylene, wherein said alkylene, perfluoroalkylene, heteroalkylene, arylene, aralkylene, and heteroarylene is each optionally substituted with 1, 2, 3, or 4 substituents independently selected from alkyl, perfluoroalkyl, heteroalkyl, and halo;

$R_{107}$, $R_{11}$, $R_{111}$, and $R_{114}$ are each independently selected from alkyl, perfluoroalkyl, heteroalkyl, alkoxy, perfluoroalkoxy, halo, aryl, and heteroaryl; and $R_{108}$, $R_{109}$, $R_{112}$, and $R_{113}$ are each independently selected from hydrogen (H), alkyl, perfluoroalkyl, and heteroalkyl.

The polymer of Formula (A) can have (or consisting essentially of, or consisting of) a mixture of repeating units of Formulas (A-A), (A-B), (A-C), and/or (A-D). For example, the polymer can include (or consisting essentially of, or consisting of) repeating units of Formulas (A-A), (A-B), (A-C), and (A-D); Formulas (A-A), (A-B), and

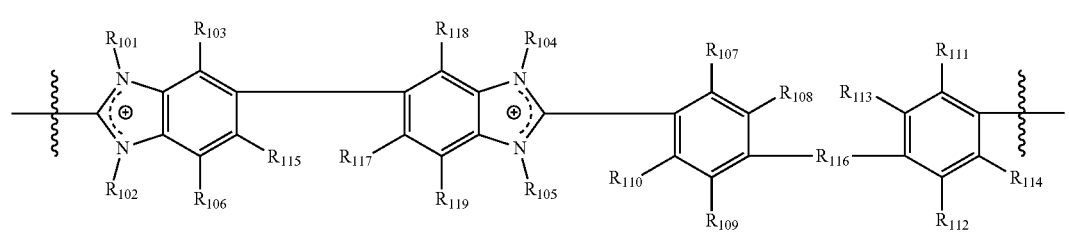

(A-D)

wherein $R_{101}$, $R_{102}$, $R_{104}$, and $R_{105}$ are each independently selected from absent, a bond, alkyl, perfluoroalkyl, heteroalkyl, aryl, aralkyl, and a crosslinking moiety;

wherein the crosslinking moiety crosslinks a first repeating unit and a second repeating unit of Formula (A-D), the first and second repeating units can be on the same polymer chain or on different polymer chains, wherein in the first repeating unit of Formula (A-D), at least one of $R_{101}$, $R_{102}$, $R_{104}$, and $R_{105}$ is the crosslinking moiety; and (A-C); Formulas (A-A), (A-B), and (A-D); Formulas (A-A), (A-C), and (A-D); Formulas (A-B), (A-C), (A-D); Formulas (A-A) and (A-B); Formulas (A-A) and (A-C); Formulas (A-A) and (A-D); Formulas (A-B) and (A-C); Formulas (A-B) and (A-D); Formulas (A-C) and (A-D); Formula (A-A); Formula (A-B); Formula (A-C); or Formula (A-D).

In any of the above-mentioned polymers (i.e., a polymer including (or consisting essentially of, or consisting of) repeating units of Formula (A), (A-A), (A-B), (A-C), and/or (A-D)), in some embodiments, at least one of $R_{101}$, $R_{102}$, $R_{104}$, and $R_{105}$ is a crosslinking moiety on a first repeating unit and at least one of $R_{101}$, $R_{102}$, $R_{104}$, and $R_{105}$ is a bond configured to connect to a crosslinking moiety on a second repeating unit, and the crosslinking moiety crosslinks a first repeating unit and a second repeating unit, the first and second repeating units can be on the same polymer chain or on different polymer chains.

In some embodiments, in any of the above-mentioned polymers, $R_{101}$, $R_{102}$, $R_{104}$, and $R_{105}$ are each independently selected from absent, a bond, alkyl, perfluoroalkyl, heteroalkyl, aryl, and a crosslinking moiety; provided that at least one of $R_{101}$ and $R_{102}$ is selected from alkyl, perfluoroalkyl, heteroalkyl, and aryl; and at least one of $R_{104}$ and $R_{105}$ is selected from alkyl, perfluoroalkyl, heteroalkyl, and aryl. In some embodiments, $R_{101}$, $R_{102}$, $R_{104}$, and $R_{105}$ are each independently selected from absent, a bond, alkyl, perfluoroalkyl, heteroalkyl, and a crosslinking moiety; provided that at least one of $R_{101}$ and $R_{102}$ is selected from alkyl, perfluoroalkyl, and heteroalkyl; and at least one of $R_{104}$ and $R_{105}$ is selected from alkyl, perfluoroalkyl, and heteroalkyl. In some embodiments, $R_{101}$, $R_{102}$, $R_{104}$, and $R_{105}$ are each independently selected from absent, a bond, methyl, trifluoromethyl, and a crosslinking moiety; provided that at least one of $R_{101}$ and $R_{102}$ is selected from methyl and trifluoromethyl; and at least one of $R_{104}$ and $R_{105}$ is selected from methyl and trifluoromethyl.

In some embodiments, in any of the above-mentioned polymers, $R_{103}$, $R_{106}$, $R_{115}$, $R_{117}$, $R_{118}$, and $R_{119}$ are each independently selected from hydrogen (H) and alkyl. As an example, $R_{103}$, $R_{106}$, $R_{115}$, $R_{117}$, $R_{118}$, and $R_{119}$ are each independently selected from hydrogen (H), methyl, and ethyl (e.g., hydrogen (H) and methyl). For example, $R_{103}$, $R_{106}$, $R_{115}$, $R_{117}$, $R_{118}$, and $R_{119}$ can each be hydrogen (H).

In some embodiments, in any of the above-mentioned polymers, $R_{116}$ is selected from a bond, alkylene, arylene, and heteroarylene, wherein said alkylene, arylene and heteroarylene is each optionally substituted with 1, 2, 3, or 4 substituents independently selected from alkyl, perfluoroalkyl, heteroalkyl, and halo. In some embodiments, $R_{116}$ is selected from a bond, alkylene, arylene, and heteroarylene, wherein said alkylene, arylene and heteroarylene is each optionally substituted with 1, 2, 3, or 4 substituents independently selected from alkyl, heteroalkyl, and halo. In some embodiments, $R_{116}$ is selected from a bond, alkylene, arylene, and heteroarylene, wherein said alkylene, arylene and heteroarylene is each optionally substituted with 1, 2, 3, or 4 substituents independently selected from alkyl and halo. In some embodiments, $R_{116}$ is selected from a bond, alkylene, arylene, and heteroarylene, wherein said alkylene, arylene and heteroarylene is each optionally substituted with 1, 2, 3, or 4 alkyl. In some embodiments, $R_{116}$ is selected from a bond, alkylene, arylene, and heteroarylene, wherein said alkylene, arylene and heteroarylene is each optionally substituted with 1, 2, 3, or 4 halo. In some embodiments, $R_{116}$ is selected from arylene and heteroarylene each optionally substituted with 1, 2, 3, or 4 substituents independently selected from alkyl, perfluoroalkyl, heteroalkyl, and halo (e.g., alkyl, heteroalkyl, and halo; alkyl and halo; alkyl; or halo). In some embodiments, $R_{116}$ is arylene optionally substituted with 1, 2, 3, or 4 substituents independently selected from alkyl, perfluoroalkyl, heteroalkyl, and halo (e.g., alkyl, heteroalkyl, and halo; alkyl and halo; alkyl; or halo). In some embodiments, $R_{116}$ is phenylene.

In some embodiments, in any of the above-mentioned polymers, $R_{107}$, $R_{110}$, $R_{111}$, and $R_{114}$ are each independently alkyl. For example, $R_{107}$, $R_{110}$, $R_{111}$, and $R_{114}$ are each independently selected from methyl and ethyl. For example, $R_{107}$, $R_{110}$, $R_{111}$, and $R_{114}$ can each be methyl.

In some embodiments, in any of the above-mentioned polymers, $R_{108}$, $R_{109}$, $R_{112}$, and $R_{113}$ are each independently selected from hydrogen (H) and alkyl. In some embodiments, $R_{108}$ and $R_{112}$ are each independently selected from hydrogen (H) and alkyl. In some embodiments, $R_{108}$ and $R_{112}$ are each independently alkyl. In some embodiments, $R_{108}$ and $R_{112}$ are each independently selected from methyl and ethyl. For example, $R_{108}$ and $R_{112}$ can each be methyl. In some embodiments, $R_{109}$ and $R_{113}$ are each hydrogen (H).

The present disclosure also features a crosslinked polymer including (or consisting essentially of, or consisting of) repeating units of Formula (B):

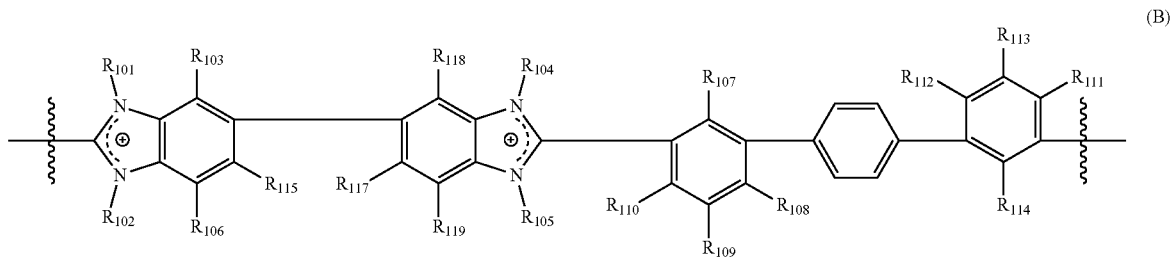

(B)

wherein $R_{101}$, $R_{102}$, $R_{104}$, and $R_{105}$ are each independently selected from absent, a bond, alkyl, perfluoroalkyl, heteroalkyl, aryl, aralkyl, and a crosslinking moiety; wherein the crosslinking moiety crosslinks a first repeating unit and a second repeating unit of Formula (B), the first and second repeating units can be on the same polymer chain or on different polymer chains, wherein in the first repeating unit of Formula (B), at least one of $R_{101}$, $R_{102}$, $R_{104}$, and $R_{105}$ is the crosslinking moiety; and in the second repeating unit of Formula (B), at least one of $R_{101}$, $R_{102}$, $R_{104}$, and $R_{105}$ is a bond connected to the crosslinking moiety on the first crosslinked repeating unit of Formula (B);

provided that at least one of $R_{101}$ and $R_{102}$ is selected from alkyl, perfluoroalkyl, heteroalkyl, aryl, and aralkyl;

when one of $R_{101}$ and $R_{102}$ is absent, the benzimidazolyl group including the absent $R_{101}$ or $R_{102}$ is neutral (i.e., the benzimidazolyl group where one of its $R_{101}$ or $R_{102}$ is absent is neutral);

at least one of $R_{104}$ and $R_{105}$ is selected from alkyl, perfluoroalkyl, heteroalkyl, aryl, and aralkyl; and when one of $R_{104}$ and $R_{105}$ is absent, the benzimidazolyl group including the absent $R_{104}$ or $R_{105}$ is neutral (i.e., the benzimidazolyl group where one of its $R_{104}$ or $R_{105}$ is absent is neutral);

$R_{103}$, $R_{106}$, $R_{115}$, $R_{117}$, $R_{118}$, and $R_{119}$ are each independently selected from hydrogen (H), alkyl, perfluoroalkyl, heteroalkyl, aryl, aralkyl, and heteroaryl;

$R_{107}$, $R_{110}$, $R_{111}$, and $R_{114}$ are each independently selected from alkyl, perfluoroalkyl, heteroalkyl, alkoxy, perfluoroalkoxy, halo, aryl, and heteroaryl; and $R_{108}$, $R_{109}$, $R_{112}$, and $R_{113}$ are each independently selected from hydrogen (H), alkyl, perfluoroalkyl, and heteroalkyl.

For the crosslinked polymer including (or consisting essentially of, or consisting of) repeating units of Formula (B), in some embodiments, at least one of $R_{101}$, $R_{102}$, $R_{104}$, and $R_{105}$ is a crosslinking moiety on a first repeating unit and at least one of $R_{101}$, $R_{102}$, $R_{104}$, and $R_{105}$ is a bond configured to connect to a crosslinking moiety on a second repeating unit, and the crosslinking moiety crosslinks a first repeating unit and a second repeating unit, the first and second repeating units can be on the same polymer chain or on different polymer chains.

In some embodiments, for any of the above-described crosslinked polymers including (or consisting essentially of, or consisting of) repeating units of Formula (B), $R_{101}$, $R_{102}$, $R_{104}$, and $R_{105}$ are each independently selected from absent, a bond, alkyl, perfluoroalkyl, heteroalkyl, aryl, and a crosslinking moiety; provided that at least one of $R_{101}$ and $R_{102}$ is selected from alkyl, perfluoroalkyl, heteroalkyl, and aryl; and at least one of $R_{104}$ and $R_{105}$ is selected from alkyl, perfluoroalkyl, heteroalkyl, and aryl. In some embodiments, $R_{101}$, $R_{102}$, $R_{104}$, and $R_{105}$ are each independently selected from absent, a bond, alkyl, perfluoroalkyl, heteroalkyl, and a crosslinking moiety; provided that at least one of $R_{101}$ and $R_{102}$ is selected from alkyl, perfluoroalkyl, and heteroalkyl; and at least one of $R_{104}$ and $R_{105}$ is selected from alkyl, perfluoroalkyl, and heteroalkyl. In some embodiments, $R_{101}$, $R_{102}$, $R_{104}$, and $R_{105}$ are each independently selected from absent, a bond, methyl, trifluoromethyl, and a crosslinking moiety; provided that at least one of $R_{101}$ and $R_{102}$ is selected from methyl and trifluoromethyl; and at least one of $R_{104}$ and $R_{105}$ is selected from methyl and trifluoromethyl.

In some embodiments, for any of the above-described crosslinked polymers including (or consisting essentially of, or consisting of) repeating units of Formula (B), $R_{103}$, $R_{106}$, $R_{115}$, $R_{117}$, $R_{118}$, and $R_{119}$ are each independently selected from hydrogen (H) and alkyl. As an example, $R_{103}$, $R_{106}$, $R_{115}$, $R_{117}$, $R_{118}$, and $R_{119}$ are each independently selected from hydrogen (H), methyl, and ethyl (e.g., hydrogen (H) and methyl). In some embodiments, $R_{103}$, $R_{106}$, $R_{115}$, $R_{117}$, $R_{118}$, and $R_{119}$ are each hydrogen (H).

In some embodiments, $R_{107}$, $R_{110}$, $R_{11}$, and $R_{114}$ are each independently alkyl. For example, $R_{107}$, $R_{110}$, $R_{111}$, and $R_{114}$ are each independently selected from methyl and ethyl. In some embodiments, $R_{107}$, $R_{110}$, $R_{111}$, and $R_{114}$ are each methyl.

In some embodiments, in any of the above-mentioned polymers, $R_{108}$, $R_{109}$, $R_{112}$, and $R_{113}$ are each independently selected from hydrogen (H) and alkyl. In some embodiments, $R_{108}$ and $R_{112}$ are each independently selected from hydrogen (H) and alkyl. In some embodiments, $R_{108}$ and $R_{112}$ are each independently alkyl. In some embodiments, $R_{108}$ and $R_{112}$ are each independently selected from methyl and ethyl. In some embodiments, $R_{108}$ and $R_{112}$ are each methyl. In some embodiments, $R_{109}$ and $R_{113}$ are each hydrogen (H).

The present disclosure also features a polymer including a repeating unit of Formula (C-A):

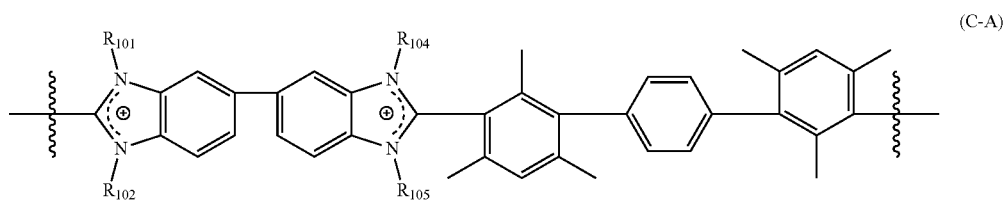

(C-A)

wherein $R_{101}$, $R_{102}$, $R_{104}$, and $R_{105}$ are each independently selected from a bond, methyl, and a crosslinking moiety, provided that two of $R_{101}$, $R_{102}$, $R_{104}$, and $R_{105}$ is selected from a crosslinking moiety and a bond, wherein the bond is configured to connect to a crosslinking moiety (the crosslinking moiety can be on the same polymer chain or on a different polymer chain); and the remaining two of $R_{101}$, $R_{102}$, $R_{104}$, and $R_{105}$ are each methyl.

In some embodiments, the polymer including a repeating unit of Formula (C-A) further includes repeating units of Formula (C-B):

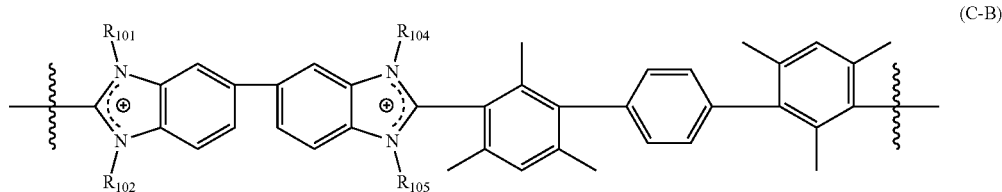

(C-B)

wherein $R_{101}$, $R_{102}$, $R_{104}$, and $R_{105}$ are each independently selected from a bond, methyl, and a crosslinking moiety, provided that one of $R_{101}$, $R_{102}$, $R_{104}$, and $R_{105}$ is selected from a crosslinking moiety and a bond, wherein the bond is configured to connect to a crosslinking moiety (the crosslinking moiety can be on the same polymer chain or on a different polymer chain);

one of $R_{101}$, $R_{102}$, $R_{104}$, and $R_{105}$ is absent and the benzimidazolyl group including the absent $R_{101}$, $R_{102}$, $R_{104}$, or $R_{105}$ is neutral (i.e., the benzimidazolyl group where one of its $R_{101}$, $R_{102}$, $R_{104}$, or $R_{105}$ is absent is neutral), and the remaining two of $R_{101}$, $R_{102}$, $R_{104}$, and $R_{105}$ are each methyl.

In some embodiments, the polymer including a repeating unit of Formula (C-A), or the polymer including a repeating unit of Formula (C-A) and (C-B), further includes repeating units of formula (C-C):

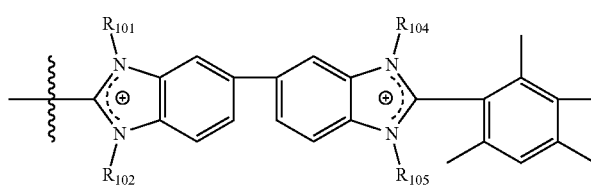

(C-C)

wherein $R_{101}$, $R_{102}$, $R_{104}$, and $R_{105}$ are each independently selected from a bond, methyl, and a crosslinking moiety, provided that one of $R_{101}$, $R_{102}$, $R_{104}$, and $R_{105}$ is selected from a crosslinking moiety and a bond, wherein the bond is configured to connect to a crosslinking moiety (the crosslinking moiety can be on the same polymer chain or on a different polymer chain); and the remaining three of $R_{101}$, $R_{102}$, $R_{104}$, and $R_{105}$ are each methyl.

In some embodiments, the polymer including a repeating unit of Formula (C-A), or a repeating unit of Formula (C-A) and (C-B), or a repeating unit of Formula (C-A), (C-B), and (C-C), further includes repeating units of Formula (C-D):

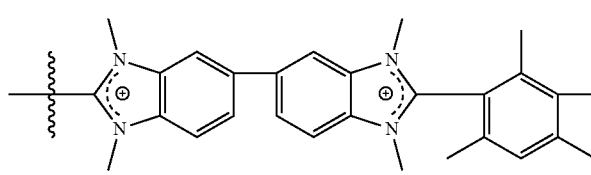

(C-D)

In some embodiments, the polymer includes m mole percentage repeating units of Formula (C-A), n mole percentage repeating units of Formula (C-B), p mole percentage of repeating units (C-C), and q mole percentage of repeating units (C-D), and m is from 1 mole percent to 95 mole percent,
n is from 1 mole percent to 50 mole percent,
p is from 1 mole percent to 95 mole percent,
q is from 5 mole percent to 95 mole percent, and
m+n+p+q=100%.

In any of the above-described embodiments of polymers including (or consisting essentially of, or consisting of) a repeating unit of Formula (C-A); repeating units of Formulas (C-A) and (C-B); repeating units of Formulas (C-A), (C-B), and (C-C); or repeating units of Formulas (C-A), (C-B), (C-C), and (C-D), the polymer can be crosslinked after one or more $R_{101}$, $R_{102}$, $R_{104}$, and $R_{105}$ are functionalized with alkyl, perfluoroalkyl, heteroalkyl, aryl, aralkyl. In any of the above-mentioned embodiments, the polymer can be crosslinked before one or more $R_{101}$, $R_{102}$, $R_{104}$, and $R_{105}$ are functionalized with alkyl, perfluoroalkyl, heteroalkyl, aryl, aralkyl.

In some embodiments, for any of the above-described embodiments of polymers including (or consisting essentially of, or consisting of) a repeating unit of Formula (C-A); repeating units of Formulas (C-A) and (C-B); repeating units of Formulas (C-A), (C-B), and (C-C): or repeating units of Formulas (C-A), (C-B), (C-C), and (C-D), the polymer includes at least one crosslinking moiety and at least one bond configured to connect to a crosslinking moiety (the crosslinking moiety can be on the same polymer chain or on a different polymer chain). In some embodiments, the bond is connected to a crosslinking moiety (the crosslinking moiety can be on the same polymer chain or on a different polymer chain).

The present disclosure features a crosslinked polymer including (or consisting essentially of, or consisting of) repeating units of Formula (D-A), (D-B), (D-C), and (D-D)

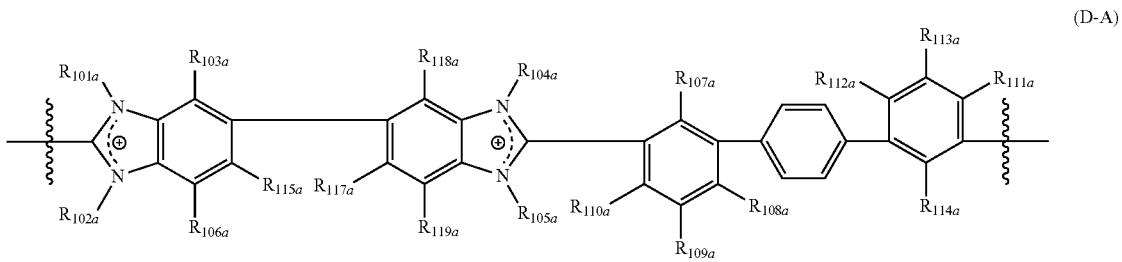

(D-A)

-continued

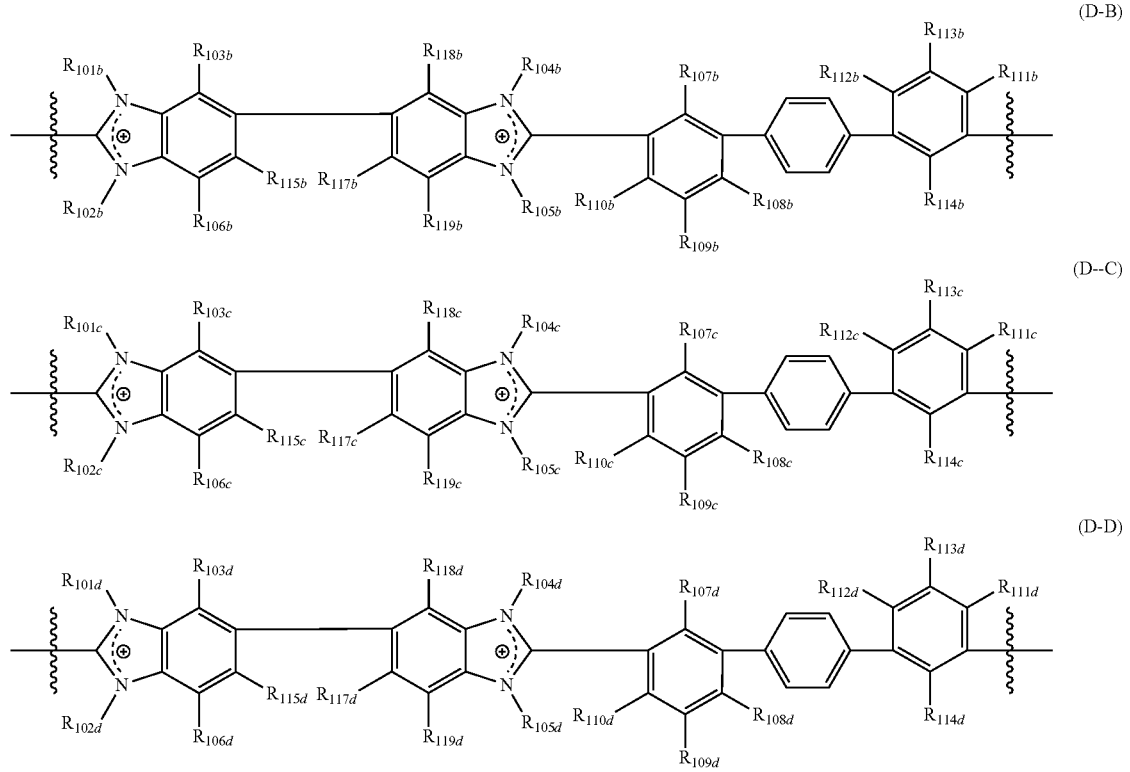

wherein $R_{101a}$, $R_{102a}$, $R_{104a}$, and $R_{105a}$ are each independently selected from a bond, alkyl, perfluoroalkyl, heteroalkyl, aryl, aralkyl, and a crosslinking moiety, provided that two of $R_{101a}$, $R_{102a}$, $R_{104a}$, and $R_{105a}$ are selected from a crosslinking moiety and a bond, wherein the bond is configured to connect to a crosslinking moiety (the crosslinking moiety can be on the same polymer chain or on a different polymer chain); and the remaining two of $R_{101a}$, $R_{102a}$, $R_{104a}$, and $R_{105a}$ are each independently selected from alkyl, perfluoroalkyl, heteroalkyl, aryl, and aralkyl;

$R_{101b}$, $R_{102b}$, $R_{104b}$, and $R_{105b}$ are each independently selected from absent, a bond, alkyl, perfluoroalkyl, heteroalkyl, aryl, aralkyl, and a crosslinking moiety, provided that one of $R_{101b}$, $R_{102b}$, $R_{104b}$, and $R_{105b}$ is selected from a crosslinking moiety and a bond, wherein the bond is configured to connect to a crosslinking moiety (the crosslinking moiety can be on the same polymer chain or on a different polymer chain); one of $R_{101b}$, $R_{102b}$, $R_{104b}$, and $R_{105b}$ is absent and the benzimidazolyl group including the absent $R_{101b}$, $R_{102b}$, $R_{104b}$, or $R_{105b}$ is neutral (i.e., the benzimidazolyl group where one of its $R_{101b}$, $R_{102b}$, $R_{104b}$, or $R_{105b}$ is absent is neutral); and the remaining two of $R_{101b}$, $R_{102b}$, $R_{104b}$, and $R_{105b}$ are each independently selected from alkyl, perfluoroalkyl, heteroalkyl, aryl, and aralkyl:

$R_{101c}$, $R_{102c}$, $R_{104c}$, and $R_{105c}$ are each independently selected from a bond, alkyl, perfluoroalkyl, heteroalkyl, aryl, aralkyl, and a crosslinking moiety, provided that one of $R_{101c}$, $R_{102c}$, $R_{104c}$, and $R_{105c}$ is selected from a crosslinking moiety and a bond, wherein the bond is configured to connect to a crosslinking moiety (the crosslinking moiety can be on the same polymer chain or on a different polymer chain); and the remaining three of $R_{101c}$, $R_{102c}$, $R_{104c}$, and $R_{105c}$ are each independently selected from alkyl, perfluoroalkyl, heteroalkyl, aryl, and aralkyl, $R_{101d}$, $R_{102d}$, $R_{104d}$, and $R_{105d}$ are each independently selected from alkyl, perfluoroalkyl, heteroalkyl, aryl, and aralkyl;

$R_{103a}$, $R_{106a}$, $R_{115a}$, $R_{117a}$, $R_{118a}$, $R_{119a}$, $R_{103b}$, $R_{106b}$, $R_{115b}$, $R_{117b}$, $R_{118b}$, $R_{119b}$, $R_{103c}$, $R_{106c}$, $R_{115c}$, $R_{117c}$, $R_{118c}$, $R_{119c}$, $R_{103d}$, $R_{106d}$, $R_{115d}$, $R_{117d}$, $R_{118d}$, and $R_{119d}$ are each independently selected from hydrogen (H), alkyl, perfluoroalkyl, heteroalkyl, aryl, aralkyl, and heteroaryl;

$R_{107a}$, $R_{110a}$, $R_{111a}$, $R_{114a}$, $R_{107b}$, $R_{110b}$, $R_{111b}$, $R_{114b}$, $R_{107c}$, $R_{110c}$, $R_{111c}$, $R_{114c}$, $R_{107d}$, $R_{110d}$, $R_{111d}$, and $R_{114d}$ are each independently selected from alkyl, perfluoroalkyl, heteroalkyl, alkoxy, perfluoroalkoxy, halo, aryl, and heteroaryl; and $R_{108a}$, $R_{109a}$, $R_{112a}$, $R_{113a}$, $R_{108b}$, $R_{109b}$, $R_{112b}$, $R_{113b}$, $R_{108c}$, $R_{109c}$, $R_{112c}$, $R_{113c}$, $R_{108d}$, $R_{109d}$, $R_{112d}$, and $R_{113d}$ are each independently selected from hydrogen (H), alkyl, perfluoroalkyl, and heteroalkyl, wherein the polymer includes m mole percentage repeating units of Formula (D-A), n mole percentage repeating units of Formula (D-B), p mole percentage of repeating units (D-C), and q mole percentage of repeating units (D-D), and
m is from 1 mole percent to 95 mole percent,
n is from 1 mole percent to 50 mole percent,
p is from 1 mole percent to 95 mole percent,
q is from 5 mole percent to 95 mole percent, and $m+n+p+q=100\%$.

In some embodiments, for the above-described embodiments of crosslinked polymers including (or consisting essentially of, or consisting of) repeating units of Formula (D-A), (D-B), (D-C), and (D-D), one of $R_{101a}$ and $R_{102a}$ is selected from a crosslinking moiety and a bond, wherein the bond is configured to connect to a crosslinking moiety (the crosslinking moiety can be on the same polymer chain or on a different polymer chain), and the remaining $R_{101a}$ or $R_{102a}$ is selected from alkyl, perfluoroalkyl, heteroalkyl, aryl, and aralkyl; and one of $R_{104a}$ and $R_{105a}$ is selected from a crosslinking moiety and a bond, wherein the bond is configured to connect to a crosslinking moiety (the crosslinking moiety can be on the same polymer chain or on a different polymer chain), and the remaining $R_{104a}$ or $R_{105a}$ is selected from alkyl, perfluoroalkyl, heteroalkyl, aryl, and aralkyl. In some embodiments, one of $R_{101a}$ and $R_{102a}$ is selected from a crosslinking moiety and a bond, wherein the bond is configured to connect to a crosslinking moiety (the crosslinking moiety can be on the same polymer chain or on a different polymer chain), and the remaining $R_{101a}$ or $R_{102a}$ a is selected from methyl and trifluoromethyl; and one of $R_{104a}$ and $R_{105a}$ is selected from a crosslinking moiety and a bond, wherein the bond is configured to connect to a crosslinking moiety (the crosslinking moiety can be on the same polymer chain or on a different polymer chain), and the remaining $R_{104a}$ or $R_{105a}$ is selected from methyl and trifluoromethyl.

In some embodiments, for the above-described embodiments of crosslinked polymers including (or consisting essentially of, or consisting of) repeating units of Formula (D-A), (D-B), (D-C), and (D-D), one of $R_{101b}$, $R_{102b}$, $R_{104b}$, and $R_{105b}$ is selected from a crosslinking moiety and a bond, wherein the bond is configured to connect to a crosslinking moiety (the crosslinking moiety can be on the same polymer chain or on a different polymer chain); one of $R_{101b}$, $R_{102b}$, $R_{104b}$, and $R_{105b}$ is absent and the benzimidazolyl group including the absent $R_{101b}$, $R_{102b}$, $R_{104b}$, or $R_{105b}$ is neutral (i.e., the benzimidazolyl group where one of its $R_{101b}$, $R_{102b}$, $R_{104b}$, or $R_{105b}$ is absent); and the remaining two of $R_{101b}$, $R_{102b}$, $R_{104b}$, and $R_{105b}$ are each independently selected from alkyl, perfluoroalkyl, and heteroalkyl. In some embodiments, one of $R_{101b}$, $R_{102b}$, $R_{104b}$, and $R_{105b}$ is selected from a crosslinking moiety and a bond, wherein the bond is configured to connect to a crosslinking moiety (the crosslinking moiety can be on the same polymer chain or on a different polymer chain); one of $R_{101b}$, $R_{102b}$, $R_{104b}$, and $R_{105b}$ is absent and the benzimidazolyl group including the absent $R_{101b}$, $R_{102b}$, $R_{104b}$, or $R_{105b}$ is neutral (i.e., the benzimidazolyl group where one of its $R_{101b}$, $R_{102b}$, $R_{104b}$, or $R_{105b}$ is absent); and the remaining two of $R_{101b}$, $R_{102b}$, $R_{104b}$, and $R_{105b}$ are each independently selected from methyl and trifluoromethyl.

In some embodiments, for the above-described embodiments of crosslinked polymers including (or consisting essentially of, or consisting of) repeating units of Formula (D-A), (D-B), (D-C), and (D-D), one of $R_{101c}$, $R_{102c}$, $R_{104c}$, and $R_{105c}$ is selected from a crosslinking moiety and a bond, wherein the bond is configured to connect to a crosslinking moiety (the crosslinking moiety can be on the same polymer chain or on a different polymer chain); the remaining three of $R_{101c}$, $R_{102c}$, $R_{104c}$, and $R_{105c}$ are each independently selected from alkyl, perfluoroalkyl, and heteroalkyl. For example, one of $R_{101c}$, $R_{102c}$, $R_{104c}$, and $R_{105c}$ can be selected from a crosslinking moiety and a bond, wherein the bond is configured to connect to a crosslinking moiety (the crosslinking moiety can be on the same polymer chain or on a different polymer chain); and the remaining three of $R_{101c}$, $R_{102c}$, $R_{104c}$, and $R_{105c}$ can each independently selected from methyl and trifluoromethyl. As another example, one of $R_{101c}$, $R_{102c}$, $R_{104c}$, and $R_{105c}$ can selected from a crosslinking moiety and a bond, wherein the bond is configured to connect to a crosslinking moiety (the crosslinking moiety can be on the same polymer chain or on a different polymer chain); and the remaining three of $R_{101c}$, $R_{102c}$, $R_{104c}$, and $R_{105c}$ can each methyl.

In some embodiments, for the above-described embodiments of crosslinked polymers including (or consisting essentially of, or consisting of) repeating units of Formula (D-A), (D-B), (D-C), and (D-D), $R_{101d}$, $R_{102d}$, $R_{104d}$, and $R_{105d}$ are each independently selected from alkyl, perfluoroalkyl, and heteroalkyl. For example, $R_{110d}$, $R_{102d}$, $R_{104d}$, and $R_{105d}$ can be each independently selected from methyl and trifluoromethyl. For example, $R_{101d}$, $R_{102d}$, $R_{104d}$, and $R_{105d}$ are each methyl.

In some embodiments, for the above-described embodiments of crosslinked polymers including (or consisting essentially of, or consisting of) repeating units of Formula (D-A), (D-B), (D-C), and (D-D), $R_{103a}$, $R_{106a}$, $R_{115a}$, $R_{117a}$, $R_{118a}$, $R_{119a}$, $R_{103b}$, $R_{106b}$, $R_{115b}$, $R_{117b}$b, $R_{118b}$, $R_{119b}$, $R_{103c}$, $R_{106c}$, $R_{115c}$, $R_{117c}$, $R_{118c}$, $R_{119c}$, $R_{103d}$, $R_{106d}$, $R_{115d}$, $R_{117d}$, $R_{118d}$, and $R_{119d}$ are each independently hydrogen (H) and alkyl. For example, $R_{103a}$, $R_{106a}$, $R_{115a}$, $R_{117a}$, $R_{119a}$, $R_{103b}$, $R_{106b}$, $R_{115a}$, $R_{117b}$, $R_{118b}$, $R_{119b}$, $R_{103c}$, $R_{106c}$, $R_{115c}$, $R_{117c}$, $R_{118c}$, $R_{119c}$, $R_{103d}$, $R_{106d}$, $R_{115d}$, $R_{117d}$, $R_{118d}$, and $R_{119d}$ are each hydrogen (H).

In some embodiments, for the above-described embodiments of crosslinked polymers including (or consisting essentially of, or consisting of) repeating units of Formula (D-A), (D-B), (D-C), and (D-D), $R_{107a}$, $R_{110a}$, $R_{111a}$, $R_{114a}$, $R_{107b}$, $R_{110b}$, $R_{111b}$, $R_{114b}$, $R_{107c}$, $R_{110c}$, $R_{111c}$, $R_{114c}$, $R_{107d}$, $R_{110d}$, $R_{111d}$, and $R_{114d}$ are each independently alkyl. For example, $R_{107a}$, $R_{110a}$, $R_{111a}$, $R_{114a}$, $R_{107b}$, $R_{110b}$, $R_{111b}$, $R_{114b}$, $R_{107c}$, $R_{110c}$, $R_{111c}$, $R_{114c}$, $R_{107d}$, $R_{110d}$, $R_{111d}$, and $R_{114d}$ can each independently be methyl.

In any of the above-mentioned embodiments for the crosslinked polymer including (or consisting essentially of, or consisting of) repeating units of Formula (D-A), (D-B), (D-C), and (D-D), $R_{108a}$, $R_{112a}$, $R_{108b}$, $R_{112b}$, $R_{108c}$, $R_{112c}$, $R_{108d}$, and $R_{112d}$ can each independently alkyl. For example, $R_{108a}$, $R_{112a}$, $R_{108b}$, $R_{112b}$, $R_{108c}$, $R_{112c}$, $R_{108d}$, and $R_{112d}$ can each be methyl.

In any of the above-mentioned embodiments for the crosslinked polymer including (or consisting essentially of, or consisting of) repeating units of Formula (D-A), (D-B), (D-C), and (D-D), $R_{109a}$, $R_{113a}$, $R_{109b}$, $R_{113b}$, $R_{109c}$c, $R_{113c}$, $R_{109d}$, and $R_{113d}$ can each independently selected from hydrogen (H) and alkyl. For example, $R_{109a}$, $R_{113a}$, $R_{109b}$, $R_{113b}$, $R_{109c}$, $R_{113c}$, $R_{109d}$, and $R_{113d}$ can each be hydrogen (H).

In some embodiments, for the above-described crosslinked polymer including (or consisting essentially of, or consisting of) repeating units of Formula (D-A), (D-B), (D-C), and (D-D), the polymer includes at least one crosslinking moiety and at least one bond configured to connect to a crosslinking moiety (the crosslinking moiety can be on the same polymer chain or on a different polymer chain). In some embodiments, the bond is connected to a crosslinking moiety (the crosslinking moiety can be on the same polymer chain or on a different polymer chain).

For any one of the above-described crosslinked polymers, the crosslinked polymer can be substantially stable when subjected to an aqueous solution including from 1 M to 6 M hydroxide, at atmospheric pressure, for a period of 12 hours or more (e.g., 24 hours or more, 48 hours or more, 72 hours or more, 96 hours or more, 120 hours or more, or 240 hours or more) and/or 480 hours or less (e.g., 240 hours or less, 120 hours or less, 96 hours or less, 72 hours or less, 48 hours or less, or 24 hours or less). For example, crosslinked polymers can degrade by less than 15% (e.g., less than 11%)

in 3 M hydroxide at 80° C. for 240 hours, at atmospheric pressure. In some embodiments, a membrane including any one of the above-described crosslinked polymers having, can have a higher ionic conductivity (e.g., more than 3 times the ionic conductivity, more than 2.5 times the ionic conductivity, more than 2 times the ionic conductivity, or more than 1.5 times the ionic conductivity) when compared to membranes having equally functionalized non-crosslinked polymers, after exposure to 3 M hydroxide at 80° C. for 168 hours. For example, a membrane including a crosslinked polymer crosslinked at about 15% (based on the number of nitrogen atoms that can be crosslinked and/or alkylated), can have a higher ionic conductivity (e.g., about 2.5 times the ionic conductivity, more than 3 times the ionic conductivity, more than 2.5 times the ionic conductivity, more than 2 times the ionic conductivity, or more than 1.5 times the ionic conductivity), when compared to membranes having equally functionalized non-crosslinked polymers, after exposure to 3 M hydroxide at 80° C. for 168 hours.

In some embodiments, the present disclosure features a crosslinked polymer including (or consisting essentially of, or consisting of) repeating units of Formula (I):

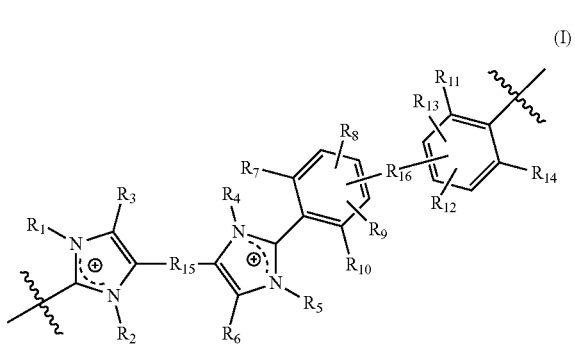

(I)

wherein in Formula (I):

$R_1$, $R_2$, $R_4$, and $R_5$ are each independently selected from absent, a bond, alkyl, perfluoroalkyl, heteroalkyl, aryl, aralkyl, and a crosslinking moiety, wherein the crosslinking moiety crosslinks a first repeating unit and a second repeating unit of Formula (I) the first and second repeating units can be on the same polymer chain or on different polymer chains, wherein in the first repeating unit of Formula (I), at least one of $R_1$, $R_2$, $R_4$, and $R_5$ is the crosslinking moiety, and in the second repeating unit of Formula (I), at least one of $R_1$, $R_2$, $R_4$, and $R_5$ is a bond configured to connect to the crosslinking moiety on the first crosslinked repeating unit of Formula (I);

provided that at least one of $R_1$, $R_2$, $R_4$, and $R_5$ is selected from a crosslinking moiety and a bond, wherein the bond is configured to connect to a crosslinking moiety (the crosslinking moiety can be on the same polymer chain or on a different polymer chain);

at least one of $R_1$ and $R_2$ is selected from alkyl, perfluoroalkyl, heteroalkyl, aryl, and aralkyl;

when one of $R_1$ and $R_2$ is absent, the imidazolyl group including the absent $R_1$ or $R_2$ is neutral (i.e., the imidazolyl group where one of its $R_1$ or $R_2$ is absent);

at least one of $R_4$ and $R_5$ is selected from alkyl, perfluoroalkyl, heteroalkyl, aryl, and aralkyl; and when one of $R_4$ and $R_5$ is absent, the imidazolyl group including the absent $R_4$ or $R_5$ is neutral (i.e., the imidazolyl group where one of its $R_4$ or $R_5$ is absent);

$R_3$ and $R_6$ are each independently selected from alkyl, perfluoroalkyl, heteroalkyl, aryl, aralkyl, and heteroaryl;

$R_{15}$ is selected from alkylene, perfluoroalkylene, heteroalkylene, arylene, aralkylene, and heteroarylene, each optionally substituted with 1, 2, 3, or 4 substituents independently selected from alkyl, perfluoroalkyl, heteroalkyl, and halo;

$R_{16}$ is selected from a bond, arylene, and heteroarylene, wherein said arylene and heteroarylene is each optionally substituted with 1, 2, 3, or 4 substituents independently selected from alkyl, perfluoroalkyl, heteroalkyl, and halo;

$R_7$, $R_{10}$, $R_{11}$, and $R_{14}$ are each independently selected from alkyl, perfluoroalkyl, and heteroalkyl; and $R_8$, $R_9$, $R_{12}$, and $R_{13}$ are each independently selected from hydrogen (H), alkyl, perfluoroalkyl, and heteroalkyl.

In some embodiments, the crosslinked polymer including (or consisting essentially of, or consisting of) repeating units of Formula (I) includes repeating units of Formula (I-A):

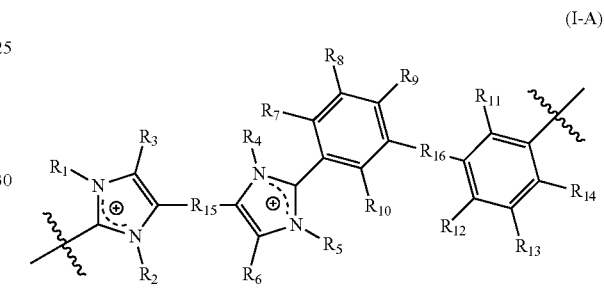

(I-A)

wherein:

$R_1$, $R_2$, $R_4$, and $R_5$ are each independently selected from absent, a bond, alkyl, perfluoroalkyl, heteroalkyl, aryl, aralkyl, and a crosslinking moiety;

wherein the crosslinking moiety crosslinks a first repeating unit and a second repeating unit of Formula (I-A), the first and second repeating units can be on the same polymer chain or on different polymer chains, wherein in the first repeating unit of Formula (I-A), at least one of $R_1$, $R_2$, $R_4$, and $R_5$ is the crosslinking moiety, and in the second repeating unit of Formula (I-A), at least one of $R_1$, $R_2$, $R_4$, and $R_5$ is a bond configured to connect to the crosslinking moiety on the first crosslinked repeating unit of Formula (I-A), provided that at least one of $R_1$, $R_2$, $R_4$, and $R_5$ is selected from a crosslinking moiety and a bond, wherein the bond is configured to connect to a crosslinking moiety (the crosslinking moiety can be on the same polymer chain or on a different polymer chain);

at least one of $R_1$ and $R_2$ is selected from alkyl, perfluoroalkyl, heteroalkyl, aryl, and aralkyl, when one of $R_1$ and $R_2$ is absent, the imidazolyl group including the absent $R_1$ or $R_2$ is neutral (i.e., the imidazolyl group where one of its $R_1$ or $R_2$ is absent);

at least one of $R_4$ and $R_5$ is selected from alkyl, perfluoroalkyl, heteroalkyl, aryl, and aralkyl; and when one of $R_4$ and $R_5$ is absent, the imidazolyl group including the absent $R_4$ or $R_5$ is neutral (i.e., the imidazolyl group where one of its $R_4$ or $R_5$ is absent);

$R_3$ and $R_6$ are each independently selected from alkyl, perfluoroalkyl, heteroalkyl, aryl, aralkyl, and heteroaryl;

$R_{15}$ is selected from alkylene, perfluoroalkylene, heteroalkylene, arylene, aralkylene, and heteroarylene, each optionally substituted with 1, 2, 3, or 4 substituents independently selected from alkyl, perfluoroalkyl, heteroalkyl, and halo;

$R_{16}$ is selected from a bond, arylene, and heteroarylene, wherein said arylene and heteroarylene is each optionally substituted with 1, 2, 3, or 4 substituents independently selected from alkyl, perfluoroalkyl, heteroalkyl, and halo;

$R_7$, $R_{10}$, $R_{11}$, and $R_{14}$ are each independently selected from alkyl, perfluoroalkyl, and heteroalkyl; and $R_8$, $R_9$, $R_{12}$, and $R_{13}$ are each independently selected from hydrogen (H), alkyl, perfluoroalkyl, and heteroalkyl.

In some embodiments, the crosslinked polymer including (or consisting essentially of, or consisting of) repeating units of Formula (I) includes repeating units of Formula (I-B):

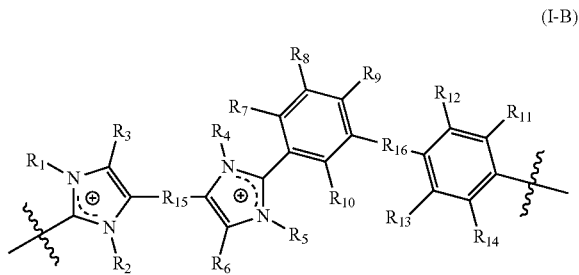

(I-B)

wherein:

$R_1$, $R_2$, $R_4$, and $R_5$ are each independently selected from absent, a bond, alkyl, perfluoroalkyl, heteroalkyl, aryl, aralkyl, and a crosslinking moiety;

wherein the crosslinking moiety crosslinks a first repeating unit and a second repeating unit of Formula (I-B), the first and second repeating units can be on the same polymer chain or on different polymer chains,
  wherein in the first repeating unit of Formula (I-B), at least one of $R_1$, $R_2$, $R_4$, and $R_5$ is the crosslinking moiety, and
  in the second repeating unit of Formula (I-B), at least one of $R_1$, $R_2$, $R_4$, and $R_5$ is a bond configured to connect to the crosslinking moiety on the first crosslinked repeating unit of Formula (I-B);
  provided that
    at least one of $R_1$, $R_2$, $R_4$, and $R_5$ is selected from a crosslinking moiety and a bond, wherein the bond is configured to connect to a crosslinking moiety (the crosslinking moiety can be on the same polymer chain or on a different polymer chain);
    at least one of $R_1$ and $R_2$ is selected from alkyl, perfluoroalkyl, heteroalkyl, aryl, and aralkyl,
    when one of $R_1$ and $R_2$ is absent, the imidazolyl group including the absent $R_1$ or $R_2$ (i.e., the imidazolyl group where one of its $R_1$ or $R_2$ is absent) is neutral;
    at least one of $R_4$ and $R_5$ is selected from alkyl, perfluoroalkyl, heteroalkyl, aryl, and aralkyl; and
    when one of $R_4$ and $R_5$ is absent, the imidazolyl group including the absent $R_4$ or $R_5$ (i.e., the imidazolyl group where one of its $R_4$ or $R_5$ is absent) is neutral;
  $R_3$ and $R_6$ are each independently selected from alkyl, perfluoroalkyl, heteroalkyl, aryl, aralkyl, and heteroaryl;
  $R_{15}$ is selected from alkylene, perfluoroalkylene, heteroalkylene, arylene, aralkylene, and heteroarylene, each optionally substituted with 1, 2, 3, or 4 substituents independently selected from alkyl, perfluoroalkyl, heteroalkyl, and halo;

$R_{16}$ is selected from a bond, arylene, and heteroarylene, wherein said arylene and heteroarylene is each optionally substituted with 1, 2, 3, or 4 substituents independently selected from alkyl, perfluoroalkyl, heteroalkyl, and halo;

$R_7$, $R_{10}$, $R_{11}$, and $R_{14}$ are each independently selected from alkyl, perfluoroalkyl, and heteroalkyl; and $R_8$, $R_9$, $R_{12}$, and $R_{13}$ are each independently selected from hydrogen (H), alkyl, perfluoroalkyl, and heteroalkyl.

In some embodiments, the crosslinked polymer including (or consisting essentially of, or consisting of) repeating units of Formula (I) includes repeating units of Formula (I-C):

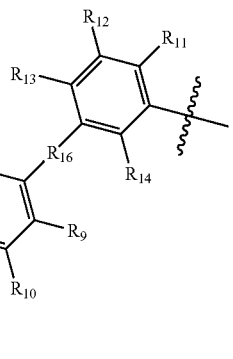

(I-C)

wherein:

$R_1$, $R_2$, $R_4$, and $R_5$ are each independently selected from absent, a bond, alkyl, perfluoroalkyl, heteroalkyl, aryl, aralkyl, and a crosslinking moiety;

wherein the crosslinking moiety crosslinks a first repeating unit and a second repeating unit of Formula (I-C), the first and second repeating units can be on the same polymer chain or on different polymer chains,
  wherein in the first repeating unit of Formula (I-C), at least one of $R_1$, $R_2$, $R_4$, and $R_5$ is the crosslinking moiety, and
  in the second repeating unit of Formula (I-C), at least one of $R_1$, $R_2$, $R_4$, and $R_5$ is a bond connected to the crosslinking moiety on the first crosslinked repeating unit of Formula (I-C),
  provided that
    at least one of $R_1$, $R_2$, $R_4$, and $R_5$ is selected from a crosslinking moiety and a bond, wherein the bond is configured to connect to a crosslinking moiety (the crosslinking moiety can be on the same polymer chain or on a different polymer chain);
    at least one of $R_1$ and $R_2$ is selected from alkyl, perfluoroalkyl, heteroalkyl, aryl, and aralkyl,
    when one of $R_1$ and $R_2$ is absent, the imidazolyl group including the absent $R_1$ and $R_2$ is neutral (i.e., the imidazolyl group where one of its $R_1$ or $R_2$ is absent);
    at least one of $R_4$ and $R_5$ is selected from alkyl, perfluoroalkyl, heteroalkyl, aryl, and aralkyl; and
    when one of $R_4$ and $R_5$ is absent, the imidazolyl group including the absent $R_4$ or $R_5$ is neutral (i.e., the imidazolyl group where one of its $R_4$ or $R_5$ is absent);
  $R_3$ and $R_6$ are each independently selected from alkyl, perfluoroalkyl, heteroalkyl, aryl, aralkyl, and heteroaryl;
  $R_{15}$ is selected from alkylene, perfluoroalkylene, heteroalkylene, arylene, aralkylene, and heteroarylene, each optionally substituted with 1, 2, 3, or 4 substituents independently selected from alkyl, perfluoroalkyl, heteroalkyl, and halo;

$R_{16}$ is selected from a bond, arylene, and heteroarylene, wherein said arylene and heteroarylene is each optionally substituted with 1, 2, 3, or 4 substituents independently selected from alkyl, perfluoroalkyl, heteroalkyl, and halo;

$R_7$, $R_{10}$, $R_{11}$, and $R_{14}$ are each independently selected from alkyl, perfluoroalkyl, and heteroalkyl; and $R_8$, $R_9$, $R_{12}$, and $R_{13}$ are each independently selected from hydrogen (H), alkyl, perfluoroalkyl, and heteroalkyl.

In some embodiments, the crosslinked polymer including (or consisting essentially of, or consisting of) repeating units of Formula (I) includes repeating units of Formula (I-D):

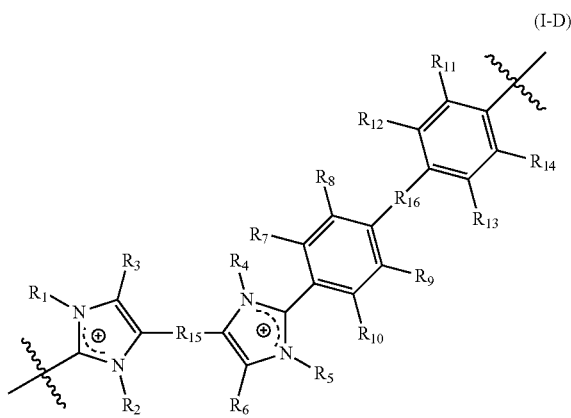

(I-D)

wherein:

$R_1$, $R_2$, $R_4$, and $R_5$ are each independently selected from absent, a bond, alkyl, perfluoroalkyl, heteroalkyl, aryl, aralkyl, and a crosslinking moiety;

wherein the crosslinking moiety crosslinks a first repeating unit and a second repeating unit of Formula (I-D), the first and second repeating units can be on the same polymer chain or on different polymer chains, wherein in the first repeating unit of Formula (I-D), at least one of $R_1$, $R_2$, $R_4$, and $R_5$ is the crosslinking moiety; and in the second repeating unit of Formula (1-D), at least one of $R_1$, $R_2$, $R_4$, and $R_5$ is a bond connected to the crosslinking moiety on the first crosslinked repeating unit of Formula (I-D), provided that at least one of $R_1$, $R_2$, $R_4$, and $R_5$ is selected from a crosslinking moiety and a bond, wherein the bond is configured to connect to a crosslinking moiety (the crosslinking moiety can be on the same polymer chain or on a different polymer chain);

at least one of $R_1$ and $R_2$ is selected from alkyl, perfluoroalkyl, heteroalkyl, aryl, and aralkyl, when one of $R_1$ and $R_2$ is absent, the imidazolyl group including the absent $R_1$ or $R_2$ is neutral (i.e., the imidazolyl group where one of its $R_1$ or $R_2$ is absent);

at least one of $R_4$ and $R_5$ is selected from alkyl, perfluoroalkyl, heteroalkyl, aryl, and aralkyl; and when one of $R_4$ and $R_5$ is absent, the imidazolyl group including the absent $R_4$ or $R_5$ is neutral (i.e., the imidazolyl group where one of its $R_4$ or $R_5$ is absent);

$R_3$ and $R_6$ are each independently selected from alkyl, perfluoroalkyl, heteroalkyl, aryl, aralkyl, and heteroaryl;

$R_{15}$ is selected from alkylene, perfluoroalkylene, heteroalkylene, arylene, aralkylene, and heteroarylene, each optionally substituted with 1, 2, 3, or 4 substituents independently selected from alkyl, perfluoroalkyl, heteroalkyl, and halo;

$R_{16}$ is selected from a bond, arylene, and heteroarylene, wherein said arylene and heteroarylene is each optionally substituted with 1, 2, 3, or 4 substituents independently selected from alkyl, perfluoroalkyl, heteroalkyl, and halo;

$R_7$, $R_{10}$, $R_{11}$, and $R_{14}$ are each independently selected from alkyl, perfluoroalkyl, and heteroalkyl; and $R_8$, $R_9$, $R_{12}$, and $R_{13}$ are each independently selected from hydrogen (H), alkyl, perfluoroalkyl, and heteroalkyl.

The polymer can have (or consisting essentially of, or consisting of) a mixture of repeating units of Formulas (I-A), (I-B), (I-C), and/or (I-D). For example, the polymer can include (or consisting essentially of, or consisting of) repeating units of Formulas (I-A), (I-B), (I-C), and (I-D); Formulas (I-A), (I-B), and (I-C); Formulas (I-A), (I-B), and (I-D); Formulas (I-A), (I-C), and (I-D); Formulas (I-B), (I-C), (I-D); Formulas (I-A) and (I-B); Formulas (I-A) and (I-C); Formulas (I-A) and (I-D); Formulas (I-B) and (I-C); Formulas (I-B) and (I-D); Formulas (I-C) and (I-D); Formula (I-A); Formula (I-B); Formula (I-C); or Formula (I-D).

In some embodiments, in any of the above-described crosslinked polymer including (or consisting essentially of, or consisting of) repeating units of Formula (I), the crosslinking moiety crosslinks a first repeating unit of Formula (I-A), Formula (I-B), Formula (I-C), and/or Formula (I-D) and a second repeating unit of Formula (I-A), Formula (I-B), Formula (I-C), and/or Formula (I-D), wherein in the first repeating unit, at least one of $R_1$, $R_2$, $R_4$, and $R_5$ is the crosslinking moiety; and in the second repeating unit, at least one of $R_1$, $R_2$, $R_4$, and $R_5$ is a bond connected to the crosslinking moiety on the first crosslinked repeating unit.

In some embodiments, in any of the above-described crosslinked polymer including (or consisting essentially of, or consisting of) repeating units of Formula (I) (e.g., Formula (I-A), Formula (I-B), Formula (I-C), and/or Formula (I-D)), $R_1$, $R_2$, $R_4$, and $R_5$ are each independently selected from absent, a bond, alkyl, perfluoroalkyl, heteroalkyl, aryl, and a crosslinking moiety; provided that at least one of $R_1$ and $R_2$ is selected from alkyl, perfluoroalkyl, heteroalkyl, and aryl; and at least one of $R_4$ and $R_5$ is selected from alkyl, perfluoroalkyl, heteroalkyl, and aryl. For example, $R_1$, $R_2$, $R_4$, and $R_5$ are each independently selected from absent, a bond, alkyl, perfluoroalkyl, heteroalkyl, and a crosslinking moiety; provided that at least one of $R_1$ and $R_2$ is selected from alkyl, perfluoroalkyl, and heteroalkyl; and at least one of $R_4$ and $R_5$ is selected from alkyl, perfluoroalkyl, and heteroalkyl. In some embodiments, $R_1$, $R_2$, $R_4$, and $R_5$ are each independently selected from absent, a bond, methyl, trifluoromethyl, and a crosslinking moiety; provided that at least one of $R_1$ and $R_2$ is selected from methyl and trifluoromethyl; and at least one of $R_4$ and $R_5$ is selected from methyl and trifluoromethyl.

In some embodiments, in any of the above-described crosslinked polymer including (or consisting essentially of, or consisting of) repeating units of Formula (I) (e.g., Formula (I-A), Formula (I-B), Formula (I-C), and/or Formula (I-D)), $R_3$ and $R_6$ are each independently aryl.

In some embodiments, in any of the above-described crosslinked polymer including (or consisting essentially of, or consisting of) repeating units of Formula (I) (e.g., Formula (I-A), Formula (I-B), Formula (I-C), and/or Formula (I-D)), $R_3$ and $R_6$ are each independently phenyl. In some embodiments, $R_3$ and $R_6$ are each independently methyl.

In some embodiments, in any of the above-described crosslinked polymer including (or consisting essentially of, or consisting of) repeating units of Formula (I) (e.g., Formula (I-A), Formula (I-B), Formula (I-C); and/or Formula (I-D)), $R_{15}$ and $R_{16}$ are each independently selected from arylene and heteroarylene, each optionally substituted with 1, 2, 3, or 4 substituents independently selected from alkyl and halo. For example, $R_{15}$ and $R_{16}$ each can be independently arylene optionally substituted with 1, 2, 3, or 4 substituents independently selected from alkyl and halo. In some embodiments, $R_{15}$ and $R_{16}$ are each phenylene optionally substituted with 1, 2, 3, or 4 substituents independently selected from alkyl and halo. For example, $R_{15}$ and $R_{16}$ can each be phenylene.

In some embodiments, in any of the above-described crosslinked polymer including (or consisting essentially of, or consisting of) repeating units of Formula (I) (e.g., Formula (I-A), Formula (I-B), Formula (I-C), and/or Formula (I-D)), $R_7$, $R_{10}$, $R_{11}$, and $R_{14}$ are each independently alkyl. For example, $R_7$, $R_{10}$, $R_{11}$, and $R_{14}$ are each independently ethyl or methyl. As another example, $R_7$, $R_{10}$, $R_{11}$, and $R_{14}$ are each methyl.

The present disclosure further features a crosslinked polymer including (or consisting essentially of, or consisting of) repeating units of Formula (II):

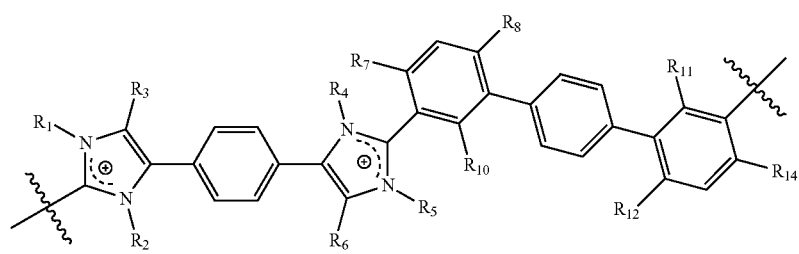

wherein:

$R_1$, $R_2$, $R_4$, and $R_5$ are each independently selected from absent, a bond, alkyl, perfluoroalkyl, heteroalkyl, aryl, aralkyl, and a crosslinking moiety;

wherein the crosslinking moiety crosslinks a first repeating unit and a second repeating unit of Formula (II), the first and second repeating units can be on the same polymer chain or on different polymer chains;

wherein in the first repeating unit of Formula (II), at least one of $R_1$, $R_2$, $R_4$, and $R_5$ is the crosslinking moiety; and in the second repeating unit of Formula (II), at least one of $R_1$, $R_2$, $R_4$, and $R_5$ is a bond connected to the crosslinking moiety on the first crosslinked repeating unit of Formula (II);

provided that at least one of $R_1$, $R_2$, $R_4$, and $R_5$ is selected from a crosslinking moiety and a bond, wherein the bond is configured to connect to a crosslinking moiety (the crosslinking moiety can be on the same polymer chain or on a different polymer chain);

at least one of $R_1$ and $R_2$ is selected from alkyl, perfluoroalkyl, heteroalkyl, aryl, and aralkyl;

when one of $R_1$ and $R_2$ is absent, the imidazolyl group including the absent $R_1$ or $R_2$ is neutral (i.e., the imidazolyl group where one of its $R_1$ or $R_2$ is absent);

at least one of $R_4$ and $R_5$ is selected from alkyl, perfluoroalkyl, heteroalkyl, aryl, and aralkyl; and when one of $R_4$ and $R_5$ is absent, the imidazolyl group including the absent $R_4$ or $R_5$ is neutral (i.e., the imidazolyl group where one of its $R_4$ or $R_5$ is absent);

$R_3$ and $R_6$ are each independently selected from alkyl, perfluoroalkyl, heteroalkyl, aryl, aralkyl, and heteroaryl;

$R_7$, $R_{10}$, $R_{11}$, and $R_{14}$ are each independently selected from alkyl, perfluoroalkyl, and heteroalkyl; and $R_8$ and $R_{12}$ are each independently selected from hydrogen (H), alkyl, perfluoroalkyl, and heteroalkyl.

In some embodiments, for the crosslinked polymer including repeating units of Formula (II), $R_1$, $R_2$, $R_4$, and $R_5$ are each independently selected from absent, a bond, alkyl, perfluoroalkyl, heteroalkyl, and a crosslinking moiety; provided that at least one of $R_1$ and $R_2$ is selected from alkyl, perfluoroalkyl, and heteroalkyl, and at least one of $R_4$ and $R_5$ is selected from alkyl, perfluoroalkyl, and heteroalkyl.

In some embodiments, for any of the above-described crosslinked polymers including (or consisting essentially of, or consisting of) repeating units of Formula (II), $R_1$, $R_2$, $R_4$, and $R_5$ are each independently selected from absent, a bond, methyl, trifluoromethyl, and a crosslinking moiety; provided that at least one of $R_1$ and $R_2$ is selected from methyl and trifluoromethyl, and at least one of $R_4$ and $R_5$ is selected from methyl and trifluoromethyl.

In some embodiments, for any of the above-described crosslinked polymers including (or consisting essentially of, or consisting of) repeating units of Formula (II), $R_3$ and $R_6$ are each independently aryl. For example, $R_3$ and $R_6$ are each independently phenyl. In some embodiments, $R_3$ and $R_6$ are each independently methyl.

In some embodiments, for any of the above-described crosslinked polymers including (or consisting essentially of, or consisting of) repeating units of Formula (II), $R_7$, $R_8$, $R_{10}$, $R_{11}$, $R_{12}$, and $R_{14}$ are each independently alkyl. For example, $R_7$, $R_8$, $R_{10}$, $R_{11}$, $R_{12}$, and $R_{14}$ are each independently methyl.

The present disclosure further features a crosslinked polymer including a repeating unit of Formula (III-A):

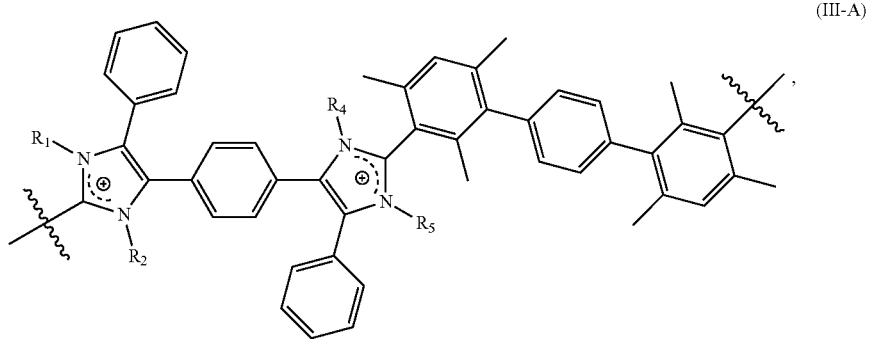

(III-A)

wherein $R_1$, $R_2$, $R_4$, and $R_5$ are each independently selected from a bond, methyl, and a crosslinking moiety, provided that two of $R_1$, $R_2$, $R_4$, and $R_5$ is selected from a crosslinking moiety and a bond, wherein the bond is configured to connect to a crosslinking moiety (the crosslinking moiety can be on the same polymer chain or on a different polymer chain); and the remaining two of $R_1$, $R_2$, $R_4$, and $R_5$ are each methyl.

In some embodiments, the crosslinked polymer including a repeating unit of Formula (III-A) further includes repeating units of Formula (III-B):

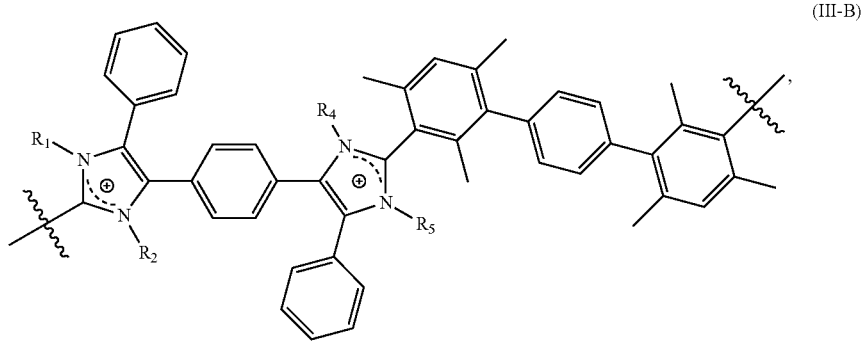

(III-B)

wherein $R_1$, $R_2$, $R_4$, and $R_5$ are each independently selected from absent, a bond, methyl, and a crosslinking moiety, provided that one of $R_1$, $R_2$, $R_4$, and $R_5$ is selected from a crosslinking moiety and a bond, wherein the bond is configured to connect to a crosslinking moiety (the crosslinking moiety can be on the same polymer chain or on a different polymer chain);

one of $R_1$, $R_2$, $R_4$, and $R_5$ is absent, and the imidazolyl group including the absent $R_1$, $R_2$, $R_4$, or $R_5$ is neutral (i.e., the imidazolyl group where one of its $R_1$, $R_2$, $R_4$, or $R_5$ is absent); and the remaining two of $R_1$, $R_2$, $R_4$, and $R_5$ are each methyl.

In some embodiments, the crosslinked polymer including a repeating unit of Formula (III-A), or including a repeating unit of Formula (III-A) and (III-B), further includes a repeating unit of Formula (III-C):

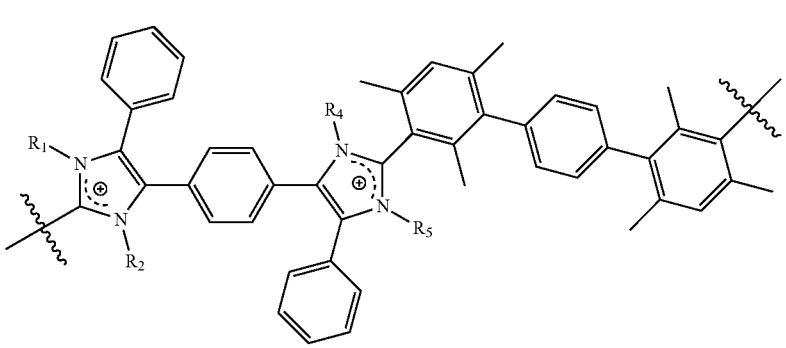

(III-C)

wherein $R_1$, $R_2$, $R_4$, and $R_5$ are each independently selected from a bond, methyl, and a crosslinking moiety, provided that
one of $R_1$, $R_2$, $R_4$, and $R_5$ is selected from a crosslinking moiety and a bond, wherein the bond is configured to connect to a crosslinking moiety (the crosslinking moiety can be on the same polymer chain or on a different polymer chain); and
the remaining three of $R_1$, $R_2$, $R_4$, and $R_5$ are each methyl.

In some embodiments, the crosslinked polymer including a repeating unit of Formula (III-A); including a repeating unit of Formula (III-A) and (III-B); or including a repeating unit of Formula (III-A), (III-B), and (III-C), further includes a repeating unit of Formula (III-D):

r is from 1 mole percent to 95 mole percent,
s is from 1 mole percent to 50 mole percent,
t is from 1 mole percent to 95 mole percent,
u is from 5 mole percent to 95 mole percent, and $r+s+t+u=100\%$.

In any of the above-mentioned polymers including (or consisting essentially of, or consisting of) a repeating unit of Formula (III-A), (III-B), (III-C), and/or (III-D), the polymer can be crosslinked after one or more $R_1$, $R_2$, $R_4$, and $R_5$ are functionalized with alkyl, perfluoroalkyl, heteroalkyl, aryl, aralkyl. In some embodiments, the polymer is crosslinked (III-D)

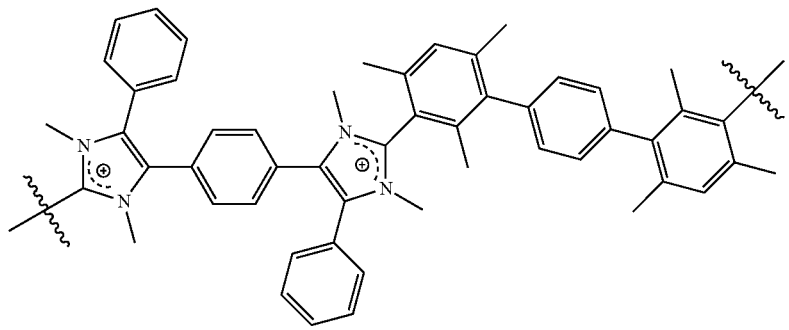

In some embodiments, the crosslinked polymer including a repeating unit of Formula (III-A), (III-B), (III-C), and (III-D), includes r mole percentage repeating units of Formula (III-A), s mole percentage repeating units of Formula (III-B), t mole percentage of repeating units (III-C), and u mole percentage of repeating units (III-D), and before one or more $R_1$, $R_2$, $R_4$, and $R_5$ are functionalized with alkyl, perfluoroalkyl, heteroalkyl, aryl, aralkyl.

The present disclosure also features a crosslinked polymer including (or consisting essentially of, or consisting of) repeating units of Formula (IV-A), (IV-B), (IV-C), and (IV-D)

(IV-A)

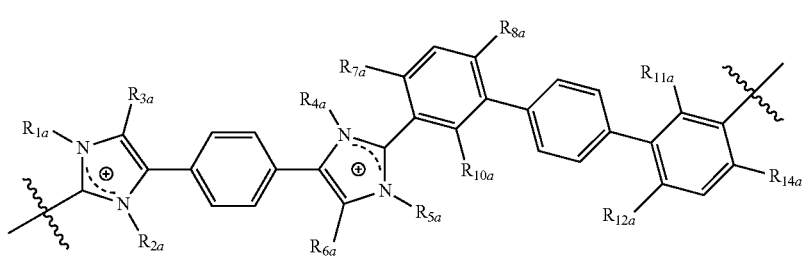

(IV-B)

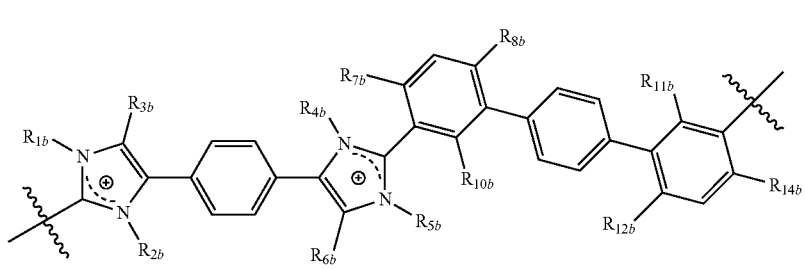

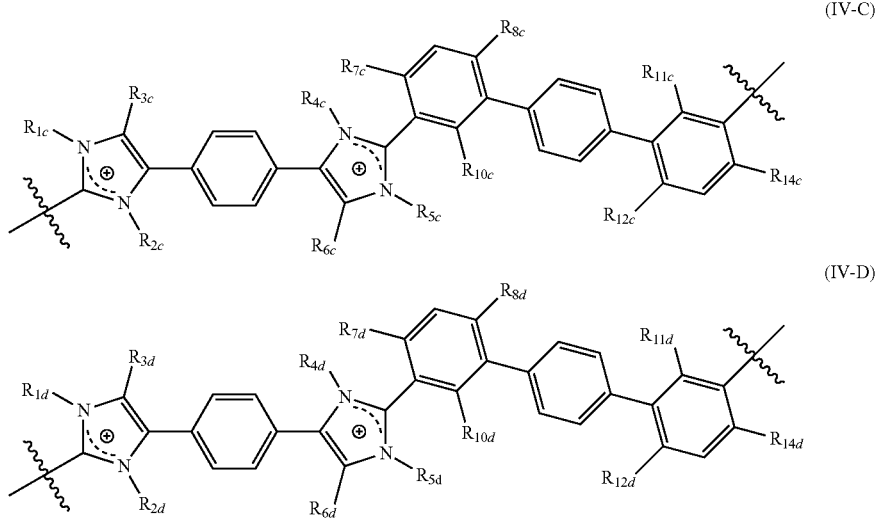

(IV-C)

(IV-D)

wherein $R_{1a}$, $R_{2a}$, $R_{4a}$, and $R_{5a}$ are each independently selected from a bond, alkyl, perfluoroalkyl, heteroalkyl, aryl, aralkyl, and a crosslinking moiety, provided that two of $R_{1a}$, $R_{2a}$, $R_{4a}$, and $R_{5a}$ is selected from a crosslinking moiety and a bond, wherein the bond is configured to connect to a crosslinking moiety (the crosslinking moiety can be on the same polymer chain or on a different polymer chain); and the remaining two of $R_{1a}$, $R_{2a}$, $R_{4a}$, and $R_{5a}$ are each independently selected from alkyl, perfluoroalkyl, heteroalkyl, aryl, and aralkyl;

$R_{1b}$, $R_{2b}$, $R_{4b}$, and $R_{5b}$ are each independently selected from absent, a bond, alkyl, perfluoroalkyl, heteroalkyl, aryl, aralkyl, and a crosslinking moiety, provided that one of $R_{1b}$, $R_{2b}$, $R_{4b}$, and $R_{5b}$ is selected from a crosslinking moiety and a bond, wherein the bond is configured to connect to a crosslinking moiety (the crosslinking moiety can be on the same polymer chain or on a different polymer chain); one of $R_{1b}$, $R_{2b}$, $R_{4b}$, and $R_{5b}$ is absent and the imidazolyl group including the absent $R_{1b}$, $R_{2b}$, $R_{4b}$, or $R_{5b}$ is neutral (i.e., the imidazolyl group where one of its $R_{1b}$, $R_{2b}$, $R_{4b}$, or $R_{5b}$ is absent); and the remaining two of $R_{1b}$, $R_{2b}$, $R_{4b}$, and $R_{5b}$ are each independently selected from alkyl, perfluoroalkyl, heteroalkyl, aryl, and aralkyl;

$R_{1c}$, $R_{2c}$, $R_{4c}$, and $R_{5c}$ are each independently selected from a bond, alkyl, perfluoroalkyl, heteroalkyl, aryl, aralkyl, and a crosslinking moiety, provided that one of $R_{1c}$, $R_{2c}$, $R_{4c}$, and $R_{5c}$ is selected from a crosslinking moiety and a bond, wherein the bond is configured to connect to a crosslinking moiety (the crosslinking moiety can be on the same polymer chain or on a different polymer chain); the remaining three of $R_{1c}$, $R_{2c}$, $R_{4c}$, and $R_{5c}$ are each independently selected from alkyl, perfluoroalkyl, heteroalkyl, aryl, and aralkyl, $R_{1d}$, $R_{2d}$, $R_{4d}$, and $R_{5d}$ are each independently selected from alkyl, perfluoroalkyl, heteroalkyl, aryl, and aralkyl;

$R_{3a}$, $R_{6a}$, $R_{3b}$, $R_{6b}$, $R_{3c}$, $R_{6c}$, $R_{3d}$, and $R_{6d}$ are each independently selected from alkyl, perfluoroalkyl, heteroalkyl, aryl, aralkyl, and heteroaryl;

$R_{7a}$, $R_{10a}$, $R_{11a}$, $R_{14a}$, $R_{7b}$, $R_{10b}$, $R_{11b}$, $R_{14b}$, $R_{7c}$, $R_{10c}$, $R_{11c}$, $R_{14c}$, $R_{7d}$, $R_{10d}$, $R_{11d}$, and $R_{14d}$ are each independently selected from alkyl, perfluoroalkyl, and heteroalkyl; and $R_{8a}$, $R_{12a}$, $R_{8b}$, $R_{12b}$, $R_{8c}$, $R_{12c}$, $R_{8d}$, and $R_{12d}$ are each independently selected from hydrogen (H), alkyl, perfluoroalkyl, and heteroalkyl, wherein the polymer includes r mole percentage repeating units of Formula (IV-A), s mole percentage repeating units of Formula (IV-B), t mole percentage of repeating units (IV-C), and u mole percentage of repeating units (IV-D), and r is from 1 mole percent to 95 mole percent, s is from 1 mole percent to 50 mole percent, t is from 1 mole percent to 95 mole percent, u is from 5 mole percent to 95 mole percent, and $r+s+t+u=100\%$.

In some embodiments, for the crosslinked polymer including (or consisting essentially of, or consisting of) repeating units of Formula (IV-A), (IV-B), (IV-C), and (IV-D), one of $R_{1a}$ and $R_{2a}$ is selected from a crosslinking moiety and a bond, wherein the bond is configured to connect to a crosslinking moiety (the crosslinking moiety can be on the same polymer chain or on a different polymer chain), and the remaining $R_{1a}$ or $R_{2a}$ is selected from alkyl, perfluoroalkyl, heteroalkyl, aryl, and aralkyl; and one of $R_{4a}$ and $R_{5a}$ is selected from a crosslinking moiety and a bond, wherein the bond is configured to connect to a crosslinking moiety (the crosslinking moiety can be on the same polymer chain or on a different polymer chain), and the remaining $R_{4a}$ or $R_{5a}$ is selected from alkyl, perfluoroalkyl, heteroalkyl, aryl, and aralkyl.

In some embodiments, for any of the above-described embodiments of the crosslinked polymer including (or consisting essentially of, or consisting of) repeating units of Formula (IV-A), (IV-B), (TV-C), and (IV-D), one of $R_{1a}$ and $R_{2a}$ is selected from a crosslinking moiety and a bond, wherein the bond is configured to connect to a crosslinking moiety (the crosslinking moiety can be on the same polymer chain or on a different polymer chain), and the remaining $R_{1a}$ or $R_{2a}$ is selected from methyl and trifluoromethyl; and one of $R_{4a}$ and $R_{5a}$ is selected from a crosslinking moiety and a bond, wherein the bond is configured to connect to a crosslinking moiety (the crosslinking moiety can be on the same polymer chain or on a different polymer chain), and the remaining $R_{4a}$ or $R_{5a}$ is selected from methyl and trifluoromethyl.

In some embodiments, for any of the above-described embodiments of the crosslinked polymer including (or consisting essentially of, or consisting of) repeating units of Formula (IV-A), (IV-B), (IV-C), and (IV-D), one of $R_{1b}$, $R_{2b}$, $R_{4b}$, and $R_{5b}$ is selected from a crosslinking moiety and a bond, wherein the bond is configured to connect to a crosslinking moiety (the crosslinking moiety can be on the same polymer chain or on a different polymer chain); one of $R_{1b}$, $R_{2b}$, $R_{4b}$, and $R_{5b}$ is absent and the imidazolyl group including the absent $R_{1b}$, $R_{2b}$, $R_{4b}$, or $R_{5b}$ is neutral (i.e., the imidazolyl group where one of its $R_{1b}$, $R_{2b}$, $R_{4b}$, or $R_{5b}$ is absent); and the remaining two of $R_{1b}$, $R_{2b}$, $R_{4b}$, and $R_{5b}$ are each independently selected from alkyl, perfluoroalkyl, and heteroalkyl.

In some embodiments, for any of the above-described embodiments of the crosslinked polymer including (or consisting essentially of, or consisting of) repeating units of Formula (IV-A), (IV-B), (IV-C), and (TV-D), one of $R_{1b}$, $R_{2b}$, $R_{4b}$, and $R_{5b}$ is selected from a crosslinking moiety and a bond, wherein the bond is configured to connect to a crosslinking moiety (the crosslinking moiety can be on the same polymer chain or on a different polymer chain); one of $R_{1b}$, $R_{2b}$, $R_{4b}$, and $R_{5b}$ is absent and the imidazolyl group including the absent $R_{1b}$, $R_{2b}$, $R_{4b}$, or $R_{5b}$ is neutral (i.e., the imidazolyl group where one of its $R_{1b}$, $R_{2b}$, $R_{4b}$, or $R_{5b}$ is absent); and the remaining two of $R_{1b}$, $R_{2b}$, $R_{4b}$, and $R_{5b}$ are each independently selected from methyl, and trifluoromethyl.

In some embodiments, for any of the above-mentioned embodiments of the crosslinked polymer including (or consisting essentially of, or consisting of) repeating units of Formula (IV-A), (IV-B), (IV-C), and (IV-D), one of $R_{1c}$, $R_{2c}$, $R_{4c}$, and $R_{5c}$ is selected from a crosslinking moiety and a bond, wherein the bond is configured to connect to a crosslinking moiety (the crosslinking moiety can be on the same polymer chain or on a different polymer chain); the remaining three of $R_{1c}$, $R_{2c}$, $R_{4c}$, and $R_{5c}$ are each independently selected from alkyl, perfluoroalkyl, and heteroalkyl. For example, one of $R_{1c}$, $R_{2c}$, $R_{4c}$, and $R_{5c}$ is selected from a crosslinking moiety and a bond, wherein the bond is configured to connect to a crosslinking moiety (the crosslinking moiety can be on the same polymer chain or on a different polymer chain); the remaining three of $R_{1c}$, $R_{2c}$, $R_{4c}$, and $R_{5e}$ are each independently selected from methyl and trifluoromethyl. In some embodiments, one of $R_{1c}$, $R_{2c}$, $R_{4c}$, and $R_{5c}$ is selected from a crosslinking moiety and a bond, wherein the bond is configured to connect to a crosslinking moiety (the crosslinking moiety can be on the same polymer chain or on a different polymer chain); the remaining three of $R_1$, $R_{2c}$, $R_{4c}$, and $R_{5c}$ are each methyl.

In some embodiments, for any of the above-mentioned embodiments of the crosslinked polymer including (or consisting essentially of, or consisting of) repeating units of Formula (IV-A), (IV-B), (IV-C), and (IV-D), the $R_{1d}$, $R_{2d}$, $R_{4d}$, and $R_{5d}$ are each independently selected from alkyl, perfluoroalkyl, and heteroalkyl. For example, $R_{1d}$, $R_{2d}$, $R_{4d}$, and $R_{5d}$ are each independently selected from methyl and trifluoromethyl. For example, $R_{1d}$, $R_{2d}$, $R_{4d}$, and $R_{5d}$ are each methyl.

In some embodiments, for any of the above-mentioned embodiments of the crosslinked polymer including (or consisting essentially of, or consisting of) repeating units of Formula (IV-A), (IV-B), (IV-C), and (IV-D), $R_{3a}$, $R_{6a}$, $R_{3b}$, $R_{6b}$, $R_{3c}$, $R_{6c}$, $R_{3d}$, and $R_{6d}$ are each independently aryl. For example, $R_{3a}$, $R_{6a}$, $R_{3b}$, $R_{6b}$, $R_{3c}$, $R_{6c}$, $R_{3d}$, and $R_{6d}$ are each independently phenyl.

In some embodiments, for any of the above-mentioned embodiments of the crosslinked polymer including (or consisting essentially of, or consisting of) repeating units of Formula (IV-A), (IV-B), (IV-C), and (IV-D), $R_{7a}$, $R_{10a}$, $R_{11a}$, $R_{14a}$, $R_{7b}$, $R_{10b}$, $R_{11b}$, $R_{14b}$, $R_{7c}$, $R_{10c}$, $R_{11c}$, $R_{14c}$, $R_{7d}$, $R_{10d}$, $R_{11d}$, and $R_{14d}$ are each independently alkyl. For example, $R_{7a}$, $R_{10a}$, $R_{11a}$, $R_{14a}$, $R_{7b}$, $R_{10b}$, $R_{11b}$, $R_{14b}$, $R_{7c}$, $R_{10c}$, $R_{11c}$, $R_{14c}$, $R_{7d}$, $R_{10d}$, $R_{11d}$, and $R_{14d}$ are each independently methyl.

In some embodiments, for any of the above-mentioned embodiments of the crosslinked polymer including repeating units (or consisting essentially of, or consisting of) of Formula (JV-A), (IV-B), (IV-C), and (IV-D), $R_{8a}$, $R_{12a}$, $R_{8b}$, $R_{12b}$, $R_{8c}$, $R_{12c}$, $R_{8d}$, and $R_{12d}$ are each independently alkyl. For example, $R_{8a}$, $R_{12a}$, $R_{8b}$, $R_{12b}$, $R_{8c}$, $R_{12c}$, $R_{8d}$, and $R_{12d}$ are each independently methyl.

In some embodiments, for any of the above-mentioned embodiments of crosslinked polymers, the crosslinked polymer is substantially stable when subjected to an aqueous solution including from 1 M to 6 M hydroxide.

In some embodiments, for any of the above-mentioned embodiments of crosslinked polymers, the crosslinking moiety is selected from alkylene, perfluoroalkylene, heteroalkylene, arylene, aralkylene, heteroarylene, and a polymeric crosslinking moiety, wherein said arylene, aralkylene, and heteroarylene is each optionally substituted with 1, 2, 3, or 4 substituents independently selected from alkyl, perfluoroalkyl, heteroalkyl, and halo. For example, for any of the above-mentioned embodiments of crosslinked polymers, the crosslinking moiety can be selected from an alkylene, perfluoroalkylene, heteroalkylene, arylene, aralkylene, and heteroarylene, wherein said arylene, aralkylene, and heteroarylene is each optionally substituted with 1, 2, 3, or 4 substituents independently selected from alkyl, perfluoroalkyl, heteroalkyl, and halo. For example, the crosslinking moiety is selected from arylene, aralkylene, and heteroarylene, wherein said arylene, aralkylene, and heteroarylene is each optionally substituted with 1, 2, 3, or 4 substituents independently selected from alkyl, perfluoroalkyl, heteroalkyl, and halo. As another example, the crosslinking moiety can be selected from aralkylene and heteroarylene, wherein said arylene and heteroarylene is each optionally substituted with 1, 2, 3, or 4 substituents independently selected from alkyl, perfluoroalkyl, heteroalkyl, and halo. In some embodiments, for any of the above-mentioned embodiments of the crosslinked polymer including repeating units of Formula (IV-A), (IV-B), (IV-C), and (IV-D), the crosslinking moiety is aralkylene optionally substituted with 1, 2, 3, or 4 substituents independently selected from alkyl, perfluoroalkyl, heteroalkyl, and halo. For example, the crosslinking moiety can be

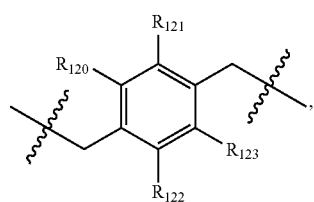

wherein $R_{120}$, $R_{121}$, $R_{122}$, and $R_{123}$ are each independently selected from hydrogen (H), alkyl, and perfluoroalkyl. In some embodiments, for any of the above-mentioned embodiments of crosslinked polymers, the crosslinking moiety is

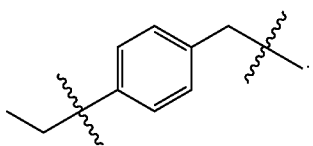

In some embodiments, for any of the above-mentioned crosslinked polymers, the polymer includes one or more anions X⁻ selected from iodide, bromide, chloride, fluoride, triiodide, hydroxide, carbonate, bicarbonate, cyanide, acetate, nitrate, sulfate, phosphate, triflate, tosylate, tetrakis(3,5-bis(trifluoromethyl)phenyl)borate, bis(trifluoromethane)sulfonamide, and any combination thereof, wherein the one or more anions X⁻ counterbalances one or more positive charges in the polymer. For example, the one or more anions X⁻ can be selected from iodide, bromide, chloride, fluoride, triiodide, hydroxide, carbonate, bicarbonate, sulfate, phosphate, triflate, tosylate, tetrakis(3,5-bis(trifluoromethyl)phenyl)borate, bis(trifluoromethane)sulfonamide, and any combination thereof, wherein the one or more anions X⁻ counterbalance one or more positive charges in the polymer. As another example, the one or more anions X⁻ can be selected from iodide, bromide, chloride, fluoride, hydroxide, carbonate, bicarbonate, and any combination thereof, wherein the one or more anions X⁻ counterbalance one or more positive charges in the polymer. In some embodiments, for any of the above-mentioned crosslinked polymers, the crosslinked polymer further includes one or more hydroxide anions, wherein the one or more hydroxide anions counterbalance one or more positive charges in the polymer.

In some embodiments, any of the above-mentioned crosslinked polymers can be incorporated into an ionic membrane and/or an ionomer. The ionomer can be incorporated, for example, into a catalyst layer of a fuel cell, of an electrolyzer, or of other electrochemical devices.

An example of a crosslinked polymer is provided in Example 1 below. The crosslinked polymer provides mechanically and alkaline stable anion conducting membranes, and was resistant to dissolution in water and organic solvents. The crosslinked polymer allows for the preparation of highly functionalized membranes having high anion conductivities over a wider range of operating conditions.

EXAMPLES

Example 1. Synthesis and Characterization of a Crosslinked Polymer

In this study, partially dimethylated HMT-PMBI I⁻ was chosen because of its ease of large-scale synthesis, excellent ex-situ and in-situ and performance, and hydroxide stability. To overcome the limitation of partial methylation and the excessive swelling in hydroxide environments, partially dimethylated HMT-PMBI I⁻ was crosslinked with α,α'-dichloro-p-xylene. Ex-situ properties such as water sorption, ion conductivity, as well as mechanical stability of membranes in chloride form were investigated. Hydroxide stability was rationalized by a small molecule study and compared to ex-situ polymer stability. In-situ properties were investigated in AAEM-FC and water electrolyzer tests.

Chemicals

All materials were purchased from Sigma Aldrich and were reagent grade unless otherwise noted, such as α,α'-dichloro-p-xylene (98%), 4-methylbenzyl chloride (98%), and methyl iodide (99%, MeI). Diethyl ether, hexanes, and potassium chloride were purchased from ACP Chemicals Inc. Potassium hydroxide was purchased from Macron Fine Chemicals. Acetone, dichloromethane, ethyl acetate, and methanol and were purchased from Fisher Chemical. Hydrochloric acid was purchased from Anachemia Science. Potassium nitrate was purchased from Caledon Laboratories. Methanol-$d_4$ (D, 99.8%, CD$_3$OD) and dimethyl sulfoxide-$d_6$ (D, 99.9%, DMSO-$d_6$) were purchased from Cambridge Isotope Laboratories. 2-mesityl-1H-benzimidazole and HMT-PMBI were prepared according to A. G. Wright el al., Hexamethyl-p-terphenyl poly(benzimidazolium): a universal hydroxide-conducting polymer for energy conversion devices, Energy Environ. Sci. 9 (2016) 2130-2142, and A. G. Wright et al., Poly(phenylene) and m-Terphenyl as Powerful Protecting Groups for the Preparation of Stable Organic Hydroxides, Angew. Chem. Int. Ed. 55 (2016) 4818-4821, respectively, and herein each incorporated by reference in its entirety. Deionized water (DI water) was obtained from a Millipore Milli-Q water purification system having a resistivity of >18.2 MΩ cm. $^1$H NMR and $^{13}$C NMR spectra were obtained on a 500 MHz Bruker AVANCE III running IconNMR under TopSpin 2.1. The residual $^1$H NMR spectra solvent peaks for DMSO-$d_6$ and CD$_3$OD were set to 2.50 ppm and 3.31 ppm, respectively. The residual $^{13}$C NMR spectra solvent peak for DMSO-$d_6$ was set to 39.52 ppm. Electrospray ionization mass spectrometry (ESI-MS) was performed using a Bruker micrOTOF in positive-mode. All measurements were repeated at least three times on three samples each.

Synthesis 2-mesityl-3-methyl-1-(4-methylbenzyl)-1H-benzimidazolium (BzMeB) iodide Powdered potassium hydroxide (0.46 g, 8.20 mmol) and dimethyl sulfoxide (15 mL) were added to a 50 mL round-bottom flask and vigorously stirred for 30 min at room temperature. 2-mesityl-1H-benzimidazole (1.0013 g, 4.24 mmol) in dimethyl sulfoxide (15 mL) was then added to the basic mixture. After stirring for 45 min, 4-methylbenzyl chloride (0.60 mL, 4.53 mmol) was added and stirred for 1 h at room temperature. The solution was then poured into water (200 mL) containing potassium hydroxide (0.92 g). Diethyl ether was added and the organics were extracted, washed with water, dried over magnesium sulfate, and evaporated to dryness. The residue was dissolved in dichloromethane (10 mL). Iodomethane (2.6 mL, 41.8 mmol) was added and the capped mixture was stirred at room temperature for 22 h. The solution was then evaporated to dryness at 50° C. using a dynamic vacuum and diethyl ether (100 mL) was added. After stirring for 1 h, the resulting solid was collected and washed with diethyl ether. The solid was recrystallized from ethyl acetate/acetone, washed with additional ethyl acetate, and dried under vacuum at 100° C. to yield BzMeB (0.84 g, 41%) as a pale yellow solid.

$^1$H NMR (500 MHz, DMSO-$d_6$, δ): 8.28-8.22 (m, 1H), 8.20-8.13 (m, 1H), 7.85-7.74 (m, 2H), 7.21 (s, 2H), 7.10 (d, J=7.8 Hz, 2H), 6.88 (d, J=7.8 Hz, 2H), 5.48 (s, 2H), 3.81 (s, 3H), 2.40 (s, 3H), 2.25 (s, 3H), 1.85 (s, 6H). $^{13}$C NMR (125 MHz, DMSO-$d_6$, δ): 149.98, 143.09, 138.59, 138.06, 131.84, 131.07, 130.55, 129.28, 129.15, 127.77, 127.17, 126.84, 117.11, 114.28, 114.05, 48.93, 32.21, 20.97, 20.63, 18.83. ESI-MS m/z calcd for $C_{25}H_{27}N_2^+$ [M⁺]: 355.217, found 355.220.

Single Crystal x-Ray Diffraction (XRD)

BzMeB was crystallized in iodide form as colourless needles, which were prepared by dissolving the compound in water and allowing the solvent to slowly evaporate in air at room temperature. A single crystal was analyzed by XRD using a Bruker SMART APEX II system with an APEX II CCD detector 5.0 cm away from the crystal. The data was collected under ambient conditions, processed in APEX2 Suite, and structurally refined in ShelXle. The crystal structural figures were prepared using software Mercury Membrane Preparation Partially methylated poly[2,2'-(2,2",4,4",6,6"-hexamethyl-p-terphenyl-3,3"-diyl)-5,5'-bibenzimidazole] (HMT-PMBI) polymer was prepared according to a synthesis route described, for example, in A. G. Wright, S. Holdcroft, Hydroxide-Stable Ionenes, ACS Macro Lett. 3 (2014) 444-447 and A. G. Wright el al., Hexamethyl-p-terphenyl poly (benzimidazolium): a universal hydroxide-conducting polymer for energy conversion devices, Energy Environ. Sci. 9 (2016) 2130-2142, each of which is herein incorporated by reference in its entirety. The degree of methylation (dm) was determined by $^1$H NMR by setting the area under the signals between 4.30 ppm and 3.78 ppm to 12 and integrating the signals between 3.78 ppm and 3.50 ppm as x. The dm was calculated by $$dm = \frac{0.5}{1 + \frac{x}{6}} + 0.5 \qquad \text{Eq. 1}$$

HMT-PMBI in I$^-$ form with a dm of 80±1%, 84±1%, 90±1%, and 94±1%, respectively, was used in this study and is referred to as Series A.

Crosslinked polymer membranes were prepared following the reaction described in Scheme 1. 1.500 g HMT-PMBI in I$^-$ form was dissolved in 13.500 g DMSO by stirring and gently heating for 12 h to obtain solutions with a concentration of 10.0 wt %. After vacuum filtering through a glass fiber filter, 5.000 g of a freshly prepared α,α'-dichloro-p-xylene solution in DMSO was added and stirred for 30 min at room temperature. Dependent on the desired degree of crosslinking (dx) and the initial dm, the required amount of α,α'-dichloro-p-xylene was determined using the following equation:

$$m_{Dichloro\text{-}xylene} = \frac{2 \cdot 175.05 \frac{g}{mol} \cdot m_{HMT\text{-}PMBI\text{-}I^-} \cdot dx}{572.75 \frac{g}{mol} + 141.94 \frac{g}{mol} \cdot (4 \cdot dm - 2)} \qquad \text{Eq. 2}$$

A 0.75 mm thin polymer film was cast on a levelled glass plate using a K202 Control Coater casting table and an adjustable doctor blade (RK PrintCoat Instruments Ltd). The polymer film was dried in an oven at 85° C. for at least 12 h, peeled off the glass plate, soaked in 5 L distilled water for 24 h, and dried under vacuum at 80° C. for 24 h.

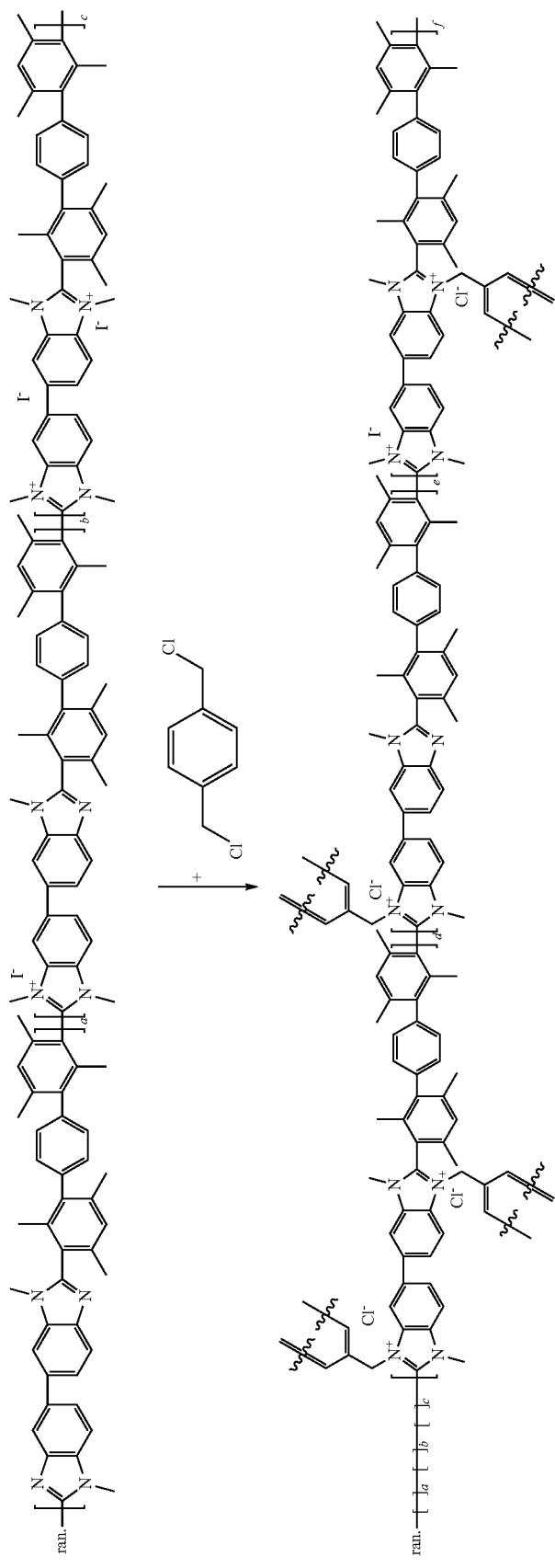
Scheme 1: Crosslinking of partially dimethylated HMT-PMBI I⁻ to obtain membranes for Series A and Series C.

Four series of polymer membranes were prepared by this technique (FIG. 10): Series B was prepared from HMT-PMBI I⁻ with a dm of 80%, 85% and 90% and having a fixed dx of 5%, while Series C was prepared from HMT-PMBI I⁻ with a dm of 80% and having a dx of 0%, 5%, 10% and 15%, respectively. Series D membranes were prepared by post-methylation from Series C, as described below. The sum of dm and dx gives the degree of functionalization (df):

$$df = dm + dx \qquad \text{Eq. 3}$$

All membranes were named after their respective dm and dx: For example, dm80dx15 corresponds to a dm of 80% and a dx of 15%.

Post-Methylation of Membranes

To obtain membranes with the highest possible degree of functionalization for Series D following the reaction described in Scheme 2, membranes of Series C were soaked in 1.6 L deionized (DI) water before 2.7 ml MeI were added. After 24 h, additional 2.7 ml MeI was added, and the reaction was stopped after 48 h by washing the membranes multiple times with DI water over 48 h. The membranes were dried under vacuum at 80° C. for at least 12 h.

Scheme 2: Post-methylation of crosslinked and non-crosslinked HMT-PMBI I⁻ to obtain membranes for Series D.

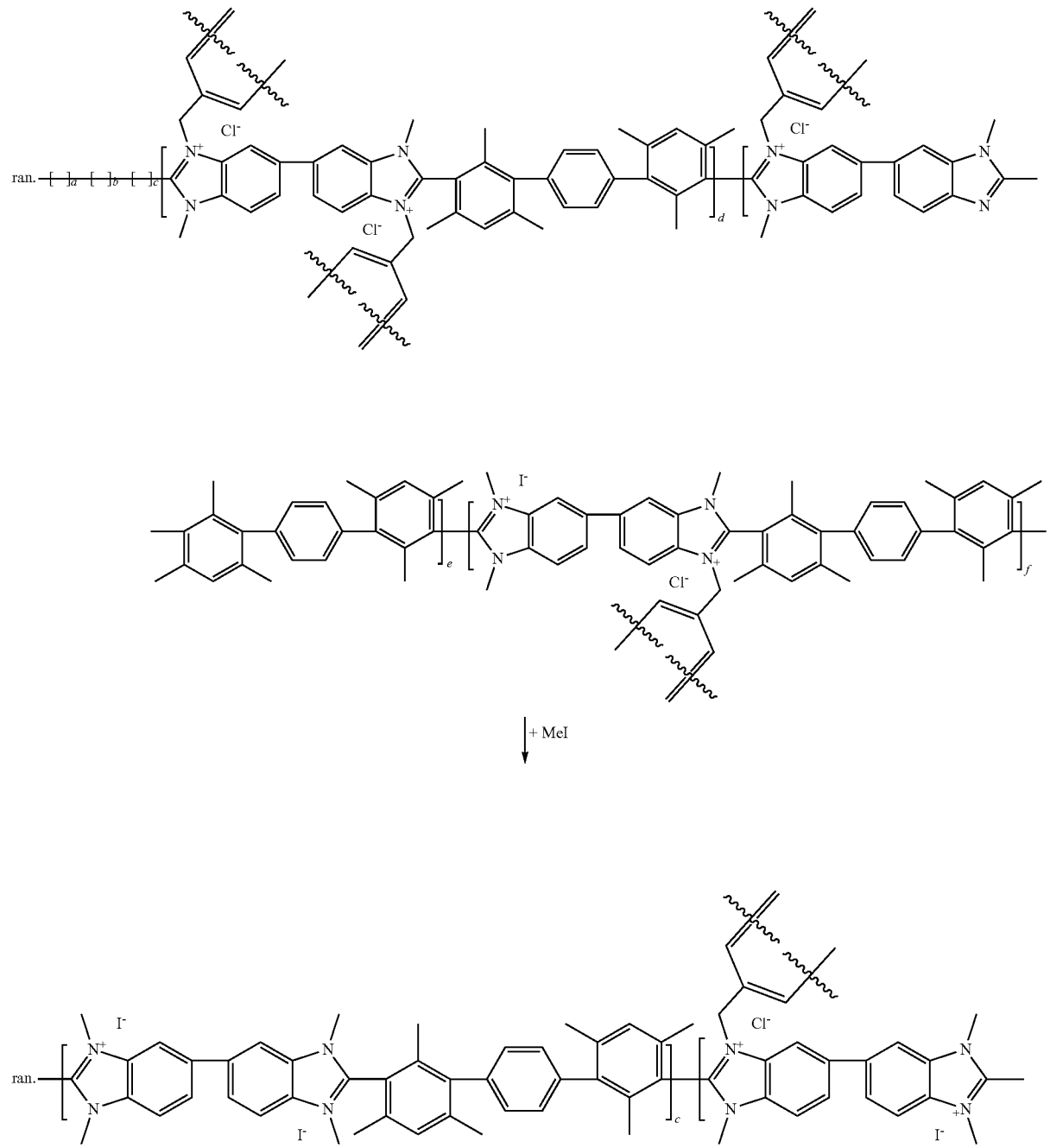

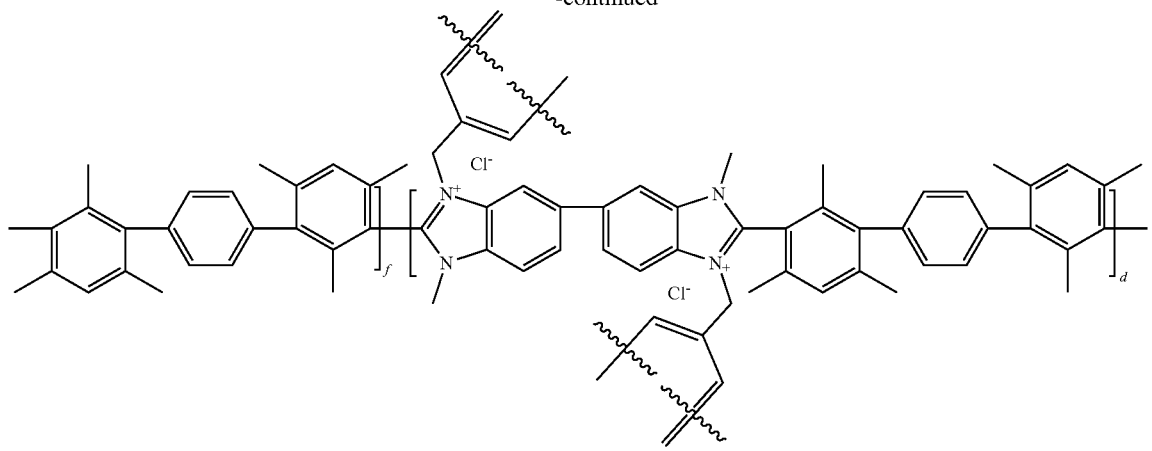

Membrane Pre-Treatment

All membrane samples were immersed two times for 24 h in 1 M KCl solution and washed several times with DI water over 48 h before analysis.

Ion Exchange Capacity

The ion exchange capacity (IEC) was determined by soaking at least three samples of each polymer twice in 15 g 1 M $KNO_3$ solution for 24 h. The $Cl^-$ concentration ($[Cl^-]$ in ppm) of the combined solution was determined by a $Cl^-$ selective electrode ($Cl^-$-ISE on 781 pH/Ion Meter, Metrohm AG). The membranes were afterwards soaked twice, each soaking occurring for 24 h in 1 M KCl solution, washed multiple times with DI water for 48 h and dried at 80° C. under vacuum to for 24 h. After cooling to room temperature under vacuum the dry weight ($m_{dry}$) was obtained. The average over five measurements was used according to Eq. 4, where $m_{solution}$ is the mass of the extraction solution and $M_{Cl}$ the molar mass of chlorine.

$$IEC_{Cl^-} = \frac{[Cl^-] \cdot m_{solution}}{M_{Cl} \cdot m_{dry}} \quad \text{Eq. 4}$$

Additionally, the theoretical ion exchange capacity can be determined from dm and dx, according to Eq. 5.

$$IEC_{Cl^-\ theoretical} = \frac{4 \cdot (dm + dx - 0.5)}{572.75 \frac{g}{mol} + 4 \cdot 50.49 \frac{g}{mol} \cdot (dm - 0.5) + 2 \cdot 175.05 \frac{g}{mol} \cdot dx} \quad \text{Eq. 5}$$

Water Uptake

Membrane samples were soaked in DI water for at least 24 h. After removing the surface water with a paper towel, the wet mass ($m_{wet}$) was determined on an analytical balance. This procedure was repeated four times. Afterwards, the membranes were dried for at least 12 h under vacuum at 80° C., cooled to room temperature under vacuum to determine the dry weight ($m_{dry}$). This procedure was repeated five times and the average mass was used for further calculations. The water uptake was calculated by Eq. 6.

$$\text{water uptake} = \frac{m_{wet} - m_{dry}}{m_{dry}} \quad \text{Eq. 6}$$

Dimensional Swelling

Wet dimensions of the three membrane samples of each polymer were determined after equilibrating in DI water for at least 24 h at room temperature (~25° C.), 50° C. and 80° C. by scanning with 1600 dpi on a Canon Canoscan 8400F scanner and subsequent image analysis using ImageJ. The membrane thickness was determined using a Mitutoyo Quickmike Series 293 micrometer. Partial humidified membrane dimensions were similarly obtained after equilibrating in an Espec SH-241 environmental chamber for at least 6 h.

Dry dimensions were obtained after drying for at least 12 h under vacuum at 80° C. and cooling to room temperature under vacuum. The swelling was determined by Eq. 7

$$S_{xyz} = \frac{width_{wet} \cdot length_{wet} \cdot thickness_{wet}}{width_{dry} \cdot length_{dry} \cdot thickness_{dry}} - 1 \quad \text{Eq. 7}$$

$Cl^-$ Conductivity

In-plane chloride ion conductivities of partial and fully humidified (wet) membranes were determined by AC impedance spectroscopy at 25° C., 50° C. and 80° C. The relative humidity (RH) in an environmental chamber was set to 30%, 50%, 70% and 90%, respectively. The membranes were equilibrated for at least 2 h after an RH change and for at least 6 h after a temperature change. The membranes were pressed onto two platinum electrodes by two Teflon blocks, as described in T. Weissbach, et al., Structural effects on the nano-scale morphology and conductivity of ionomer blends, J. Mater. Chem. 22 (2012) 24348-24355, incorporated herein by reference in its entirety. Impedance measurements were performed using 100 mV sinusoidal AC voltage between 10 MHz and 100 Hz. The resistance (R, Ω) of the membrane was determined by fitting a standard Randles equivalent circuit to the obtained Nyquist plot. By using the obtained resistance, the dimensions of the membrane at the given conditions, and distance between the platinum electrodes (d, cm), the $Cl^-$ conductivity (σ, mS/cm) was calculated:

$$\sigma_{Cl^-} = \frac{d}{\text{width} \cdot \text{thickness} \cdot R} \quad \text{Eq. 8}$$

Swelling and Solubility in Organic Solvents

Dry dimensions and mass were obtained after drying for at least 12 h under vacuum at 80° C. as described above. Membrane samples were soaked at room temperature in methanol, ethanol and DMSO for 48 h before obtaining dimensions and 111 days before washing multiple times with DI water over 48 h and obtaining the dry weight $m_{dry,111d}$. The gel fraction $X_{gel}$ was calculated according to Eq. 9.

$$X_{gel} = \frac{m_{dry,111d}}{m_{dry}} \quad \text{Eq. 9}$$

Stability Test of BzMeB

In a 5 mL polytetrafluoroethylene (PTFE) container was added 5.0 mL of 3 M $NaOD/CD_3OD/D_2O$ (prepared by diluting 2.05 g of 30 wt % NaOD in $D_2O$ with $CD_3OD$ to 5.0 mL) followed by 46.9 mg of BzMeB (iodide form). The mixture was tightly closed and heated in an 80° C. oven for 5 min to fully dissolve the solid. The container was then cooled to room temperature and 0.6 mL was extracted for $^1H$ NMR spectroscopic analysis ("0 h" measurement). The container was then placed in an 80° C. oven. At certain points in time (50 h, 96 h, 168 h, and 240 h), the container was briefly cooled to room temperature and 0.6 mL fractions were extracted for $^1H$ NMR spectroscopic analysis, immediately returning the container to the oven thereafter. After 240 h at 80° C. the solution was poured into a beaker and diluted with water. The solution was neutralized (pH=7) by addition of dilute hydrochloric acid and sodium bicarbonate. Diethyl ether was added and the organic layer was extracted, washed three times with water, dried over magnesium sulfate, and filtered. The solvent was evaporated at 40° C. using dynamic vacuum and the residue was analyzed by mass spectrometry.

The relative amount of remaining benzimidazolium was determined from $^1H$ NMR spectral analysis at the various times using Equation (1) below. The spectra were taken were taken on a 500 MHz spectrometer, referenced to the residual $CD_3OD$ peak at 3.31 ppm, and baseline-corrected using the "Full Auto (Polynomial Fit)" function in MestReNova 9.0.1.

$$\text{Relative Remaining Benzimidazolium} = 100 \left( \frac{\frac{n_t \cdot x_t}{y_t}}{\frac{n_0 \cdot x_0}{y_0}} \right) \quad \text{Eq. 10}$$

where $n_t$ accounts for deuterium-exchange at the 4- and 7-positions of the benzimidazolium such that $n_t$ is equal to 8 at time t except for the initial 0 h measurement, which is equal to 10, $x_t$ represents the integration value for the 7.91-7.77 ppm region relative to the integration value for the total aromatic region, $y_t$, between 8.30-6.40 ppm at time t, and $n_0$, $x_0$, and $y_0$ represent the respective values for the initial 0 h measurement.

Stability Test of Crosslinked Polymer Membranes

Membrane samples in chloride form were immersed in an aqueous 3 M KOH solution for 168 h at 80° C. Afterwards, the membranes were washed multiple times with 1 M KCl, 0.02 M HCl, 1 M KCl and DI water. After drying for 12 h at 80° C., infrared spectra were recorded using a Perkin Elmer Spectrum Two attenuated total reflection (ATR) FTIR spectrometer with a resolution of 1 $cm^{-1}$. Spectra were averages over 32 scans between 450 and 4000 $cm^{-1}$.

Results

Figure 10:
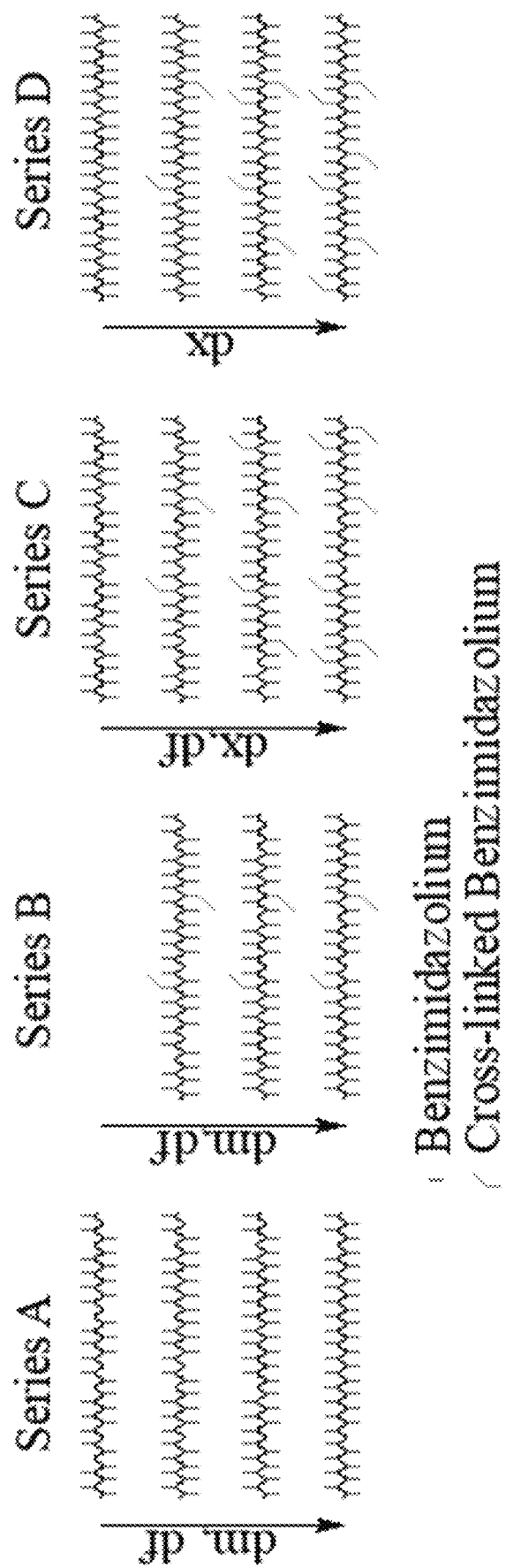
FIG. 10 is a schematic representation of four series of HMT-PMBI with different degree of crosslinks (dx), degree of methylation (dm), and degree of functionalization (df).

HMT-PMBI polymer was cast with various amounts of α,α'-dichloro-p-xylene crosslinker, according to FIG. 10 to obtain p-xylene crosslinked membranes following a reaction shown in Scheme 1. Non-crosslinked HMT-PMBI membranes with a dm between 80% and 95% were prepared as a reference. All obtained membranes were tough, flexible and transparent. To confirm the crosslinking reaction, IR spectroscopy was performed.

Previously, HMT-PMBI $Cl^-$ was found to possess similar water sorption and conductivities to membranes in $OH^-$ form. Thus, all membranes were converted into $Cl^-$ form, to avoid inconsistencies and deviations from a mixed carbonate form caused by $CO_2$ absorption. The IEC increased with increasing degree of functionalization (df) as shown in FIGS. 1A-1D. Non-crosslinked HMT-PMBI membranes of Series A had an $IEC_{Cl^-}$ between 1.6 mmol/g and 2.2 mmol/g, dependent on dm. The functionalization of benzimidazole to benzimidazolium can be done either by methylation, as described previously, or by the addition of the crosslinker. Both reactions increase the IEC. Adding 5% crosslinks (Series B), increased the IEC compared to non-crosslinked membranes (Series A) by about 0.1 mmol/g. Between a df of 85% (dm=80%, dx=5%) and 95% (dm=90%, dx=5%) the IEC increased from 1.7 mmol/g to 2.2 mmol/g, respectively. Compared to the theoretical IEC, about 80% of all theoretically existing ion exchange sites of Series A and Series B could be exchanged. The more crosslinker that was added to 80% dimethylated HMT-PMBI (Series C), the smaller was the fraction available ion exchange sites to the theoretically available ion exchange sites. Although the IEC increased from 1.7 mmol/g to 2.0 mmol/g with increasing df, the ion exchange site accessibility dropped from 83% to 74%. Post-methylation of membranes of Series C led to an increase in IEC to 2.2 mmol/g, with 75% to 78% ion exchange site accessibility (Series D). All materials showed less than 100% exchange site accessibility, which made crosslink quantification impossible.

Besides increasing the IEC, crosslinks were also incorporated to reduce swelling and solubility. FIGS. 2A-2D showed the volume swelling in DI water between 25° C. and 80° C. An increase in df or temperature led to an increase in swelling. Non-crosslinked HMT-PMBI with a df=dm of 90% and 95% dissolves between 50° C. and 80° C. or 25° C. and 50° C., respectively. Dissolution at elevated temperature could be prevented by having at least a dx of 5% (Series B): up to 950% volume swelling was measured, but the membranes remained structurally intact. Increasing the degree of crosslinks up to 15% (Series C), led to a moderate swelling of 95% at 80° C. After post-methylation, a decrease in swelling with increasing dx could be observed (Series D). While non-crosslinked membranes dissolved above 25° C., the swelling dropped from 900% to 220%, dependent in dx. The small difference between the swelling at 50° C. and 80° C. was worth mentioning. Only the volume swelling was discussed at this point as the volume swelling was found to be proportional to the water uptake.

In organic solvents, non-crosslinked HMT-PMBI dissolved quickly at 25° C. FIGS. 3A-3C showed the volume swelling $S_{xyz}$ of partially dimethylated HMT-PMBI of Series B, Series C and Series D in ethanol, methanol, and DMSO, compared to water. The swelling was found to increase with $H_2O$<EtOH<MeOH<DMSO for all materials. Series B showed trends similar to swelling in water as explained above: an increase in df led to an increase in swelling. In contrast, Series C showed a trend similar to Series D: an increase in dx led to a decrease in swelling despite the increasing df. After 111 days at room temperature, the gel fraction $X_{gel}$ of all crosslinked membranes in EtOH, MeOH and DMSO was found to be 93±2%.

The results of chloride conductivity measurements in water at 25° C. 50° C. and 80° C. are summarized in FIGS. 4A-4D. The highest conductivities of non-crosslinked membranes (Series A) were measured for the barely insoluble membranes: at 25° C., the highest conductivities were measured for dm95 (15 mS/cm), at 50° C. for dm90 (19 mS/cm) and at 80° C. for dm85 (27 mS/cm). In Series B, an increase in df led to an increase in conductivity at 25° C. and 50° C. Up to 12 mS/cm and 24 mS/cm were measured, respectively. However, at 80° C., this trend was interrupted and the highest conductivity was measured at for dm85dx5 (df=90%) due to excessive swelling of dm90dx5. Increasing the dx up to 15% led to fairly low conductivities of 10 mS/cm at 25° C., but also to an increase in conductivity with dx and up to 30 mS/cm at 80° C. (Series C). Post-methylation increases the IEC and increases the amount of hydrophilic ion exchange sites. The combination of a higher amount of ionic charge carriers and a better connected aqueous phase in the membrane leads to an increase in conductivity at 25° C. (Series D). Conductivities between 14 mS/cm and 15 mS/cm were measured. After increasing the temperature, only membranes containing 10% and 15% dx showed a noticeable increase in conductivity. A high dx was favorable for high conductivities due to reduced swelling. 25 mS/cm and 35 mS/cm were determined for post-methylated membranes containing 15% crosslinks at 50° C. and 80° C., respectively. When wet, non-crosslinked 95% dimethylated, non-crosslinked and post-methylated membranes (Series D) showed with 15 mS/cm, the highest Cl⁻ conductivities at 25° C. At 50° C. temperature, highly functionalized membranes with small amounts of crosslinker and highly crosslinked post-methylated membranes showed the highest performance (~25 mS/cm). At 80° C. the highest conductivities were measured for highly crosslinked membranes (~35 mS/cm) and non-crosslinked membranes with a dm of 80% (28 mS/cm).

Figure 5B:
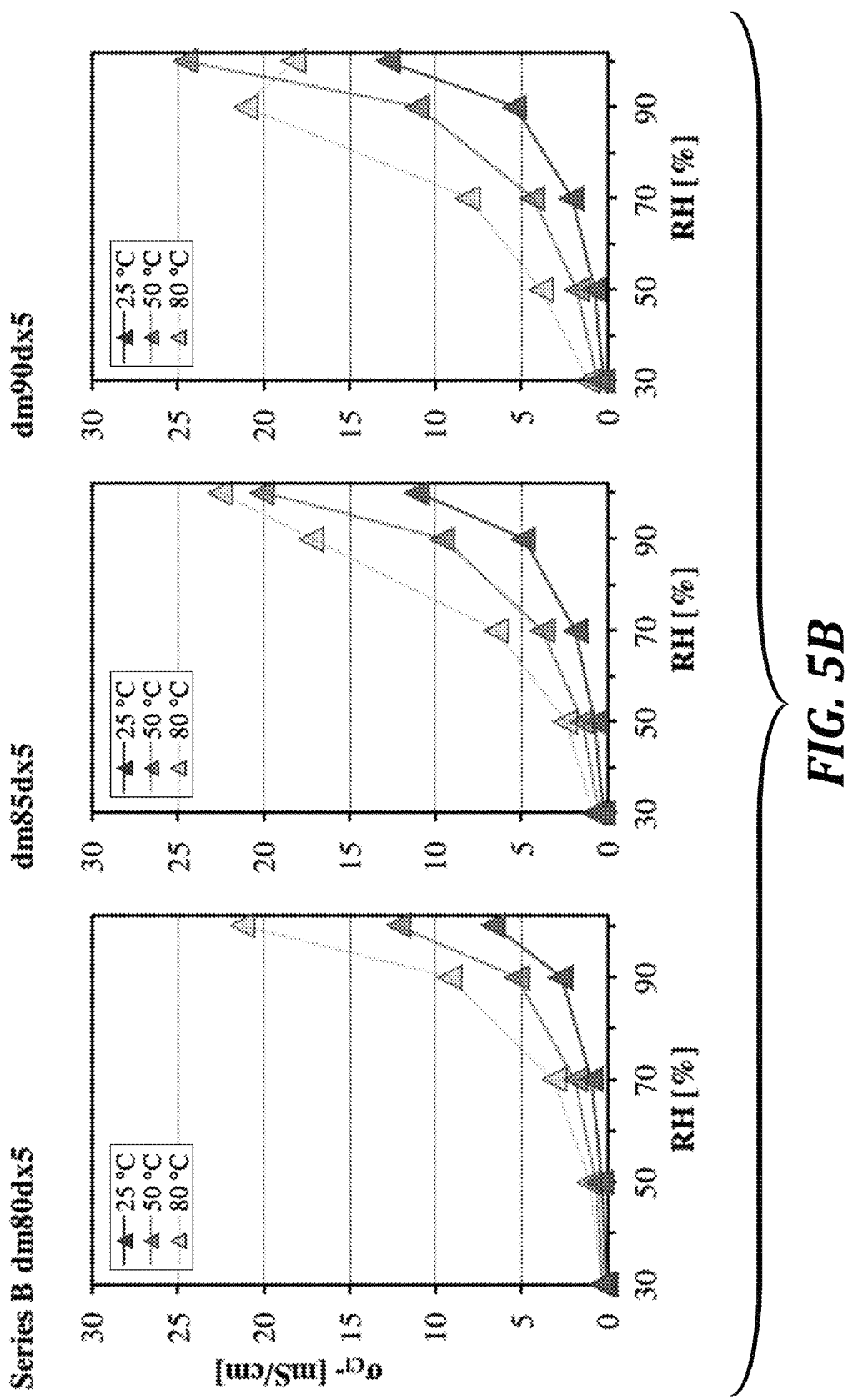
FIG. 5B is a graph of chloride conductivity ($\sigma_{Cl^-}$) of embodiments of the polymers of the present disclosure (Series B) at 25° C., 50° C. and 80° C. as function of relative humidity (RH). Arrows indicate dissolution at higher temperature.
Figure 5C:
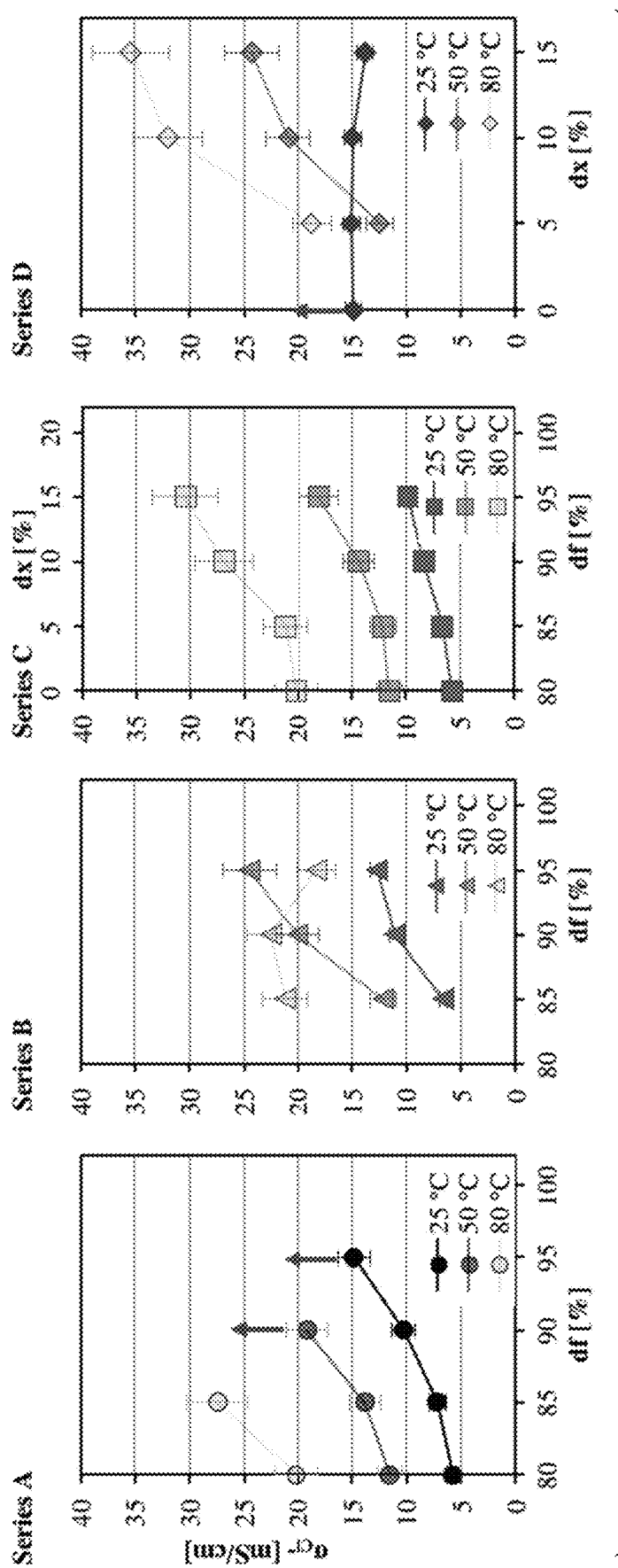
FIG. 5C is a graph of chloride conductivity ($\sigma_{Cl^-}$) of embodiments of the polymers of the present disclosure (Series A, B, C, and D) at 25° C., 50° C. and 80° C. as function of relative humidity (RH). Arrows indicate dissolution at higher temperature.

The conductivity under less ideal conditions during fuel cell operation is also important. FIGS. 5A-5C showed that chloride conductivities are dependent on relative humidity and temperature. Highly functionalized non-crosslinked membranes (Series A, dm90 & dm95) showed conductivities between 5 mS/cm and 7 mS/cm at 25° C. and 18 mS/cm and 22 mS/cm at 80° C. at 90% RH. It can be seen that highly functionalized membranes of Series B (e.g. dm90dx5) and Series C (e.g. dm80dx15) possessed comparable conductivities. Particularly, the 85% methylated non-crosslinked membranes showed low conductivities under partial humidification, although they were highly conductive at 80° C. in water. 3.5 mS/cm and 11 mS/cm were measured at 90% RH at 25° C. and 80° C., respectively. This illustrated the importance of a high ion exchange at low temperature and partial humidification to absorb conductivity-promoting water.

FIGS. 6A-6D plot the chloride conductivities of post-methylated membranes as a function of RH. Under partial humidification all membranes showed very similar conductivities for a given RH and temperature, independent of dx. Differences could be seen between 90% RH and water-soaked membranes: non-crosslinked membranes provided high conductivities at 90% RH, but dissolved at temperatures higher than 25° C. By increasing the dx from 5% up to 15%, the slope between the conductivity at 90% RH and the fully soaked membranes increased significantly at 50° C. and 80° C. This indicated the importance of reduced water sorption at elevated temperature in water.

The results of mechanical property investigations under partial humidification at 25° C. and 80° C. are summarized at Table 1. All tested materials exceeded the instruments strain (ε) limit of around 150%. Hence, the stress (σ) at ε=100% provided an indication of the material's toughness. Increasing temperature and relative humidity decreased Young's modulus (E) and $\sigma_\kappa$=100%, which could be attributed to water acting as plasticizer. Most properties were within each other's standard deviation, indicating no major differences in mechanical strength between the examined polymers. All materials were found to possess higher Young's modulus and at least twice the elongation at break compared similar dry HMT-PMBI Cl⁻. An improved sample preparation technique was the most obvious reason for the improved maximum strain.

TABLE 1

| | | | 25° C. | | | | 80° C. | | | |
| | | | 50% RH | | 90% RH | | 50% RH | | 90% RH | |
| dm [%] | dx [%] | df [%] | $E^a$ [GPa] | $\sigma_{100\%}^b$ [MPa] | E [GPa] | $\sigma_{100\%}$ [MPa] | E [GPa] | $\sigma_{100\%}$ [MPa] | E [GPa] | $\sigma_{100\%}$ [MPa] |
|---|---|---|---|---|---|---|---|---|---|---|
| 90 | 0 | 90 | 1.26 | 0.12 54 3 | 1.10 | 0.05 34.9 1.0 | 1.2 0.2 41 | 5 | 0.73 | 0.09 18.0 1.4 |
| 80 | 10 | 90 | 1.44 | 0.09 62 3 | 1.0 | 0.2 37.6 1.4 | 1.1 0.2 45.0 | 1.4 | 0.46 | 0.14 18 4 |
| 80 | 15 | 95 | 1.13 | 0.14 53 4 | 0.92 | 0.18 36 5 | 0.9 0.1 40.9 | 1.8 | 0.40 | 0.08 16 2 |

Mechanical properties of non-crosslinked (dm = 90%) compared to crosslinked membranes dependent on temperature and relative humidity.

$^a$Young's modulus
$^b$Strain at 100% elongation

To investigate the hydroxide stability of a benzyl crosslinker, a small molecule model compound, BzMeB, was prepared, as shown in Scheme 3. The p-methyl on the benzyl group was used to mimic the p-xylyl moiety of the crosslinker.

Scheme 3: Synthetic route used to prepare BzMeB (iodide form) in this work.

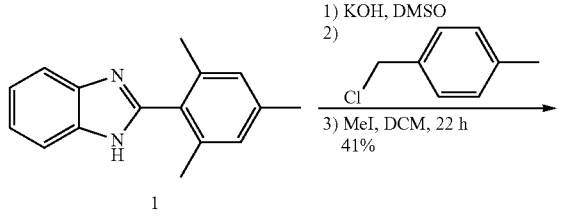

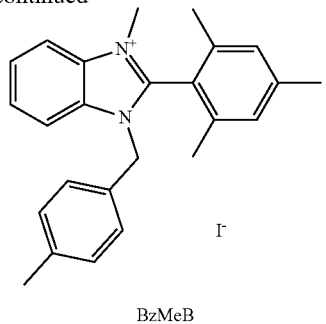

BzMeB

The quantitative hydroxide stability of BzMeB was determined by dissolving the compound (0.02 M) in 3 M NaOD/CD$_3$OD/D$_2$O at 80° C. for 240 h, analogous to a stability test of similar benzimidazolium compounds described in, for example, A. G. Wright et al., Poly(phenylene) and m-Terphenyl as Powerful Protecting Groups for the Preparation of Stable Organic Hydroxides, Angew. Chem. Int. Ed. 55 (2016) 4818-4821, incorporated herein by reference in its entirety. The $^1$H NMR spectra of the solution over time is shown in FIG. 7.

Figure 7:
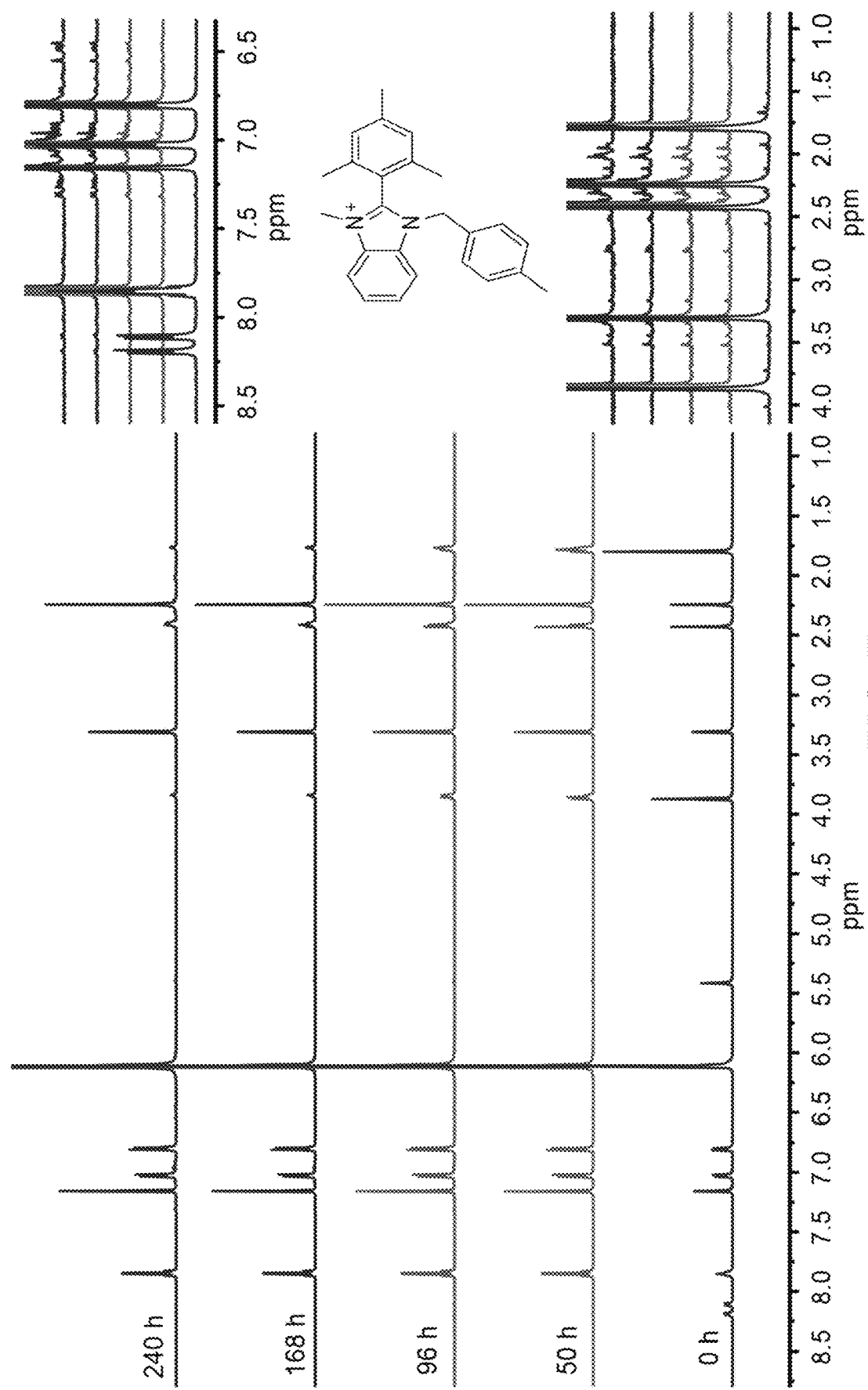
FIG. 7 shows proton ($^1H$) NMR spectra (500 MHz, $CD_3OD$) of BzMeB (0.02 M) in 3 M $NaOD/CD_3OD/D_2O$ after being heated at 80° C. for the specified labeled duration. The protons have been assigned on the initial (0 h) spectrum for clarity.

FIG. 7 shows that there was significant deuterium-exchange on the 4- and 7-positions of the benzimidazolium (H$_b$), the benzyl protons (H$_e$), and on all methyl groups over time, except for the p-methyl on the benzyl group (H$_h$). Additionally, new peaks appeared and grew over time in the aromatic and alkyl regions, signifying degradation.

Figure 8:
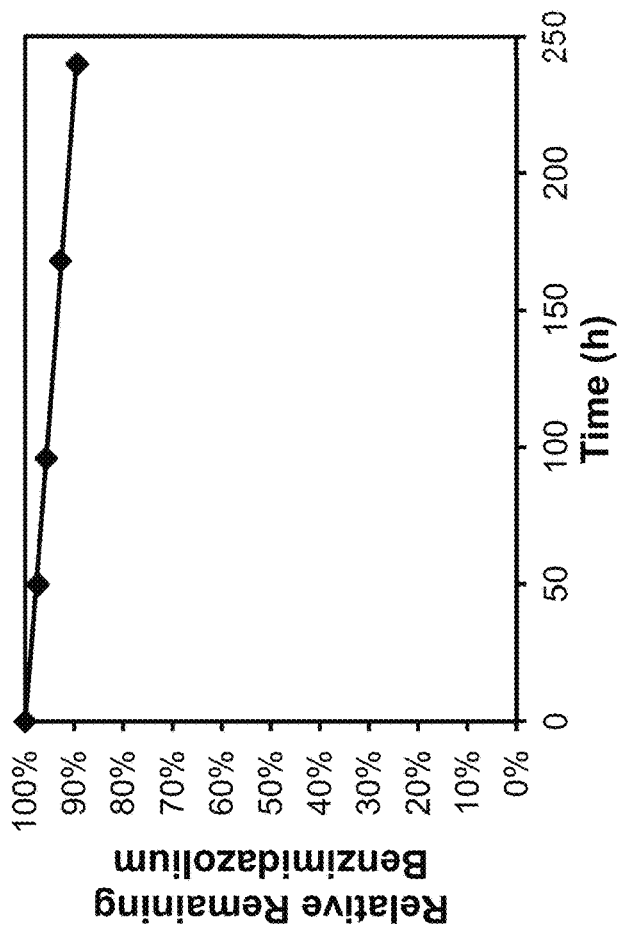
FIG. 8 is a graph of the relative amount of an embodiment of a small molecule model compound (BzMeB) remaining over time when dissolved (0.02 M) in 3 M $NaOD/CD_3OD/D_2O$ and heated at 80° C. over time, as determined by $^1H$ NMR spectroscopy.

To quantify the extent of degradation, the integration of 5- and 6-position protons in the $^1$H NMR spectra (H$_c$) were compared to the total aromatic region over time. Using Eq. 10, the relative amount of remaining benzimidazolium was calculated over time, as plotted in FIG. 8. After 240 h, only 11% degradation was observed. As the data followed a pseudo-first order trend, an exponential curve was fit to the data and the half-life (t$_{1/2}$) was calculated to be 1510 h. This was approximately 3.5 times more stable than for 2-mesityl-1,3-dimethylbenzimidazolium (t$_{1/2}$=436 h), which was reported to only degrade by ring-opening degradation.

Figure 9:
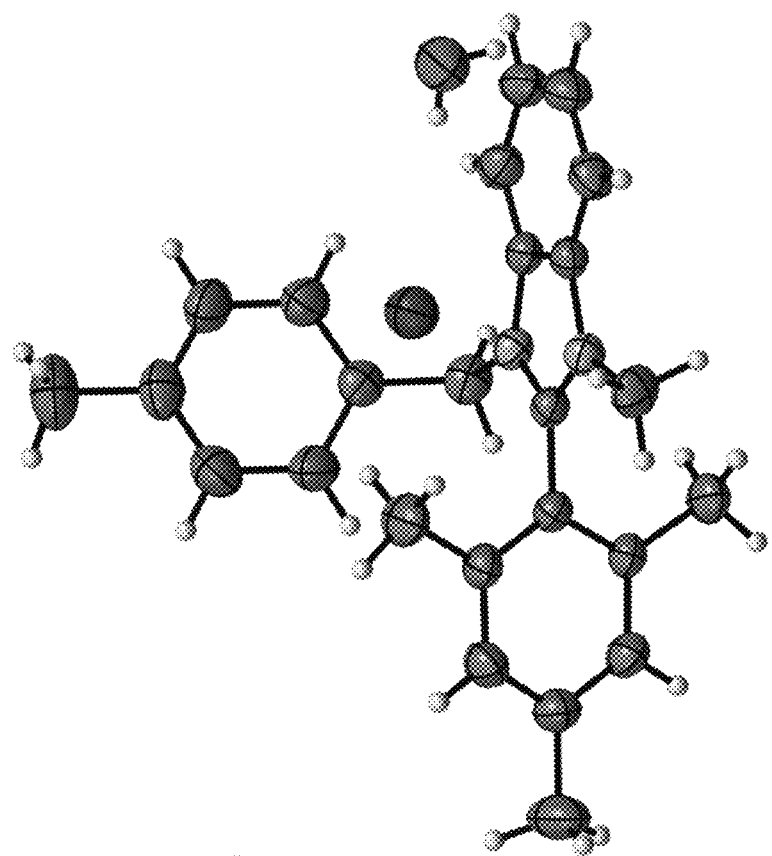
FIG. 9 is a crystal structure of an embodiment of a small molecule model compound (BzMeB, in iodide form), co-crystallized with $H_2O$, showing thermal ellipsoids at a 50% probability level.

This suggested that the benzyl group enhanced the steric hindrance around the C2-position, thus hindering ring-opening degradation. Without wishing to be bound by theory, it is believed that the hydroxide stability of benzimidazoliums was proportional to the C2-I$^-$ distance in a crystal, single crystal XRD was performed on BzMeB in iodide form (FIG. 9). The dihedral angles were measured to be 83.4° and 84.7° relative to the imidazolium-plane to C2-phenyl-plane, which is slightly higher than for the 2-mesityl-1,3-dimethylbenzimidazolium (79.2° and 83.8°). The closest C2-to-I$^-$ distance was also slightly greater, at 4.862, Å and agreed well with the improved stability.

To verify whether the benzyl group introduced a new degradation pathway, the degradation products of BzMeB after the 240 h experiment were isolated and analyzed by mass spectrometry. One of the products observed was the ring-opened product, suggesting that while the steric hindrance around the C2-position was increased, it was not enough to completely mitigate ring-opening degradation. However, two more degradation products were also observed, which were due to nucleophilic displacement of the N-functional groups (de-alkylation), as shown in Scheme 4.

Scheme 4: Degradation pathways for BzMeB in hydroxide form.

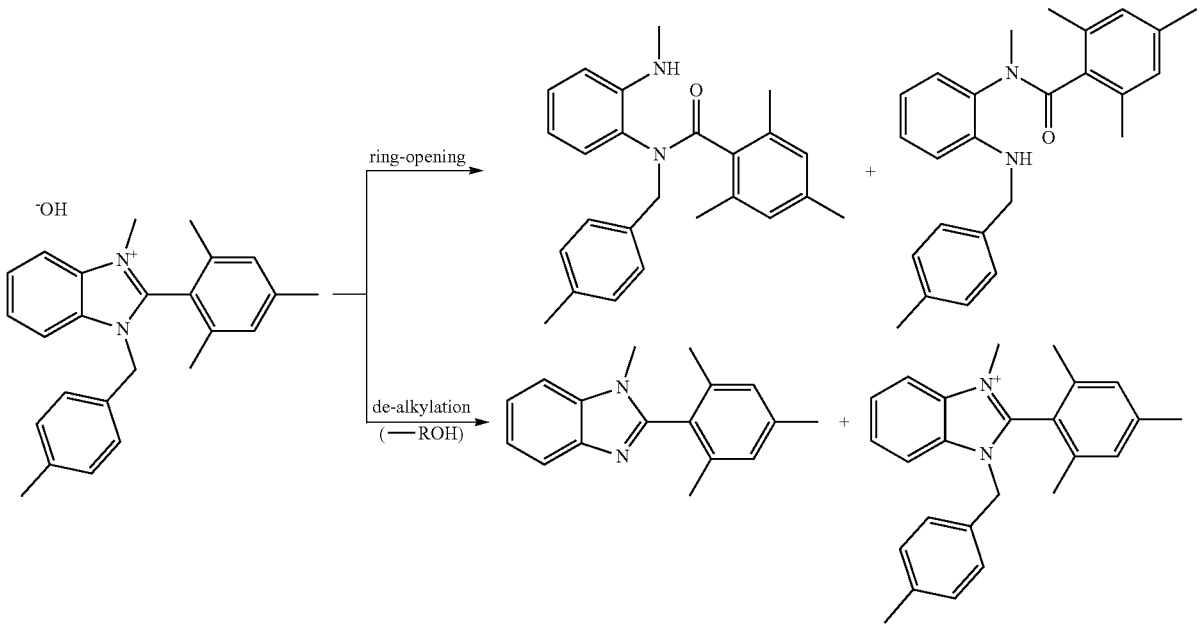

This demonstrated that increasing the stability against ring-opening degradation leads to additional pathways. Not only did the N-methyl groups become displaced, but also the bulkier benzyl groups. Nonetheless, the overall improvement in stability of the small molecule by replacing one N-methyl group with one benzyl group suggested using p-xylyl crosslinking groups on HMT-PMBI should not only improve mechanical stability, but also greatly improve its alkaline chemical stability. The synthesis of sterically unprotected 1,3-dibenzyl poly(benzimidazolium) to further improve alkaline stability was reported to be challenging.

Thus, p-Xylyl crosslinking groups were successfully incorporated into partially dimethylated HMT-PMBI to obtain mechanically and alkaline stable anion conducting membranes. The preparation of numerous different compositions and their analysis under different temperatures and humidity revealed trends in water sorption and anion conductivity. Non-crosslinked HMT-PMBI Cl⁻ could be highly conductive, but specific environmental conditions required a specific degree of functionalization in order to be powerful anion conductors. Cross-linked HMT-PMBI Cl⁻ were found to be resistant to dissolution in water and organic solvents. This allowed highly functionalized membranes to provide high anion conductivities over a wider range of operating conditions.

While illustrative embodiments have been illustrated and described, it will be appreciated that various changes can be made therein without departing from the spirit and scope of the disclosure.

The invention claimed is:

1. A crosslinked polymer comprising repeating units of the following Formula (I):

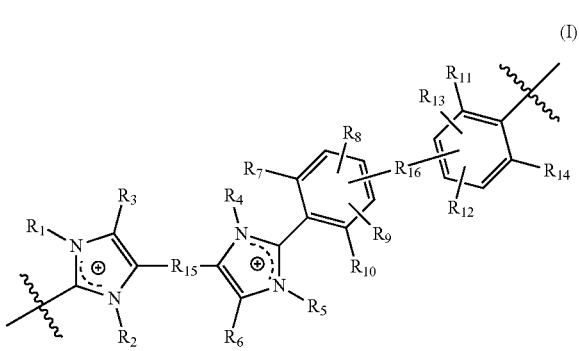

(I)

wherein in Formula (I):

$R_1$, $R_2$, $R_4$, and $R_5$ are each independently absent, or $R_1$, $R_2$, $R_4$, and $R_5$ are each independently selected from a bond, alkyl, perfluoroalkyl, heteroalkyl, aryl, aralkyl, and a crosslinking moiety, wherein the crosslinked polymer comprises a first repeating unit and a second repeating unit of Formula (I), wherein the crosslinking moiety crosslinks the first repeating unit and the second repeating unit of Formula (I);

wherein in the first repeating unit of Formula (I), at least one of $R_1$, $R_2$, $R_4$, and $R_5$ is the crosslinking moiety; and in the second repeating unit of Formula (I), at least one of $R_1$, $R_2$, $R_4$, and $R_5$ is a bond connected to the crosslinking moiety on the first crosslinked repeating unit of Formula (I);

provided that in at least the first repeating unit or the second repeating unit of Formula (I):

at least one of $R_1$ and $R_2$ is an alkyl, perfluoroalkyl, heteroalkyl, aryl, or aralkyl;

when one of $R_1$ and $R_2$ is absent, the imidazolyl group wherein one of $R_1$ and $R_2$ is absent is neutral;

at least one of $R_4$ and $R_5$ is an alkyl, perfluoroalkyl, heteroalkyl, aryl, or aralkyl; and when one of $R_4$ and $R_5$ is absent, the imidazolyl group wherein one of $R_4$ and $R_5$ is absent is neutral;

$R_3$ and $R_6$ are each independently selected from alkyl, perfluoroalkyl, heteroalkyl, aryl, aralkyl, and heteroaryl;

$R_{15}$ is selected from alkylene, perfluoroalkylene, heteroalkylene, arylene, aralkylene, and heteroarylene, each optionally substituted with 1, 2, 3, or 4 substituents independently selected from alkyl, perfluoroalkyl, heteroalkyl, and halo;

$R_{16}$ is selected from a bond, arylene, and heteroarylene, wherein said arylene and heteroarylene is each optionally substituted with 1, 2, 3, or 4 substituents independently selected from alkyl, perfluoroalkyl, heteroalkyl, and halo;

$R_7$, $R_{10}$, $R_{11}$, and $R_{14}$ are each independently selected from alkyl, perfluoroalkyl, and heteroalkyl; and $R_8$, $R_9$, $R_{12}$, and $R_{13}$ are each independently selected from hydrogen, alkyl, perfluoroalkyl, and heteroalkyl.

2. The crosslinked polymer of claim 1, wherein the crosslinked polymer comprises repeating units of Formula (I-A):

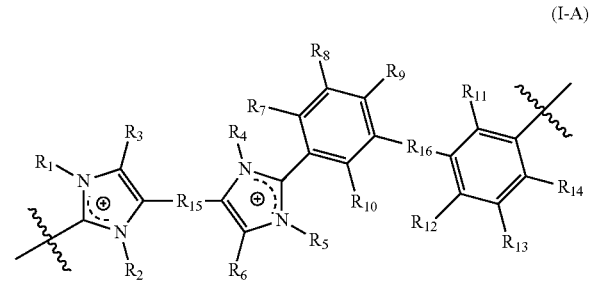

(I-A)

wherein:

$R_1$, $R_2$, $R_4$, and $R_5$ are each independently absent or $R_1$, $R_2$, $R_4$, and $R_5$ are each independently selected from a bond, alkyl, perfluoroalkyl, heteroalkyl, aryl, aralkyl, and a crosslinking moiety;

wherein the crosslinked polymer comprises a first repeating unit and a second repeating unit of Formula (I-A), wherein the crosslinking moiety crosslinks the first repeating unit and the second repeating unit of Formula (I-A), wherein in the first repeating unit of Formula (I-A), at least one of $R_1$, $R_2$, $R_4$, and $R_5$ is the crosslinking moiety; and in the second repeating unit of Formula (I-A), at least one of $R_1$, $R_2$, $R_4$, and $R_5$ is a bond connected to the crosslinking moiety on the first crosslinked repeating unit of Formula (I-A), provided that in at least the first repeating unit or the second repeating unit of Formula (I-A):

at least one of $R_1$ and $R_2$ is selected from alkyl, perfluoroalkyl, heteroalkyl, aryl, and aralkyl, when one of $R_1$ and $R_2$ is absent, the imidazolyl group wherein one of $R_4$ and $R_5$ is absent is neutral;

at least one of $R_4$ and $R_5$ is selected from alkyl, perfluoroalkyl, heteroalkyl, aryl, and aralkyl; and when one of $R_4$ and $R_5$ is absent, the imidazolyl group wherein one of $R_4$ and $R_5$ is absent is neutral;

$R_3$ and $R_6$ are each independently selected from alkyl, perfluoroalkyl, heteroalkyl, aryl, aralkyl, and heteroaryl;

$R_{15}$ is selected from alkylene, perfluoroalkylene, heteroalkylene, arylene, aralkylene, and heteroarylene, each optionally substituted with 1, 2, 3, or 4 substituents independently selected from alkyl, perfluoroalkyl, heteroalkyl, and halo;

$R_{16}$ is selected from a bond, arylene, and heteroarylene, wherein said arylene and heteroarylene is each optionally substituted with 1, 2, 3, or 4 substituents independently selected from alkyl, perfluoroalkyl, heteroalkyl, and halo;

$R_7$, $R_{10}$, $R_{11}$, and $R_{14}$ are each independently selected from alkyl, perfluoroalkyl, and heteroalkyl; and $R_8$, $R_9$, $R_{12}$, and $R_{13}$ are each independently selected from hydrogen, alkyl, perfluoroalkyl, and heteroalkyl.

3. The crosslinked polymer of claim 1, wherein in the second repeating unit of Formula (I), at least one of $R_1$, $R_2$, $R_4$, and $R_5$ is a crosslinking moiety.

4. The crosslinked polymer of claim 1, wherein in the first repeating unit of Formula (I), at least one of $R_1$, $R_2$, $R_4$, and $R_5$ is a bond configured to connect to a crosslinking moiety.

5. The crosslinked polymer of claim 1, wherein $R_1$, $R_2$, $R_4$, and $R_5$ in Formula (I) are each independently absent, or $R_1$, $R_2$, $R_4$, and $R_5$ in Formula (I) are each independently selected from a bond, methyl, trifluoromethyl, and a crosslinking moiety; provided that at least one of $R_1$ and $R_2$ methyl or trifluoromethyl; and
at least one of $R_4$ and $R_5$ methyl or trifluoromethyl.

6. The crosslinked polymer of claim 1, wherein in at least the first repeating unit or the second repeating unit of Formula (I), $R_3$ and $R_6$ are each independently aryl.

7. The crosslinked polymer of claim 1, wherein in at least the first repeating unit or the second repeating unit of Formula (I), $R_{15}$ and $R_{16}$ are each independently selected from arylene and heteroarylene, each optionally substituted with 1, 2, 3, or 4 substituents independently selected from alkyl and halo.

8. The crosslinked polymer of claim 1, wherein $R_7$, $R_{10}$, $R_{11}$, and $R_{14}$ in Formula (I) are each independently alkyl.

9. A crosslinked polymer comprising repeating units of the following Formulas (IV-A), (IV-B), (IV-C), and (IV-D)

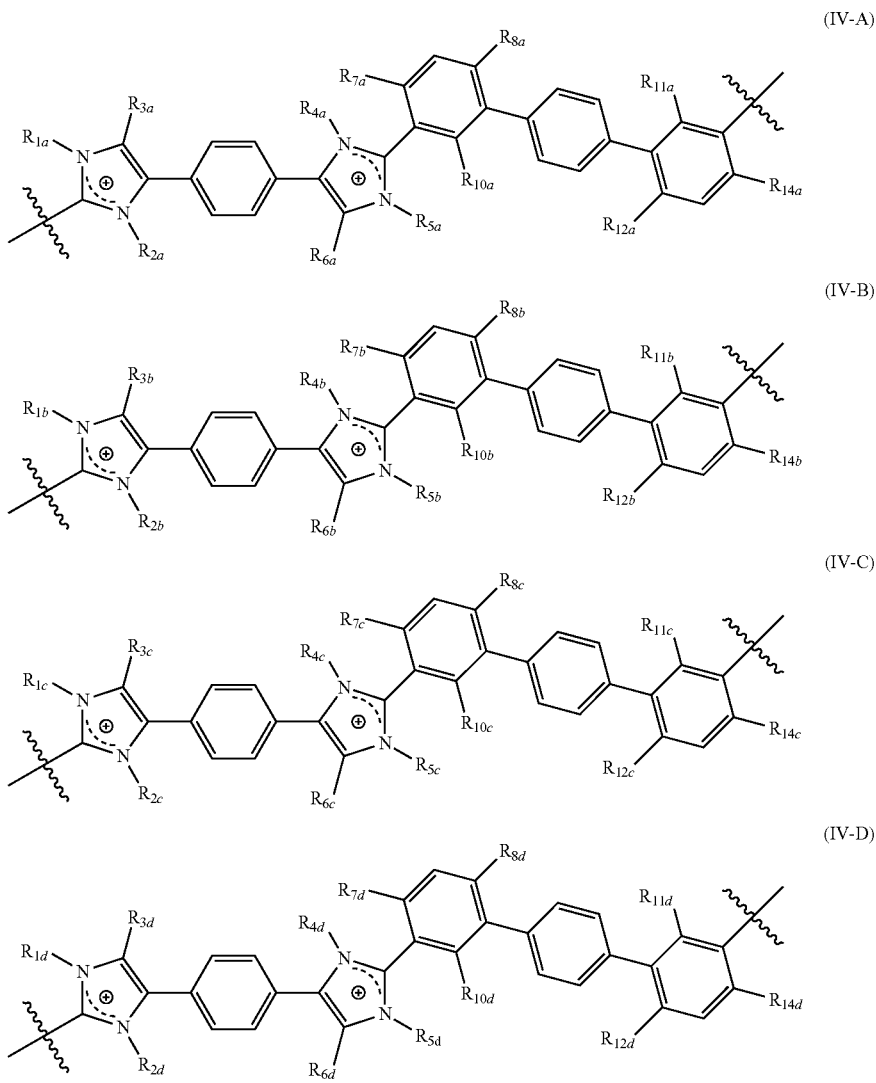

wherein $R_{1a}$, $R_{2a}$, $R_{4a}$, and $R_{5a}$ are each independently selected from a bond, alkyl, perfluoroalkyl, heteroalkyl, aryl, aralkyl, and a crosslinking moiety, provided that two of $R_{1a}$, $R_{2a}$, $R_{4a}$, and $R_{5a}$ is each independently selected from a crosslinking moiety and a bond, wherein the bond is configured to connect to a crosslinking moiety; and the remaining two of $R_{1a}$, $R_{2a}$, $R_{4a}$, and $R_{5a}$ are each independently selected from alkyl, perfluoroalkyl, heteroalkyl, aryl, and aralkyl;

$R_{1b}$, $R_{2b}$, $R_{4b}$, and $R_{5b}$ are each independently absent or $R_{1b}$, $R_{2b}$, $R_{1b}$, and $R_{5b}$ are each independently selected from a bond, alkyl, perfluoroalkyl, heteroalkyl, aryl, aralkyl, and a crosslinking moiety, provided that one of $R_{1b}$, $R_{2b}$, $R_{4b}$, and $R_{5b}$ is selected from a crosslinking moiety and a bond, wherein the bond is configured to connect to a crosslinking moiety; when one of $R_{1b}$, $R_{2b}$, $R_{4b}$, and $R_{5b}$ is absent, the imidazolyl group wherein one of $R_{1b}$, $R_{2b}$, $R_{4b}$, and $R_{5b}$ is absent is neutral; and the remaining two of $R_{1b}$, $R_{2b}$, $R_{4b}$, and $R_{5b}$ are each independently selected from alkyl, perfluoroalkyl, heteroalkyl, aryl, and aralkyl;

$R_{1c}$, $R_{2c}$, $R_{4c}$, and $R_{5c}$ are each independently selected from a bond, alkyl, perfluoroalkyl, heteroalkyl, aryl, aralkyl, and a crosslinking moiety, provided that one of $R_{1c}$, $R_{2c}$, $R_{4c}$, and $R_{5c}$ is selected from a crosslinking moiety and a bond which is configured to connect to a crosslinking moiety and the remaining three of $R_{1c}$, $R_{2c}$, $R_{4c}$, and $R_{5c}$ are each independently selected from alkyl, perfluoroalkyl, heteroalkyl, aryl, and aralkyl, $R_{1d}$, $R_{2d}$, $R_{4d}$, and $R_{5d}$ are each independently selected from alkyl, perfluoroalkyl, heteroalkyl, aryl, and aralkyl;

$R_{3a}$, $R_{6a}$, $R_{3b}$, $R_{6b}$, $R_{3c}$, $F_{6C}$, $R_{3d}$, and $R_{6d}$ re each independently selected from alkyl, perfluoroalkyl, heteroalkyl, aryl, aralkyl, and heteroaryl;

$R_{7a}$, $R_{10a}$, $R_{11a}$, $R_{14a}$, $R_{7b}$, $R_{10b}$, $R_{11b}$, $R_{14b}$, $R_{7c}$, $R_{10c}$, $R_{11c}$, $R_{14c}$, $R_{7d}$, $R_{10d}$, $R_{11d}$, and $R_{14d}$ are each independently selected from alkyl, perfluoroalkyl, and heteroalkyl; and $R_{8a}$, $R_{12a}$, $R_{8b}$, $R_{12b}$, $R_{8c}$, $R_{12c}$, $R_{8d}$, and $R_{12d}$ are each independently selected from hydrogen, alkyl, perfluoroalkyl, and heteroalkyl, wherein at least one of $R_{1a}$, $R_{2a}$, $R_{4a}$, $R_{5a}$, $R_{1b}$, $R_{2b}$, $R_{4b}$, $R_{5b}$, $R_{1c}$, $R_{2c}$, $R_{4c}$, and $R_{5c}$ is a crosslinking moiety, and at least one of the remaining $R_{1a}$, $R_{2a}$, $R_{4a}$, $R_{5a}$, $R_{1b}$, $R_{2b}$, $R_{4b}$, $R_{5b}$, $R_{1c}$, $R_{2c}$, $R_{4c}$, and $R_{5c}$ is a bond which is connected to the crosslinking moiety such that at least two repeating units of Formulas (IV-A), (IV-B), and (IV-C) are crosslinked, wherein the crosslinked polymer comprises r mole percentage repeating units of Formula (IV-A), s mole percentage repeating units of Formula (IV-B), t mole percentage of repeating units (IV-C), and u mole percentage of repeating units (IV-D), and r is from 1 mole percent to 95 mole percent, s is from 1 mole percent to 50 mole percent, t is from 1 mole percent to 95 mole percent, u is from 5 mole percent to 95 mole percent, and $r+s+t+u=100$ mole percent.

10. An ionic membrane comprising a crosslinked polymer of claim 1.

\* \* \* \* \*

UNITED STATES PATENT AND TRADEMARK OFFICE
CERTIFICATE OF CORRECTION

PATENT NO. : 11,230,626 B2
APPLICATION NO. : 16/322920
DATED : January 25, 2022
INVENTOR(S) : S. Holdcroft et al.

It is certified that error appears in the above-identified patent and that said Letters Patent is hereby corrected as shown below:

In the Claims

| Column | Line | |
|---|---|---|
| 77 | 12 | change "$R_{1b}$" to -- $R_{4b}$ -- |

Signed and Sealed this
Eighth Day of November, 2022

Katherine Kelly Vidal
*Director of the United States Patent and Trademark Office*